(12) United States Patent
Bowers et al.

(10) Patent No.: US 9,823,690 B2
(45) Date of Patent: Nov. 21, 2017

(54) TECHNIQUES AND APPARATUS FOR SECURING A STRUCTURE TO A SUPPORT

(71) Applicant: Civiq Smartscapes, LLC, Milford, MA (US)

(72) Inventors: Kyle R. Bowers, Boxborough, MA (US); Benjamin P. Lee, Wayland, MA (US); Parag N. Shah, Carlisle, MA (US); Kenneth J. Gray, Woonsocket, RI (US)

(73) Assignee: Civiq Smartscapes, LLC, Milford, MA (US)

( * ) Notice: Subject to any disclaimer, the term of this patent is extended or adjusted under 35 U.S.C. 154(b) by 0 days.

(21) Appl. No.: 14/852,131

(22) Filed: Sep. 11, 2015

(65) Prior Publication Data

US 2017/0074453 A1    Mar. 16, 2017

(51) Int. Cl.
*G06F 1/16* (2006.01)
*E04H 1/14* (2006.01)
(Continued)

(52) U.S. Cl.
CPC ............... *G06F 1/16* (2013.01); *E04H 1/14* (2013.01); *G06Q 20/18* (2013.01); *G07F 17/00* (2013.01); *H04M 17/02* (2013.01)

(58) Field of Classification Search
CPC .... F16D 9/06; F16D 9/00; E01F 9/018; E01F 15/00; F16M 13/00; G06F 1/16
See application file for complete search history.

(56) References Cited

U.S. PATENT DOCUMENTS 2,029,221 A    1/1936 Jackson et al.
4,923,319 A *  5/1990 Dent .................... F16D 9/06
                                              285/3

(Continued)

FOREIGN PATENT DOCUMENTS

CN    104695733 A    6/2015
DE    19903812 A1    8/2000
(Continued)

OTHER PUBLICATIONS

City Bridge, LLC, "Link NYC Technical Proposal," submitted Jul. 21, 2014 to the City of New York Department of Information, Technology and Telecommunications in response to Request for Proposals for a Franchise to Install, Operate and Maintain Public Communications Structures (248 pages).
CityBridge & LinkNYC Media Data Sheet, available at <http://civiqsmartscapes.com/img/solutions/LinkNYC-Media-Kit.pdf> published Mar. 2015 (13 pages).
(Continued)

*Primary Examiner* — Xanthia C Cunningham
(74) *Attorney, Agent, or Firm* — Goodwin Procter LLP

(57) ABSTRACT

Techniques and apparatus for securing a structure to a support are described. A mounting device may releasably secure a structure to a support. The mounting device may include a first plate, a second plate proximate the first plate, and at least one frangible connection securing the first plate to the second plate. The frangible connection(s) may be adapted to break in response to application of a shear force or other loading above a predetermined value. The mounting device may further include a retention member connecting the first plate to the second plate. The retention member may be adapted to maintain coupling of the first plate and the second plate after breakage of the frangible connection.

29 Claims, 30 Drawing Sheets

(51) Int. Cl.
    *G06Q 20/18*    (2012.01)
    *G07F 17/00*    (2006.01)
    *H04M 17/02*    (2006.01)

(56) References Cited

U.S. PATENT DOCUMENTS

| | | |
|---|---|---|
| 5,061,023 A | 10/1991 | Soubliere et al. |
| 5,415,949 A | 5/1995 | Stone et al. |
| 5,465,819 A | 11/1995 | Weilant et al. |
| 5,484,217 A * | 1/1996 | Carroll .............. E01F 9/635 |
| | | 248/548 |
| 5,587,740 A | 12/1996 | Brennan |
| 5,860,253 A | 1/1999 | Lapointe |
| 5,991,153 A | 11/1999 | Heady et al. |
| 6,002,240 A | 12/1999 | McMahan et al. |
| 6,010,065 A | 1/2000 | Ramachandran et al. |
| 6,210,066 B1 * | 4/2001 | Dent .............. 248/548 |
| 6,223,982 B1 * | 5/2001 | Dunn .............. A47G 29/1216 |
| | | 232/39 |
| 6,364,761 B1 | 4/2002 | Steinbrecher |
| 6,384,811 B1 | 5/2002 | Kung et al. |
| 6,390,436 B2 * | 5/2002 | Barnes .............. E04H 12/20 |
| | | 248/519 |
| 6,493,440 B2 | 12/2002 | Gromatzky et al. |
| 6,512,670 B1 | 1/2003 | Boehme et al. |
| 6,766,005 B1 | 7/2004 | Grunenwald |
| 6,788,544 B1 | 9/2004 | Barsun et al. |
| 6,792,708 B2 * | 9/2004 | Dicke .............. G09F 17/00 |
| | | 248/548 |
| 6,969,212 B1 * | 11/2005 | Richens .............. E01F 9/629 |
| | | 404/10 |
| 7,108,445 B2 * | 9/2006 | Henriques .......... A47G 29/1216 |
| | | 248/160 |
| 7,157,838 B2 | 1/2007 | Thielemans et al. |
| 7,195,222 B2 * | 3/2007 | Dent .............. E01F 9/0182 |
| | | 248/511 |
| 7,339,782 B1 | 3/2008 | Landes et al. |
| 7,374,258 B2 | 5/2008 | Bowron |
| 7,405,926 B2 | 7/2008 | Wu et al. |
| 7,734,764 B2 | 6/2010 | Weiner et al. |
| 7,748,681 B2 * | 7/2010 | Dent .............. G09F 15/00 |
| | | 248/548 |
| 7,894,194 B2 | 2/2011 | Shih et al. |
| 7,980,533 B1 * | 7/2011 | Anderson .............. 256/13.1 |
| 7,985,139 B2 | 7/2011 | Lind et al. |
| 8,006,435 B2 | 8/2011 | DeBlonk et al. |
| 8,006,897 B1 | 8/2011 | Douglass et al. |
| 8,037,651 B2 * | 10/2011 | Dent .............. E02D 27/32 |
| | | 403/13 |
| 8,108,724 B2 | 1/2012 | Barlow et al. |
| 8,125,163 B2 | 2/2012 | Dunn et al. |
| 8,154,768 B2 | 4/2012 | Muraki |
| 8,189,134 B2 | 5/2012 | LeCave |
| 8,208,115 B2 | 6/2012 | Dunn |
| 8,212,959 B2 | 7/2012 | Moscovitch et al. |
| 8,274,622 B2 | 9/2012 | Dunn |
| 8,281,531 B2 | 10/2012 | Dent |
| 8,297,067 B2 | 10/2012 | Keisling et al. |
| 8,310,824 B2 | 11/2012 | Dunn et al. |
| 8,321,052 B2 | 11/2012 | Yepez et al. |
| 8,323,089 B2 | 12/2012 | Nagano |
| 8,345,845 B2 | 1/2013 | Boyce et al. |
| 8,350,799 B2 | 1/2013 | Wasinger et al. |
| 8,351,013 B2 | 1/2013 | Dunn et al. |
| 8,351,014 B2 | 1/2013 | Dunn |
| 8,358,397 B2 | 1/2013 | Dunn |
| 8,369,083 B2 | 2/2013 | Dunn et al. |
| 8,373,841 B2 | 2/2013 | Dunn |
| 8,379,182 B2 | 2/2013 | Dunn |
| 8,427,007 B2 | 4/2013 | Jansma et al. |
| 8,439,761 B2 | 5/2013 | O'Keene et al. |
| 8,472,174 B2 | 6/2013 | Idems et al. |
| 8,482,695 B2 | 7/2013 | Dunn |
| 8,497,972 B2 | 7/2013 | Dunn et al. |
| 8,508,155 B2 | 8/2013 | Schuch |
| 8,523,135 B2 * | 9/2013 | Pierson .............. E01F 9/635 |
| | | 248/548 |
| 8,548,422 B2 | 10/2013 | Jenkins |
| 8,569,910 B2 | 10/2013 | Dunn et al. |
| 8,606,428 B2 | 12/2013 | Chan |
| 8,649,170 B2 | 2/2014 | Dunn et al. |
| 8,654,302 B2 | 2/2014 | Dunn et al. |
| 8,700,226 B2 | 4/2014 | Schuch et al. |
| 8,711,321 B2 | 4/2014 | Dunn et al. |
| 8,713,377 B2 | 4/2014 | Nuthi |
| 8,749,749 B2 | 6/2014 | Hubbard |
| 8,755,021 B2 | 6/2014 | Hubbard |
| 8,767,165 B2 | 7/2014 | Dunn |
| 8,767,923 B1 | 7/2014 | Edwards |
| 8,773,633 B2 | 7/2014 | Dunn et al. |
| 8,804,091 B2 | 8/2014 | Dunn et al. |
| 8,823,916 B2 | 9/2014 | Hubbard et al. |
| 8,854,572 B2 | 10/2014 | Dunn |
| 8,854,595 B2 | 10/2014 | Dunn |
| 8,927,909 B2 | 1/2015 | Le Neel et al. |
| 8,988,647 B2 | 3/2015 | Hubbard |
| 8,994,559 B1 | 3/2015 | LaRocco |
| 9,030,641 B2 | 5/2015 | Dunn |
| 9,072,166 B2 | 6/2015 | Dunn et al. |
| 9,116,263 B2 | 8/2015 | Hayden, Sr. |
| 9,451,060 B1 | 9/2016 | Bowers et al. |
| 9,516,485 B1 | 12/2016 | Bowers et al. |
| 9,622,392 B1 | 4/2017 | Bowers et al. |
| 2001/0032918 A1 * | 10/2001 | Barnes .............. 248/548 |
| 2003/0080949 A1 | 5/2003 | Ditzik |
| 2004/0187505 A1 | 9/2004 | Hoff et al. |
| 2004/0203570 A1 | 10/2004 | Berger |
| 2005/0038749 A1 | 2/2005 | Fitch et al. |
| 2005/0166482 A1 * | 8/2005 | Leahy .............. 52/98 |
| 2005/0210331 A1 | 9/2005 | Connelly et al. |
| 2006/0059790 A1 * | 3/2006 | Yeung .............. E04C 3/06 |
| | | 52/36.5 |
| 2006/0117085 A1 | 6/2006 | Nagao et al. |
| 2006/0186676 A1 | 8/2006 | Fukunaga et al. |
| 2006/0203143 A1 | 9/2006 | Shin |
| 2006/0218828 A1 | 10/2006 | Schrimpf et al. |
| 2006/0220895 A1 | 10/2006 | Arcaria et al. |
| 2006/0228165 A1 * | 10/2006 | Yonan, III .............. 403/2 |
| 2006/0244700 A1 | 11/2006 | Sano et al. |
| 2007/0060097 A1 | 3/2007 | Edge et al. |
| 2007/0082651 A1 | 4/2007 | Loizeaux |
| 2007/0103866 A1 | 5/2007 | Park |
| 2007/0170237 A1 * | 7/2007 | Neff .............. G09F 9/33 |
| | | 232/36 |
| 2007/0183849 A1 * | 8/2007 | Rock .............. B60R 19/02 |
| | | 405/212 |
| 2007/0263610 A1 | 11/2007 | Mitchell |
| 2008/0053129 A1 | 3/2008 | Follette et al. |
| 2008/0113821 A1 | 5/2008 | Beadell et al. |
| 2008/0181385 A1 | 7/2008 | Eveland |
| 2008/0204556 A1 | 8/2008 | de Miranda et al. |
| 2008/0204982 A1 | 8/2008 | Wu et al. |
| 2008/0255901 A1 | 10/2008 | Carroll et al. |
| 2009/0003312 A1 | 1/2009 | Velazquez et al. |
| 2009/0050763 A1 | 2/2009 | Dittmer |
| 2009/0149153 A1 | 6/2009 | Lee |
| 2009/0231807 A1 | 9/2009 | Bouissiere |
| 2009/0241388 A1 | 10/2009 | Dunn |
| 2009/0280770 A1 | 11/2009 | Mahendran |
| 2009/0302188 A1 * | 12/2009 | Lewis .............. E01F 9/642 |
| | | 248/548 |
| 2010/0149736 A1 | 6/2010 | Dittmer et al. |
| 2010/0213724 A1 | 8/2010 | Uyeda |
| 2010/0222132 A1 | 9/2010 | Sanford et al. |
| 2010/0237143 A1 * | 9/2010 | LaBrecque, Jr. .. A47G 29/1216 |
| | | 232/39 |
| 2011/0226505 A1 | 9/2011 | Mackin |
| 2011/0274093 A1 | 11/2011 | Sing et al. |
| 2012/0032062 A1 | 2/2012 | Newville |
| 2012/0213351 A1 | 8/2012 | Boyce et al. |
| 2012/0262271 A1 | 10/2012 | Torgersrud et al. |
| 2012/0295580 A1 | 11/2012 | Corner |

(56) References Cited

U.S. PATENT DOCUMENTS

| | | | |
|---|---|---|---|
| 2013/0147626 A1* | 6/2013 | Hammoud | G08B 13/22 340/569 |
| 2013/0229098 A1 | 9/2013 | Pletcher | |
| 2013/0237175 A1 | 9/2013 | Piett | |
| 2013/0332271 A1 | 12/2013 | Hay | |
| 2014/0069154 A1 | 3/2014 | Dolev | |
| 2014/0148171 A1 | 5/2014 | Cucala Garcia | |
| 2014/0224591 A1 | 8/2014 | Garcia | |
| 2015/0106150 A1 | 4/2015 | Soleimani | |
| 2015/0110453 A1 | 4/2015 | Elford et al. | |
| 2015/0244297 A1 | 8/2015 | Niemoeller et al. | |
| 2017/0083043 A1 | 3/2017 | Bowers et al. | |
| 2017/0083062 A1 | 3/2017 | Bowers et al. | |
| 2017/0111486 A1 | 4/2017 | Bowers et al. | |
| 2017/0111521 A1 | 4/2017 | Bowers et al. | |

FOREIGN PATENT DOCUMENTS

| | | |
|---|---|---|
| DE | 202006001363 U1 | 4/2006 |
| EP | 0936794 A2 | 8/1999 |
| EP | 1530383 A1 | 5/2005 |
| EP | 2328130 A1 | 6/2011 |
| WO | WO-2003/103451 A1 | 12/2003 |
| WO | WO-2007/116116 | 10/2007 |
| WO | WO-2009/135308 A1 | 11/2009 |
| WO | WO-2009/143764 A1 | 12/2009 |
| WO | WO-2015/123142 A1 | 8/2015 |
| WO | WO-2017/044758 A1 | 3/2017 |
| WO | WO-2017/044760 A2 | 3/2017 |
| WO | WO-2017/044764 A1 | 3/2017 |

OTHER PUBLICATIONS

Communication Relating to the Results of the Partial International Search (ISA/206) for International Application No. PCT/US2016/050968 dated Dec. 12, 2016 (5 pages).

International Search Report and the Written Opinion of the International Searching Authority for International Application No. PCT/US2016/050965 dated Dec. 9, 2016 (13 pages).

International Search Report and the Written Opinion of the International Searching Authority for International Application No. PCT/US2016/050972 dated Dec. 7, 2016 (14 pages).

International Search Report and Written Opinion of the International Searching Authority for International Application No. PCT/US2016/061511 dated Feb. 15, 2017 (12 pages).

International Search Report and The Written Opinion of the International Searching Authority for International Application No. PCT/US2016/050968 dated Mar. 23, 2017 (26 pages).

U.S. Appl. No. 14/857,437, Techniques and Apparatus for Mounting a Housing on a Personal Communication Structure (PCS), filed Sep. 17, 2015.

U.S. Appl. No. 14/857,462, Techniques and Apparatus for Controlling the Temperature of a Personal Communication Structure (PCS), filed Sep. 17, 2015.

U.S. Appl. No. 14/884,044, Techniques and Apparatus for Controlling Access to Components of a Personal Communication Structure (PCS), filed Oct. 15, 2015.

U.S. Appl. No. 14/884,052, Techniques and Apparatus for Controlling Access to Components of a Personal Communication Structure (PCS), filed Oct. 15, 2015.

U.S. Appl. No. 14/940,485, Systems and Methods for Making Emergency Phone Calls, filed Nov. 13, 2015.

* cited by examiner

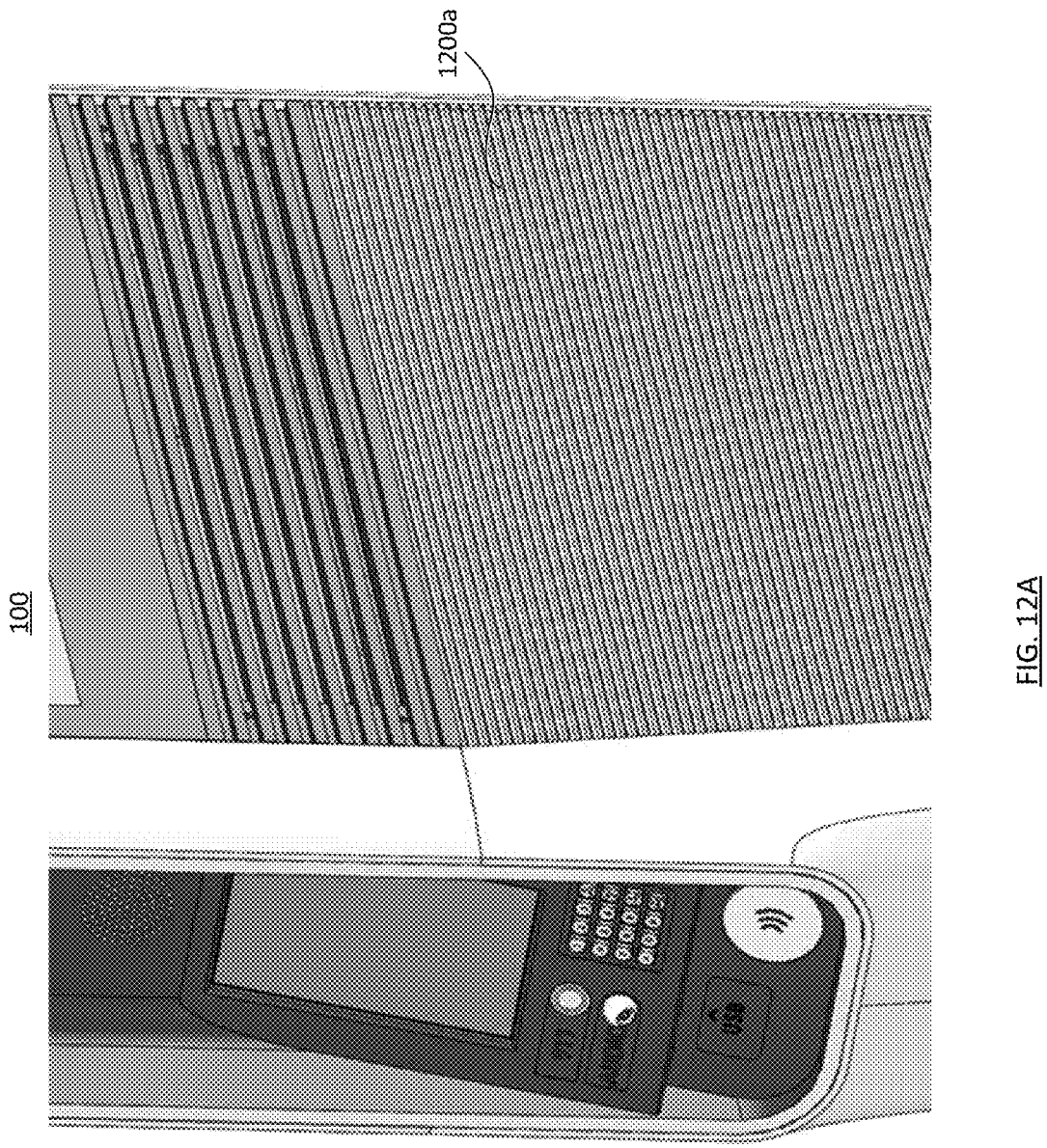

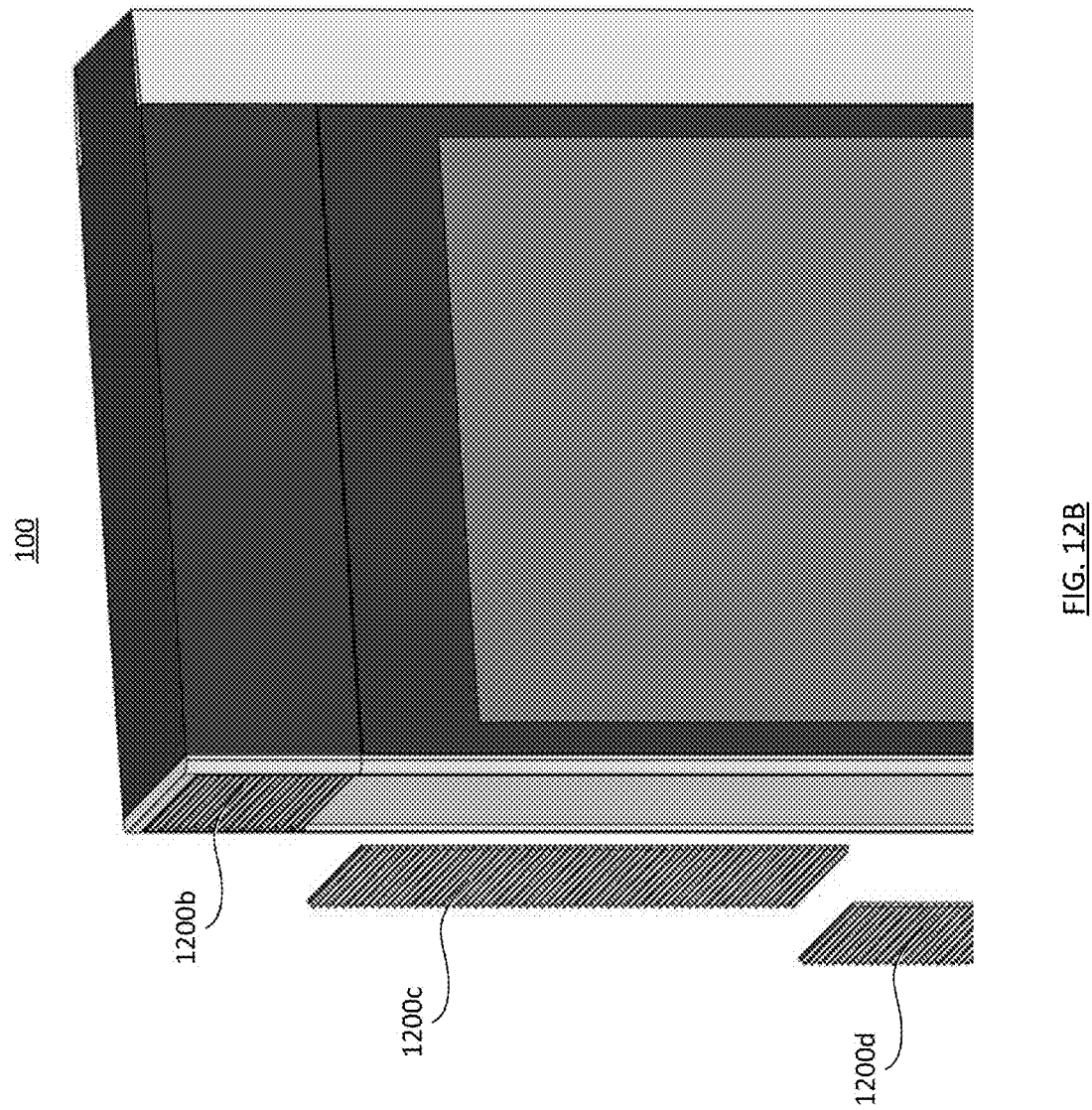

TECHNIQUES AND APPARATUS FOR SECURING A STRUCTURE TO A SUPPORT

FIELD OF INVENTION

The present disclosure relates generally to techniques and apparatus for securing a structure to a support. Some embodiments relate specifically to techniques and apparatus for releasably securing a personal communication structure (PCS) to a support.

BACKGROUND

In some public or semi-public areas, various structures can be used for communication or to obtain access to goods and services. For example, telephone booths can be used to place telephone calls. Interactive kiosks can be used to obtain access to information, products, and/or services. Some interactive kiosks are self-service kiosks, which allow patrons of a business to perform service tasks that were historically performed by business employees. For example, the automated teller machine (ATM) is a self-service kiosk that allows users to deposit funds into a financial account, withdraw funds from an account, check an account balance, etc.—tasks that were historically performed with the assistance of a human bank teller. As another example, some retail stores allow customers to scan and pay for their items at self-service checkout kiosks rather than checkout stations staffed by human cashiers.

An interactive kiosk generally includes a computer terminal, which executes software and/or controls hardware peripherals to perform the kiosk's tasks. Many interactive kiosks are deployed inside buildings that are accessible to the public (e.g., banks, stores), in areas where the building operators can monitor the kiosks and protect them from unauthorized access. In some cases, interactive kiosks are integrated into walls of buildings (e.g., some ATMs are integrated into walls of banks), fastened to walls, or placed against walls, which can protect the kiosks from unauthorized access and reduce the occurrence of potentially dangerous events such as the kiosks tipping or overturning.

SUMMARY OF THE INVENTION

In recent years, public telephone booths have dwindled in number and many of the remaining booths have fallen into relative disuse and disrepair. The demise of the public telephone booth can be traced, in part, to the increasing prevalence of mobile phones and to the widespread use of communication networks for non-telephonic purposes. Many people who wish to participate in telephone conversations in public places prefer the convenience of their own mobile phones to the inconvenience of a stationary phone booth. Furthermore, in contrast to many mobile phones, conventional public telephone booths do not allow users to access Internet-based data and services. Many people who wish to access Internet-based data and services in public places use mobile computing devices (e.g., smartphones or laptop computers) and wireless networks (e.g., mobile broadband networks or Wi-Fi networks) to do so. In short, for many people, the public telephone booth is less convenient and less functional than other readily-available options for connecting to a communication network.

Despite the seeming ubiquity of mobile computing devices, many people are often left with insufficient access to telephonic or Internet-based services. In some areas, wireless network coverage may be poor or nonexistent. In areas where wireless networks are available, the number of network users or the volume of network traffic may exceed the capacity of the network, leaving some users unable to connect to the network, and degrading quality of service for users who are able to connect (e.g., degrading audio quality of phone calls or reducing rates of data communication). Even when wireless networks are available and not congested, some people may not have access to telephonic or Internet-based services because they may not have suitable computing devices or network-access agreements (e.g., a person may not own a computing device, may own a computing device but not have a network-access agreement with an Internet-service provider, may not own a mobile computing device, may have a mobile computing device with an uncharged battery, etc.).

There is a need for personal communication structures (PCSs) that enhance public access to communication networks. Such PCSs may enhance access to communication networks by expanding network coverage (e.g., making communication networks available in areas where they would otherwise be unavailable), expanding network capacity (e.g., increasing the capacity of communication networks in areas where such networks are available), expanding access to end-user computing devices and telephones, and/or expanding access to charging outlets for mobile computing devices. By enhancing access to communication networks, the PCSs may improve the employment prospects, educational opportunities, and/or quality of life for individuals, families, and communities that would otherwise have limited access to communication networks.

Public access to communication networks can be enhanced by placing PCSs in public locations, including sidewalks, parking facilities, mass transit stations, etc. From time to time, a PCS operated in a public location may be struck by an automobile or otherwise subjected to comparable physical forces. When an automobile collides with a PCS or a comparable physical force is applied to a PCS, the PCS may cause significant damage to nearby property, or even pose a significant threat to the well-being of nearby people and animals. For example, in cases where the PCS is strongly secured to a support, a collision between the PCS and an automobile may result in significant harm to the support, the automobile, and/or the automobile's occupants. On the other hand, in cases where the PCS is not strongly secured to a support, such a collision may result in the PCS being launched into or onto nearby property, animals, or people, potentially resulting in significant damage, injury, or even death.

The inventors have recognized and appreciated that the risks posed by collisions with PCSs can be mitigated by releasably securing the PCS to a support, such that PCS is permitted to move relative to the support when a force applied to the PCS exceeds a predetermined value, but the PCS's movement relative to the support is constrained within a limited range. Permitting the PCS to move relative to the support when an automobile collides with the PCS may reduce the risk of significant damage to the automobile and/or the risk of severe injury to the automobile's occupants. Furthermore, constraining the PCS's movement relative to the support within a predetermined range may prevent the PCS from being launched into or onto nearby property, animals, or people.

The movement of a PCS relative to its support may result in additional hazards. A PCS may be coupled to power lines and/or communication lines, which may extend between the PCS and the PCS's support. Relative movement between a PCS and its support may exert significant strain on such lines, which may cause the lines to break. Broken lines can create electrical hazards. For example, handling a broken power line could result in a substantial electrical shock. As another example, when the PCS's electrical grounding line is broken, contacting the PCS could result in an electrical shock. Broken lines can also be difficult to repair or replace, particularly if the broken lines include optical fibers, which are difficult to repair. Replacing fiber optic lines may involve laying new optical fiber between the PCS and an optical communication access point, which can be very expensive.

The inventors have recognized and appreciated that the integrity of a PCS's lines (e.g., electrical and/or communication lines) can be enhanced by introducing sufficient slack into the lines. When the slack in a line exceeds the predetermined limits on the PCS's displacement relative to the support, the PCS's movement may not break the line. The use of slack may be particularly advantageous in the case of the PCS's electrical grounding line, because maintaining the PCS's connection to an electrical grounding node can reduce the risk of electrical shock for people near the displaced PCS.

The inventors have also recognized and appreciated that the integrity of a PCS's lines can be enhanced by introducing quick release connectors in the lines between the PCS and its support. These connectors may be configured to disconnect when the PCS moves relative to its support, thereby relieving the strain on the lines and preventing the lines from breaking. The use of quick release connectors may be particularly advantageous in the case of the PCS's power line, because disconnecting the power line can reduce the risk of electrical shock for people near the displaced PCS or the power line. The use of quick release connectors may also be advantageous in the case of a fiber optic communications line, because reconnecting the connector may be significantly less time consuming and expensive than laying new optical fiber between the PCS and an optical communication access point.

According to an aspect of the present disclosure, a mounting device for releasably securing a personal communication structure (PCS) to a support is provided. The mounting device includes a first plate, a second plate proximate the first plate, at least one frangible connection securing the first plate to the second plate, and a retention member connecting the first plate to the second plate. The at least one frangible connection is adapted to break in response to application of a shear force above a predetermined value. The retention member is adapted to maintain coupling of the first plate and the second plate after breakage of the frangible connection.

In some embodiments, at least one of the first plate and the second plate includes a planar element. In some embodiments, the first plate and the second plate are arranged in a substantially parallel configuration. In some embodiments, the support is at least partially buried beneath a sloped surface, and the first plate and the second plate are arranged at an angle relative to the sloped surface to level the PCS.

In some embodiments, a width of the first plate is between approximately 8" and 10" and a length of the first plate is between approximately 24" and 26". In some embodiments, a distance between the first plate and the second plate is approximately 12".

In some embodiments, the mounting device further includes a deformable member disposed between the first plate and a surface of the PCS. In some embodiments, the deformable member includes at least one material selected from the group consisting of an elastomer, a rubber, a metal and a polymer.

In some embodiments, the frangible connection includes at least one frangible fastener. In some embodiments, each of the frangible fasteners is selected from the group consisting of a shear pin, a rivet and a breakaway bolt. In some embodiments, each of the frangible fasteners is connected to both the first plate and the second plate. In some embodiments, each of the frangible fasteners is deformable when the force applied is less than the predetermined value. In some embodiments, the PCS is configured to bend until at least a portion of the PCS contacts a ground surface in response to deformation of the at least one frangible fastener. In some embodiments, a combined shear strength of the frangible fasteners is less than a damage threshold of the support. In some embodiments, each of the frangible fasteners has a shear strength between approximately 2.0 kips and approximately 3.25 kips. In some embodiments, the retention member limits a range of motion of the first plate relative to the second plate after breakage of the frangible connection, the first plate being secured to the PCS. In some embodiments, the retention member limits displacement of the first plate after breakage of the frangible connection within a predetermined range. In some embodiments, the retention member includes a retention component selected from the group consisting of a chain, a cable, a strap, and a wire rope. In some embodiments, a tensile strength of the retention member is between approximately 2.5 kips and approximately 4.0 kips.

In some embodiments, the mounting device further includes a ring attached to the first plate, wherein the retention member is attached to the ring and further coupled to the support. In some embodiments, the retention member absorbs at least some energy resulting from movement of the PCS after breakage of the frangible connection. In some embodiments, the retention member absorbs the energy via deformation.

According to another aspect of the present disclosure, a personal communication structure (PCS) is provided, including a frame, an interactive user interface coupled to the frame, and a mounting device adapted to releasably secure the frame to a support. The mounting device includes a first plate coupled to the frame, a second plate proximate the first plate, at least one frangible connection securing the first plate to the second plate, and a retention member connecting the first plate to the second plate. The at least one frangible connection is adapted to break in response to application of a shear force above a predetermined value. The retention member is adapted to maintain coupling of the first plate and the second plate after breakage of the frangible connection.

In some embodiments, the PCS further includes a line selected from the group consisting of a power line and a communication line, and a line connector coupled to the line, the line connector adapted to connect to a mating connector. In some embodiments, the line connector is adapted to disconnect the line from the mating connector in response to displacement of the PCS relative to the support. In some embodiments, the displacement of the PCS relative to the support results in an application of tensile force to the line connector. In some embodiments, the line connector is adapted to disconnect the line from the mating connector in response to application to the line connector of a tensile force greater than approximately 0.01 kips.

In some embodiments, the line is secured to the frame. In some embodiments, the mating connector is coupled to the support. In some embodiments, the line connector is disposed in the frame. In some embodiments, the line connector is disposed in the mounting device.

In some embodiments, the first plate forms an aperture. In some embodiments, the aperture is generally centrally located in the first plate. In some embodiments, the line extends through the aperture.

In some embodiments, the line includes a power line which includes a safety mechanism adapted to cover a male portion of the power line in response to disconnection of the line connector from the mating connector. In some embodiments, the line is adapted to carry signals selected from the group consisting of electrical signals and optical signals. In some embodiments, the line includes a communication line including at least one optical fiber.

Other aspects and advantages of the invention will become apparent from the following drawings, detailed description, and claims, all of which illustrate the principles of the invention, by way of example only.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

FIGS. 12A and 12B show front perspective views of a PCS with ribbed panels, in accordance with some embodiments;

DETAILED DESCRIPTION

Overview of Personal Communication Structure (PCS)

Figure 1:
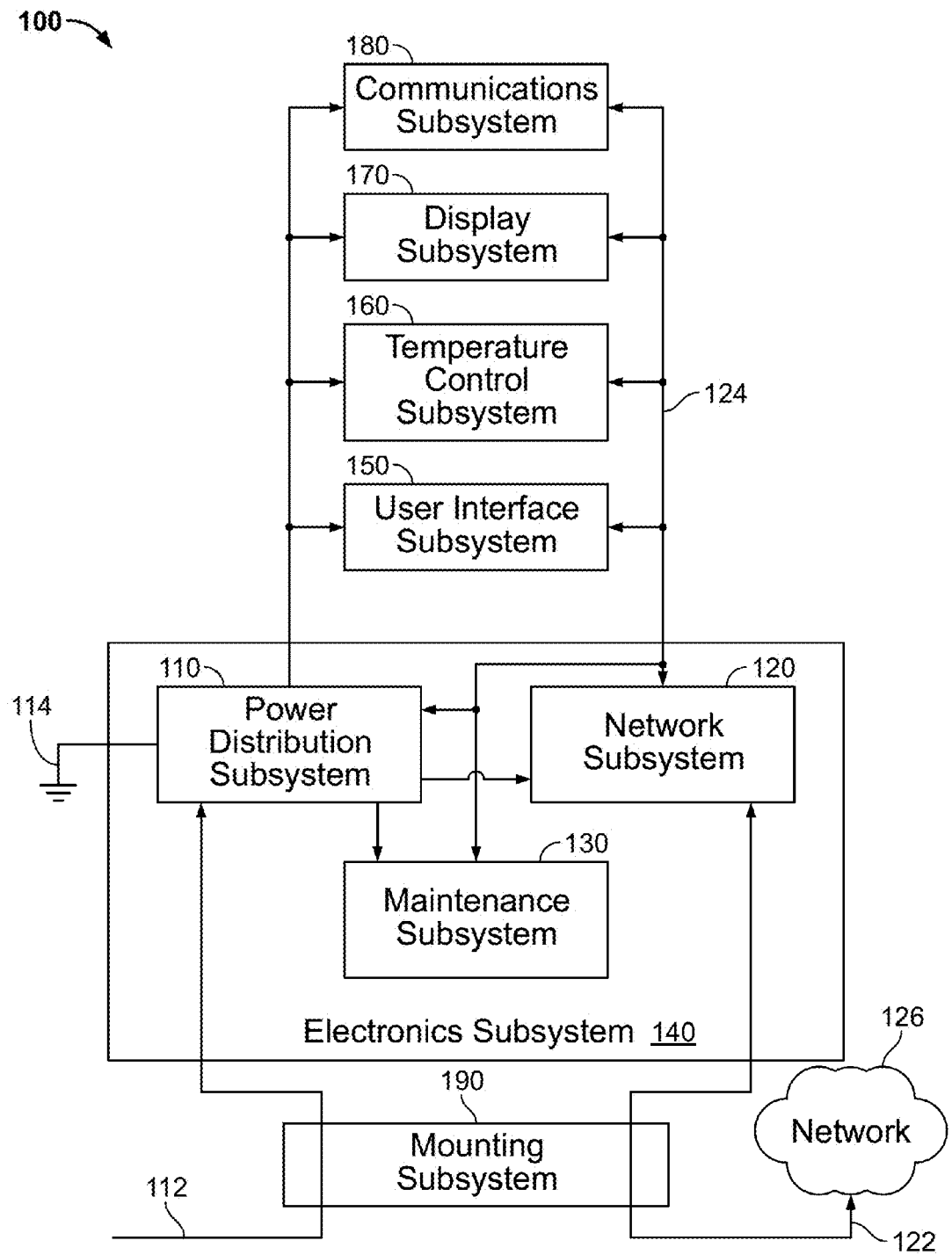
FIG. 1 is a block diagram of a personal communication structure (PCS), in accordance with some embodiments.

FIG. 1 illustrates a personal communication structure (PCS) 100, according to some embodiments. PCS 100 enhances access to communication networks in public or semi-public places. In some embodiments, PCS 100 includes an electronics subsystem 140, a user interface subsystem 150, a temperature control subsystem 160, a display subsystem 170, a communications subsystem 180, and/or a mounting subsystem 190. Electronics subsystem 140 may include a power distribution subsystem 110, a network subsystem 120, and/or a maintenance subsystem 130. These and other components of PCS 100 are described in further detail below.

Power distribution subsystem 110 distributes electrical power to components of PCS 100. Power distribution subsystem 100 may provide power to network subsystem 120, maintenance subsystem 130, other components of electronics subsystem 140, user interface subsystem 150, temperature control subsystem 160, display subsystem 170, and/or communications subsystem 180. Power distribution subsystem 110 may distribute power provided by any suitable power source(s) including, without limitation, batteries, solar panels, a power line 112 coupled to a power grid, etc. In some embodiments, power distribution subsystem 110 includes one or more power converters operable to convert power from one form (e.g., AC power) into another form (e.g., DC power) suitable for the PCS's components. In some embodiments, power distribution subsystem 110 includes one or more voltage level converters operable to change the voltage level of a signal to a level compatible with a component of the PCS. The ground terminal of the power distribution subsystem 110 may be coupled to a reference potential 114 via the chassis of the PCS or via any other suitable path.

Figure 2:
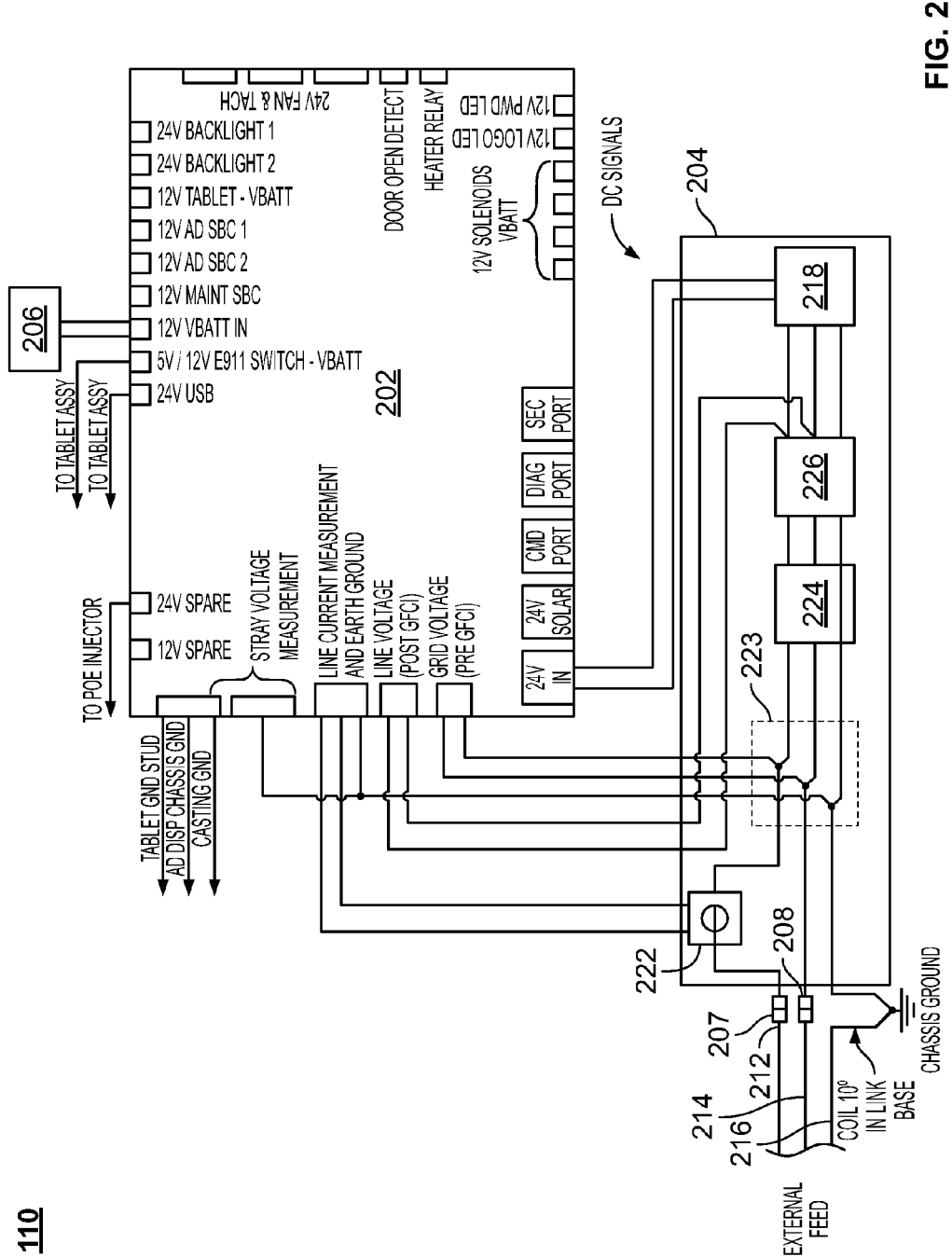
FIG. 2 is a schematic of a power distribution subsystem of a PCS, in accordance with some embodiments.

FIG. 2 shows a schematic of a power distribution subsystem 110, according to some embodiments. In some embodiments, power distribution subsystem (PDS) 110 includes a power conversion system 204, a power distribution board 202, and a battery 206. The inputs to power conversion system 204 include AC power supply signals (e.g., 120 VAC at 60 Hz) carried on a hot line 212, a neutral line 214, and a ground line 216. In some embodiments, the hot line 212 and neutral line 214 may be coupled to power conversion system 204 by quick disconnect devices 207 and 208, respectively, whereby the hot and neutral lines may be safely disconnected from power distribution subsystem 110 if the PCS is separated from its footing. Ground line 216 may be coupled to a ground terminal of the PCS 100. Power conversion system 204 processes the AC power supply signals and converts the processed signals into DC power supply signals. In some embodiments, power conversion system 204 includes a current transformer 222, AC power distribution unit 223, ground-fault circuit interrupter 224 (e.g., circuit breakers), AC line filter 226, and rectifier 218. Rectifier 218 may function as a DC power supply (e.g., a 24 V, 75 A, 2 kW DC power supply). As can be seen in FIG. 2, the outputs of various components of power conversion system 204 may be provided as inputs to power distribution board 202.

Power distribution board 202 may detect power system faults and distribute DC power signals to other components of the PCS. In some embodiments, power distribution board 202 uses the AC signals provided by power conversion system 204 to perform fault detection (e.g., ground fault detection, stray voltage detection, etc.). In some embodiments, power distribution board 202 uses the DC power supply signals provided by power conversion system 204 and/or battery 206 to produce DC power supply signals at various voltage levels (e.g., 5V, 12V, and 24V DC), and distributes those DC power supply signals to suitable components of the PCS 100.

In some embodiments, power distribution system DC power signals can be switched on and off. As those skilled in the art can appreciate, staggered activation of high-power devices (e.g., one or more components of display subsystem 170) reduces in-rush current demand on power supply 218. In some embodiments, the power distribution subsystem 110 is able to measure output current and can shut off power supply signals when the device reaches an over-current threshold. When a device causes over-current and "trips" the output, an error message may be sent to a maintenance center, indicating that the PCS requires servicing.

Battery 206 may provide backup power for components of PCS 100, including but not limited to user interface subsystem 150, which may implement emergency communication (e.g., E911) functionality. In some embodiments, power distribution board 202 may charge battery 206 (e.g., at 24 VDC) when power conversion system 204 is producing DC power and PCS 100 is not using all the available DC power. In some embodiments, a solar charging system may charge battery 206 during power outages or at other times.

In some embodiments, the power distribution subsystem 110 can detect whether the ground-fault circuit interrupter 224 has tripped. The ability to detect activation of the ground-fault circuit interrupter 224 can facilitate maintenance of the PCS. For example, while on back-up battery power, the PDS may determine whether AC power is lost (e.g., by sensing whether AC power supply signals are present) or the ground-fault circuit interrupter 224 has tripped. A suitable message can then be sent to the maintenance center, indicating, for example, whether the PCS requires service.

Returning to FIG. 1, network subsystem 120 controls communication on a network 124 within PCS 100, and communication between internal network 124 and a network 126 external to the PCS. In some embodiments, network subsystem 120 uses network 124 to communicate with power distribution system 110, maintenance subsystem 130, user interface subsystem 150, temperature control subsystem 160, display subsystem 170, and/or communications subsystem 180. The nodes of network 124 may be arranged in one or more suitable network topologies, including, without limitation, a bus (e.g., with network subsystem 120 as the bus controller), star network (e.g., with network subsystem 120 as the central hub), ring network, mesh network, tree network, point-to-point network, etc. Network 124 may be implemented using one or more suitable communication technologies, including, without limitation, Ethernet, DVI (Digital Visual Interface), HDMI (High-Definition Multimedia Interface), USB (Universal Serial Bus), SMB (System Management Bus), I2C (Inter-Integrated Circuit) bus, VGA (Video Graphics Array), SCSI (Small Computer System Interface), SPI (Serial Peripheral Interface) bus, LVDS (low-voltage differential signaling), etc.

Network subsystem 120 may send and receive any suitable data. For example, network subsystem 120 may control the operation of other components of PCS 100 by sending control data to the PCS's subsystems. Network subsystem 120 may forward commands received from a suitable source, including, without limitation, other PCS subsystems and/or network 126. As another example, network subsystem 120 may send operand data to components of PCS 100 for processing by those components (e.g., data to be displayed by display subsystem 170 or user interface subsystem 150, data to be transmitted by communications subsystem 180, etc.).

In some embodiments, network subsystem 120 communicates with network 126 via data link 122. Data link 122 may be implemented using a suitable communications line, including, without limitation, an Ethernet cable, coaxial cable, or optical fiber. In some embodiments, network subsystem 120 may include a signal conversion device adapted to convert the signals received on data link 122 from one form (e.g., optical signals) into another form (e.g., electrical signals).

Figure 3:
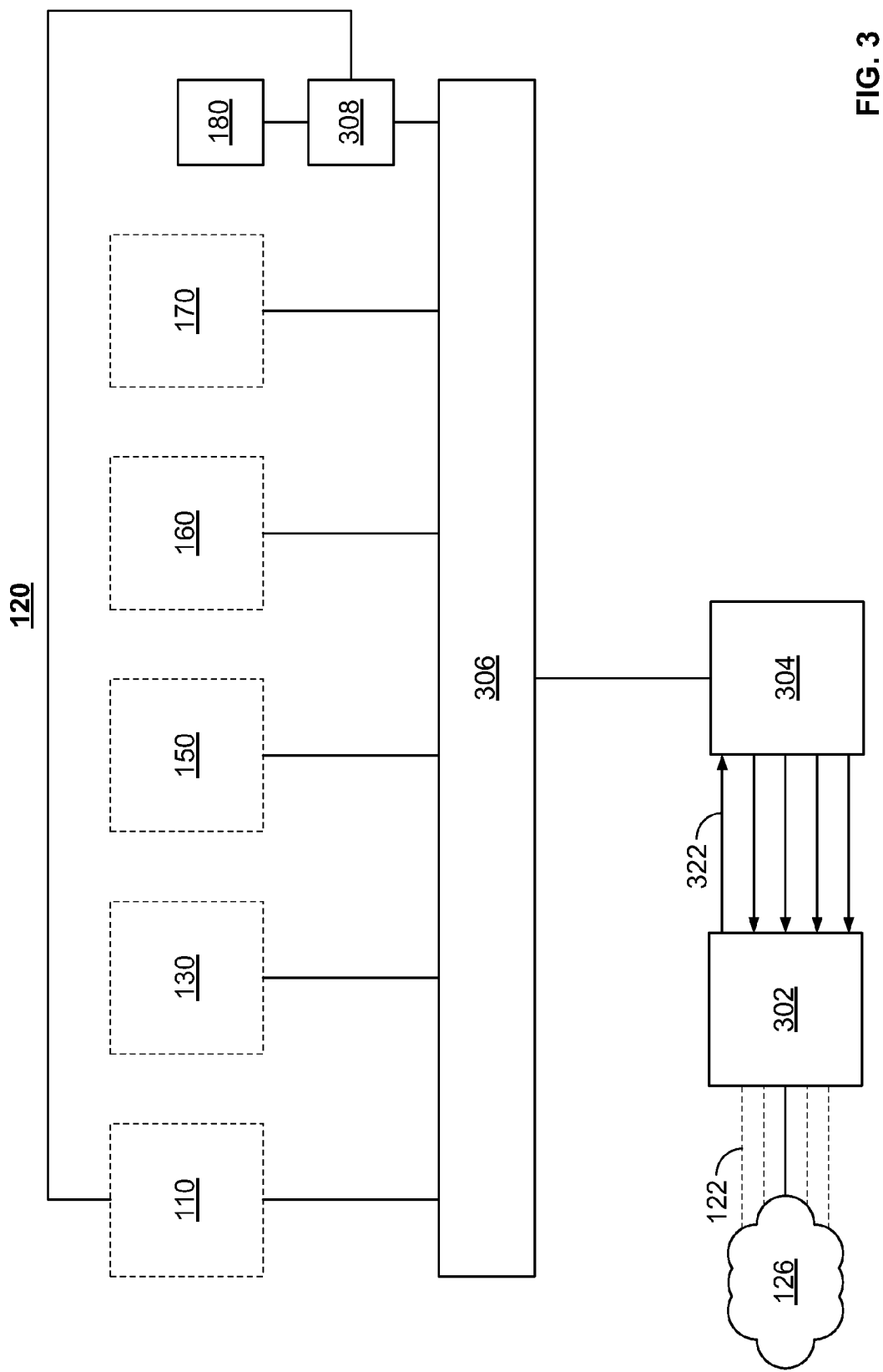
FIG. 3 is a schematic of a network subsystem of a PCS, in accordance with some embodiments.

FIG. 3 shows a schematic of a network subsystem 120, in accordance with some embodiments. In one embodiment, network subsystem 120 includes a fiber junction box 302, a service delivery switch 304, and a network switch 306. In the example of FIG. 3, data link 122 includes one or more optical fibers. Fiber junction box 302 may optically couple the optical fibers of data link 122 to one or more internal optical fibers 322. In some embodiments, fiber junction box 302 includes one or more quick disconnect devices, whereby the optical fibers of data link 122 may be protected from damage if PCS 100 is separated from its footing. Service delivery switch 304 may convert the optical signals received on optical fibers 322 into electrical signals representing network traffic (e.g., Ethernet packets), and provide that network traffic to network switch 306. Likewise, service delivery switch 304 may convert the network traffic (e.g., Ethernet packets) received from network switch 306 into optical signals, and provide those optical signals to fiber junction box 302. Network switch 306 may switch network traffic between PCS subsystems, or between a PCS subsystem and network 126. In some embodiments, network switch 306 is an Ethernet switch. Network switch 306 may be powered by power distribution subsystem 110.

In some embodiments, network subsystem 120 includes a power-over-Ethernet (POE) injector 308. The POE injector 308 may provide power to one or more PCS subsystems, including, without limitation, communications subsystem 180.

Returning to FIG. 1, maintenance subsystem 130 runs maintenance diagnostics on components of PCS 100. In some embodiments, maintenance subsystem 130 performs tests on the PCS's components and/or initiates self-tests of the PCS's components. Such tests may be performed periodically (e.g., daily, weekly, monthly, etc.), intermittently, randomly or at other suitable times. Alternatively or in addition, components of PCS 100 may perform such tests in response to commands received via network subsystem 120 (e.g., commands issued by a PCS operator via network 126 or via communications subsystem 180), or in response to other suitable events.

Based on the results of such tests, maintenance subsystem 130 may determine whether a tested component is operating properly. If a tested component is not operating properly, maintenance subsystem 130 may output data describing the component's malfunction (e.g., transmit an error code to a PCS operator via network 126 or communications subsystem 180, display an error message via display subsystem 170 or user interface subsystem 150, etc.), take action to resolve the malfunction (e.g., reboot the malfunctioning component), turn off power to the faulty component or to the entire PCS (e.g., if the malfunction presents a safety hazard), etc.

In some embodiments, maintenance subsystem 130 may be adapted to control or adjust the operation of power distribution subsystem 110, for safety purposes or other suitable purposes. As described above, if a safety hazard is detected, maintenance subsystem 130 may control power distribution subsystem 110 to deactivate the PCS 100 or the unsafe component(s). Alternatively, maintenance subsystem 130 may control power distribution subsystem 110 to "power cycle" or "reboot" a malfunctioning component.

Figure 4:
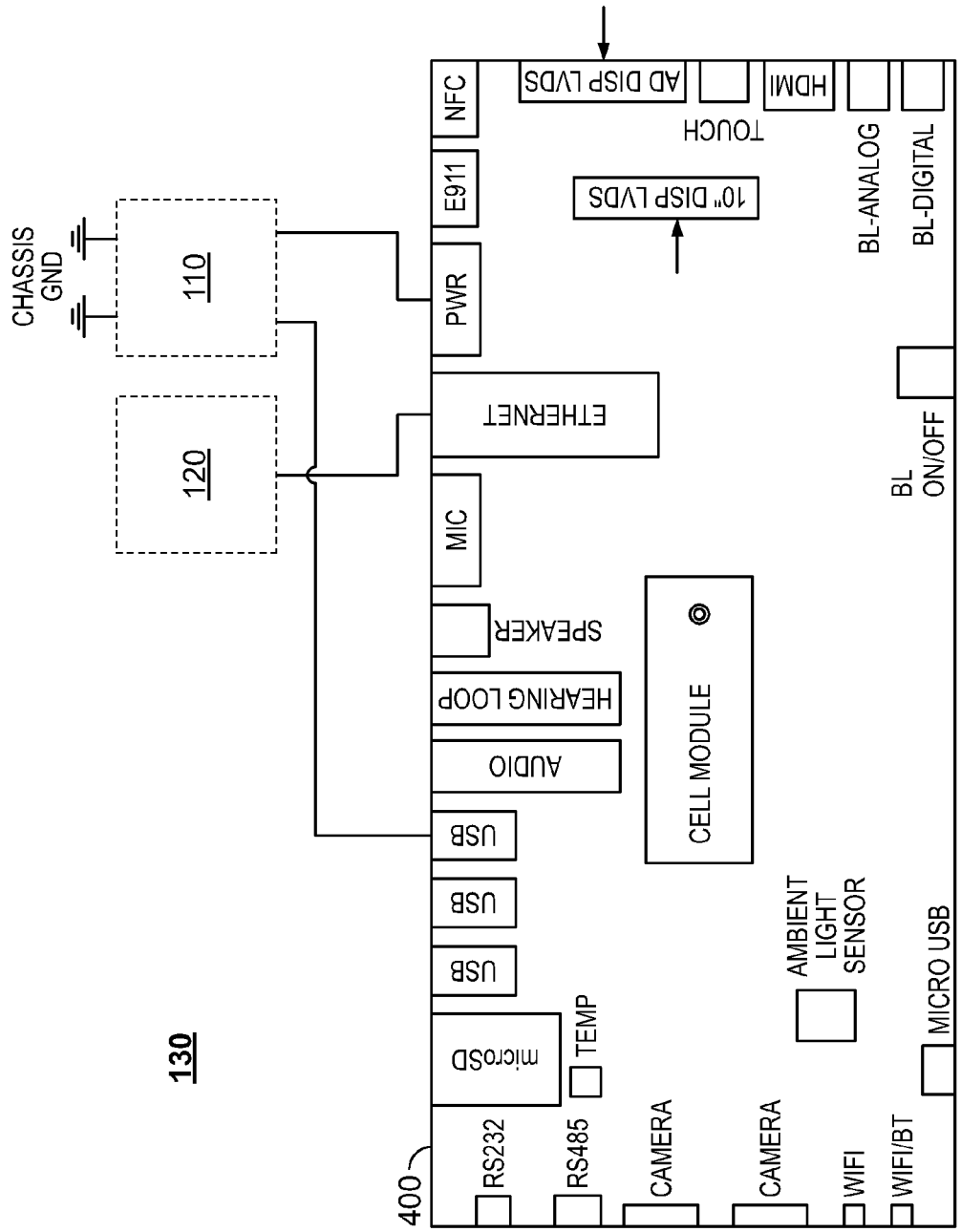
FIG. 4 is a schematic of a maintenance subsystem of a PCS, in accordance with some embodiments.

FIG. 4 shows a schematic of a maintenance subsystem 130, in accordance with some embodiments. In various embodiments, maintenance subsystem 130 includes one or more processing devices 400. The processing device(s) may include, without limitation, a microprocessor, microcontroller, small-board computer, system on a chip (SoC) (e.g., Qualcomm Snapdragon, Nvidia Tegra, Intel Atom, Samsung Exynos, Apple A7, Motorola X8, etc.), or other suitable processing device. The processing device(s) 400 may communicate with other components of PCS 100 via network subsystem 120 to perform maintenance tasks, or for other suitable purposes. In some embodiments, processing device(s) 400 are powered by power distribution subsystem 110.

Returning to FIG. 1, in addition to power distribution subsystem 110, network subsystem 120, and/or maintenance subsystem 130, electronics subsystem 140 may include other components. In some embodiments, electronics subsystem 140 includes one or more illumination controllers, which control illumination of one or more lights coupled to or proximate to the PCS. When lit, the lights controlled by the illumination controller may illuminate user interface subsystem 150 or other portions of PCS 100. In some embodiments, electronics subsystem 140 includes one or more sensor controllers, which control one or more sensor devices (e.g., microphones, cameras, ambient light sensors, pressure sensors, voltage sensors, environmental sensors, accelerometers, etc.). Such sensors may be used for any suitable purpose, including, without limitation, adjusting the brightness of displays and/or lights based on ambient lighting, surveilling the region proximate to the PCS (e.g., when an attempt to gain unauthorized access to the PCS is detected), etc.

Figure 5:
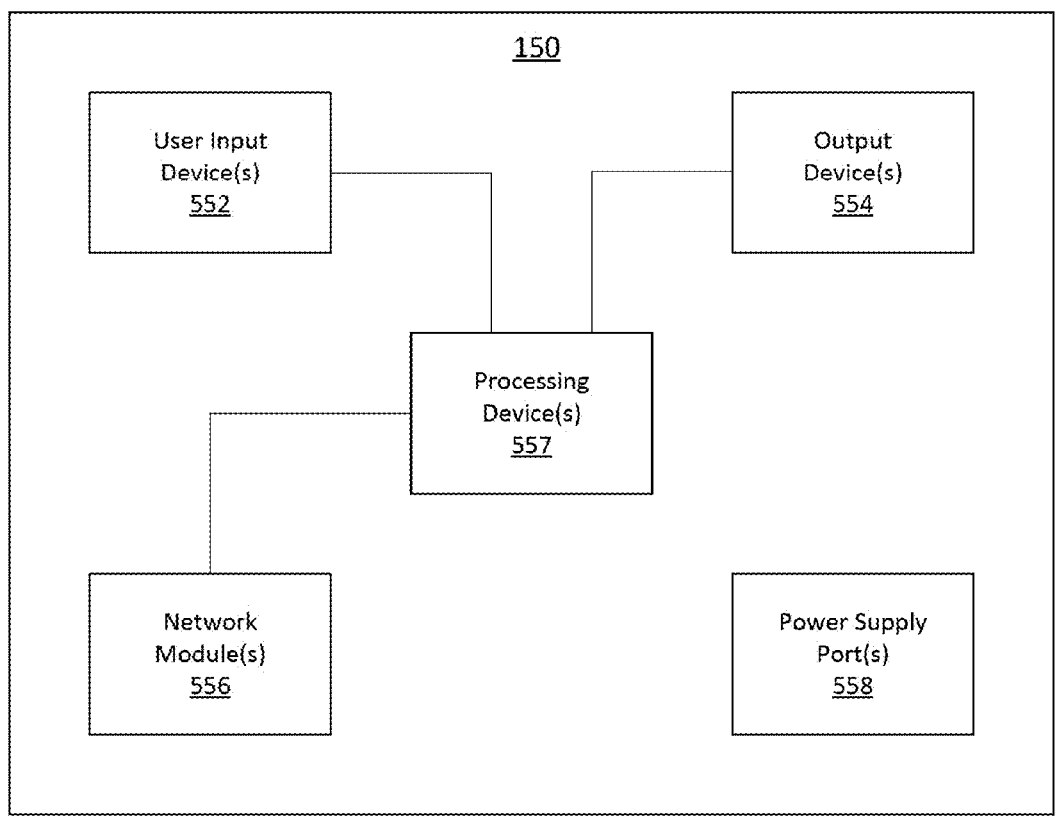
FIG. 5 is a block diagram of a user interface subsystem of a PCS, in accordance with some embodiments.

User interface subsystem 150 provides an interactive user interface, which may be used to access a communication network. Referring to FIG. 5, user interface subsystem 150 may include one or more user input devices 552, output devices 554, network modules 556 (e.g., network interface controllers, wireless transceivers, etc.), processing devices 557, and/or power supply ports 558. The user input device(s) 552 may include, without limitation, a touchscreen, touchpad, keyboard, keypad, trackball, one or more microphones, camera, buttons, switches, etc. The output device(s) 554 may include, without limitation, a display unit (e.g., touchscreen, LCD display, etc.), light(s), speaker(s), audio jack(s) (e.g., headset jacks, including microphone), etc. The one or more network modules 556 may include, without limitation, a 3G mobile network transceiver, 4G mobile network transceiver, LTE mobile network transceiver, Wi-Fi transceiver, RFID reader, Bluetooth transceiver, Near Field Communication (NFC) transceiver, Ethernet adapter, etc. In some embodiments, at least one of the network modules 556 may be configured to access network 126 via network subsystem 120 or to access a communication network via communications subsystem 180. The one or more processing devices may include, without limitation, a microprocessor, microcontroller, small board computer, or system on a chip (SoC) (e.g., Qualcomm Snapdragon, Nvidia Tegra, Intel Atom, Samsung Exynos, Apple A7, Motorola X8, etc.). The one or more power supply ports 558 may include, without limitation, one or more USB charging ports, a two-prong or three-prong AC power outlet (e.g., providing current limited AC power at 120 V, 60 Hz), etc.

User interface subsystem 150 may enhance users' access to communication networks in several ways. In some embodiments, user interface subsystem 150 may provide users access to communication networks (e.g., the Internet) via network module(s) 556. For example, a user may provide inputs via user input device(s) 552 to control a web browser or other network-based application executing on processing device(s) 557, which may access a communication network via network module(s) 556. The data obtained from the communication network may be processed by processing device(s) 557 and provided to the user via output device(s) 554. As another example, a user may connect a computing device (e.g., a mobile computing device) to user interface subsystem 150 via a network module 556 (e.g., a Wi-Fi access point), and access a communication network via another network module 556 (e.g., a mobile network transceiver), via communications subsystem 180, or via network 126. As yet another example, users may charge mobile computing devices via power supply port(s) 558, and access communication networks through the charged devices.

In some embodiments, PCS 100 includes an assisted listening unit that transmits the PCS's audio outputs to hearing assistance devices (e.g., hearing aids, Cochlear implants, etc.) within the assisted listening unit's range via a "hearing loop" (e.g., an "audio induction loop" or "audio-frequency induction loop"). The assisted listening unit may include a loop coil and a loop amplifier adapted to drive amplified signals into the loop coil, thereby creating a magnetic field that delivers the amplified signals to hearing assistance devices within the unit's range. The loop coil may be included in or located proximate to user interface subsystem 150, or disposed at another suitable location in, on, or near PCS 100.

In some embodiments, user interface subsystem 150 includes an interface for adjusting the assisted listening unit (e.g., for increasing or decreasing the signal strength or range of the assisted listening unit). The assisted listening unit's interface may include, without limitation, one or more buttons, dials, switches, and/or software-based interfaces. By adjusting the assisted listening unit, a user may control the range of the assisted listening unit and/or the volume of the audio output provided by the assisted listening unit.

In some embodiments, user interface subsystem 150 includes interface components for placing a phone call. User interface subsystem may implement the phone calls using voice-over-IP (VOIP) technology. The user's speech may be captured via the user interface subsystem's microphone, and the speech of other parties to the phone call may be provided via the user interface subsystem's speaker(s). In some embodiments, the user interface subsystem 150 permits users to place phone calls to emergency responders (e.g., E911 calls). The E911 calls may be placed using VOIP technology (e.g., via a network module 556 of user interface 150, via communications subsystem 180, or via network 126) or another suitable technology.

In some embodiments, the user input devices 552 include a microphone system, and the processing device 557 is able to perform noise cancellation on the microphone system. It can be appreciated that the PCS may be located in an environment with high levels of ambient street noise. The processing device 557 may perform a noise cancelling process that distinguishes the user's speech from the background noise and removes at least some of the background noise from the audio stream. When a user plugs in a headset that contains a microphone, the noise cancellation technique may also detect and remove background noise picked up by the headset's microphone.

Figure 6:
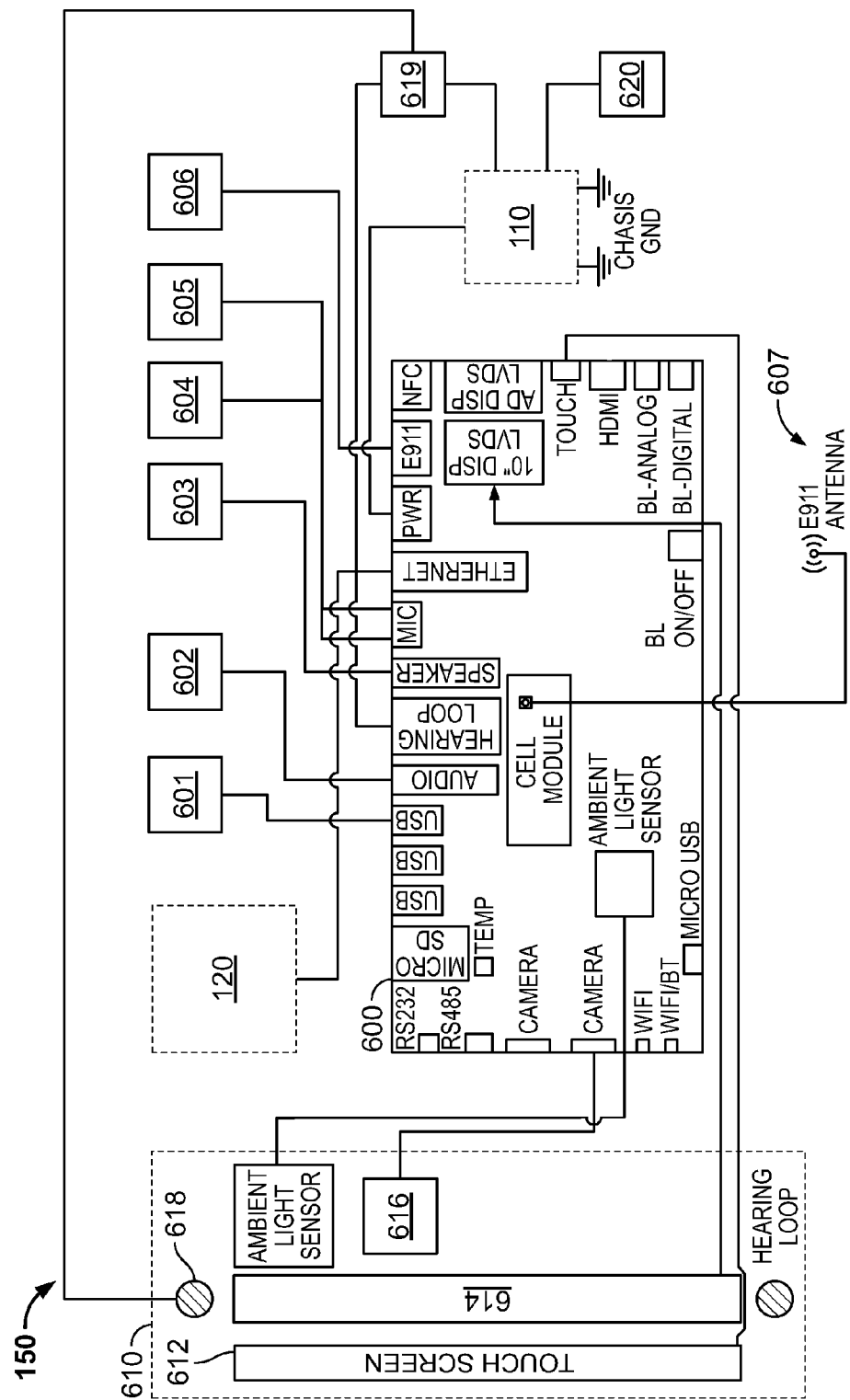
FIG. 6 is a schematic of a user interface subsystem of a PCS, in accordance with some embodiments.

FIG. 6 shows an exemplary schematic of the user interface subsystem 150, in accordance with some embodiments. In some embodiments, user interface subsystem 150 includes one or more processing devices 600. The processing device(s) 600 may include, without limitation, a microprocessor, microcontroller, small-board computer, system on a chip (SoC) (e.g., Qualcomm Snapdragon, Nvidia Tegra, Intel Atom, Samsung Exynos, Apple A7, Motorola X8, etc.), or other suitable processing device. The processing device(s) 600 may communicate with other components of PCS 100 via network subsystem 120. In some embodiments, processing device(s) 600 are powered by power distribution subsystem 110.

In the example of FIG. 6, user interface subsystem 150 includes a keypad 601, headset jack 602, speaker 603, two microphones (604, 605), and an E911 button 606, all of which are coupled to the processing device(s) 600. Processing device(s) 600 may be adapted to initiate an E911 communication when E911 button 606 is pressed, and to send and receive E911 messages via a wireless communication module 607 (e.g., a 3G, 4G, or LTE mobile network transceiver, including a suitable antenna, which may be located proximate to the top of the PCS).

In some embodiments, the E911 button contains an indicator. One example of the indicator is an illumination ring. The illumination ring may help a user to locate the button at night, and/or may flash when a user presses the button to indicate a E911 call is in progress.

In the example of FIG. 6, user interface subsystem 150 includes a touchscreen 612, display 614, camera 616, hearing loop coil 618, hearing loop amplifier 619, and USB charging port(s) 620. In some embodiments, the touchscreen 612, display 614, camera 616, and hearing loop coil 618 may be packaged together in a tablet computing device 610. The USB charging port(s) 620 and hearing loop amplifier 619 may be powered by power distribution subsystem 110.

Returning to FIG. 1, temperature control subsystem 160 controls the temperature within PCS 100. For example, temperature control subsystem 160 may cool the components of PCS 100. Some of the PCS's components generate heat and the PCS 100 may absorb heat from its environment (e.g., via radiation or convection), particularly when the ambient temperature is high or the PCS is exposed to direct sunlight. Extreme heat can interfere with the operation of the PCS or even permanently damage some of the PCS's components.

Alternatively or in addition, temperature control system 160 may, under appropriate conditions, heat the components of PCS 100. Some PCSs may be located in cold environments (e.g., outdoors in regions with cold ambient temperatures). Like extreme heat, extreme cold can interfere with the PCS's operation or damage its components.

Temperature control subsystem 160 may include one or more components suitable for heating and/or cooling the PCS. In some embodiments, temperature control subsystem 160 includes one or more fans operable to circulate ambient air through the PCS, which can cool the PCS. In some embodiments, the PCS 100 includes one or more heat sinks, and the ambient air circulated by temperature control subsystem 160 passes proximate to the heat sink(s). In some embodiments, temperature control subsystem 160 includes one or more fans operable to recirculate air in portions (e.g., airtight compartments) of PCS 100, which can facilitate the transfer of heat from those portions of the PCS to other regions of the PCS and/or to the ambient environment. The fans may be single-speed fans or variable-speed fans. In some embodiments, temperature control subsystem 160 includes one or more heaters, which can heat the PCS. In some embodiments, one or more fans and/or heaters are located apart from temperature control subsystem 160, but controlled by the temperature control subsystem.

Temperature control subsystem 160 may control the PCS's temperature by controlling the operation of the fan(s) and/or heater(s). In some embodiments, temperature control subsystem 160 controls the PCS's temperature based, at least in part, on the temperature inside or in an area proximate to the PCS. Temperature control subsystem 160 may obtain temperature information regarding the temperature in or near PCS 100 from one or more temperature sensors. The temperature sensors may be located inside the PCS, on an outer surface of the PCS, proximate to the PCS, and/or in any other suitable location. Temperature control subsystem 160 may include one or more sensor drivers that can activate the sensor(s) and obtain temperature measurements from the sensor(s). Alternatively or in addition, temperature control subsystem may obtain temperature information regarding the temperature in the vicinity of the PCS from a suitable source (e.g., a website) via a communication network (e.g., network 126).

In some embodiments, the temperature control system 160 adds or removes active fans (e.g. switches fans on or off) in specific areas of the PCS based on the temperature sensor information. For example, active fans may be added when the ambient temperature is high (e.g., above a threshold). Conversely, active fans may be removed when the ambient temperature is low (e.g., below a threshold) to reduce power usage. The fans may be organized in addressable groups to facilitate addition and removal of active fans.

In some embodiments, the temperature control subsystem 160 uses a feedback-based control system (e.g., a feedback loop) to control the speeds of the fans. The fans may include tachometers, and the tachometer outputs may be fed back to the temperature control subsystem, which may use the tachometer outputs to determine the speeds of the fans. In addition to adding and removing active fans, the temperature control subsystem 160 may increase the speeds of the fans as the internal temperature increases or decrease the speeds of the fans as the temperature decreases.

In some embodiments, the temperature control subsystem 160 uses the fan tachometer output to determine whether a fan fault has occurred. For example, the temperature control subsystem 160 may detect a fan fault when the tachometer output indicates that there is little or no fan rotation (e.g., the rate of fan rotation is below a threshold). When a fan fault is detected, the PCS may notify the maintenance center of the fault, so the PCS can be serviced to replace or repair the faulty fan.

In some embodiments, temperature control subsystem 160 controls the PCS's temperature based on environmental information, which may include temperature information and/or other information associated with the PCS's environment. For example, environmental information may include sunlight information indicating whether the PCS is exposed to direct sunlight. Sunlight information may be obtained from a camera or other suitable optical sensor. Alternatively or in addition, environmental information may include humidity information indicating the humidity levels in the PCS's environment, time-of-day information indicating the current time at the PCS's location, weather information indicating the weather in the PCS's environment, etc.

Based on the environmental information, temperature control subsystem 160 may control the fan(s) and/or heater(s) to adjust the PCS's temperature. In some embodiments, temperature control subsystem 160 may activate one or more heaters when the PCS's temperature is below a lower threshold temperature, and/or activate one or more fans when the PCS's temperature is above an upper threshold temperature. In some embodiments, the number of heater units and/or fans activated by temperature control subsystem 160 is determined based on the environmental information. In some embodiments, the settings of the activated heaters and/or fans (e.g., the fan speeds, the heater temperatures, etc.) may be determined based on the environmental information. In some embodiments, if the temperature in the PCS is determined to be outside a safe operating range, temperature control subsystem may instruct power distribution subsystem 110 to deactivate the PCS or at least one component thereof.

Display subsystem 170 includes one or more display modules, each of which includes at least one display device. The display device may include, without limitation, a liquid crystal display (LCD), light-emitting diode (LED) display, organic light-emitting diode (OLED) display, cathode ray tube (CRT), electroluminescent display (ELD), electronic paper/electronic ink display (e.g., a bi-stable or multi-stable electrophoretic or electro-wetting display), plasma display, thin-film transistor (TFT) display, 3D display (e.g., volumetric display, holographic display, integral imaging display, compressive light field display, etc.), stereoscopic display, etc. In some embodiments, display subsystem 170 includes two display modules disposed on opposite sides of the PCS, such that the modules' display devices face in opposite directions.

A display device may display suitable information, including, without limitation, news information, weather information, emergency information (e.g., instructions for dealing with an emergency, evacuation routes, etc.), travel information (e.g., traffic conditions, road conditions, speed limits, alternative route information, public transit schedules, locations of and/or directions to public transportation facilities, etc.), tourism information (e.g., locations of and/or directions to popular tourist attractions), advertisements, etc. The displayed information may be displayed in one or more suitable formats, including, without limitation, text, still images, and/or video. Display subsystem 170 may include one or more processing devices adapted to control the display of information by the display device(s). For example, each display module may include a processing device adapted to control the display module's display device.

In some embodiments, display subsystem 170 includes one or more cameras. For example, each display module may include one or more cameras. Display subsystem 170 may use the cameras to determine the ambient light levels, and may adjust the brightness of the display device(s) accordingly. For example, if the ambient light level at the PCS is high (e.g., because the sun is shining on the PCS), display subsystem 170 may increase the brightness of the display(s) (e.g., by increasing the brightness of the display backlight(s)), so that the displayed information is readily viewable by onlookers or passers-by. On the other hand, if the ambient light level at the PCS is low, display subsystem 170 may decrease the brightness of the display(s), to reduce the display subsystem's power usage and/or heat generation. In some embodiments, the brightness levels of the PCS's displays may be controlled independently.

Alternatively or in addition, display subsystem 170 may use the cameras to obtain information about "potential viewers" (e.g., people viewing the PCS, viewing a display device of the PCS, using the PCS, and/or in the vicinity of the PCS). In some embodiments, display subsystem 170 may determine, based on images of the area proximate to the PCS (e.g., images acquired by the PCS's camera(s)), a potential viewer's apparent demographic information, including, without limitation, age, sex, race/ethnicity, etc. In some embodiments, display subsystem 170 may use facial-recognition techniques to determine a potential viewer's identity.

Display subsystem 170 may use information about the PCS's potential viewers to select the information to be displayed by the display device(s) (e.g., to select advertisements for display based on the identities or demographics of the potential viewers). Alternatively or in addition, display subsystem 170 may track the identities and/or demographics of the potential viewers who have been in the vicinity of the PCS when particular advertisements have been displayed. Tracking information about potential viewers of advertisements and/or controlling the display of advertisements based on information about the potential viewers may increase the value of the PCS's advertising impressions to potential advertisers.

Display subsystem 170 may obtain information about a potential viewer from the potential viewer, from analysis of images of the potential viewer, and/or from the potential viewer's computing device (e.g., smartphone). For example, a potential viewer who connects to a communication network through a PCS 100 (e.g., via user interface subsystem 150 or via the user's computing device) may provide authentication data (e.g., a username, password, and/or other credentials), and the PCS may use that authentication data to access the potential viewer's account information, which may identify the potential viewer and/or provide information about the potential viewer (e.g., the potential viewer's attributes and/or interests). The potential viewer may have provided such information when registering for access to the PCS (or set of PCSs), or the PCS may have inferred such information based on the potential viewer's activities on the communication network.

Even if potential viewers do not register for PCS access, information about a potential viewer's attributes and/or interests can still be inferred based on the potential viewer's activities, and this information can be tracked in connection with information identifying the potential viewer's computing device (e.g., a mobile device's phone number, mobile equipment identifier (MEID), or unique device identifier (UDID); a computing device's media access control (MAC) address; etc.). In some embodiments, a PCS 100 may identify a potential viewer or attributes thereof based on identifying information transmitted by the potential viewer's computing device when the computing device is within range of the PCS, even if the computing device is not connected to a network via the PCS 100.

Figure 7:
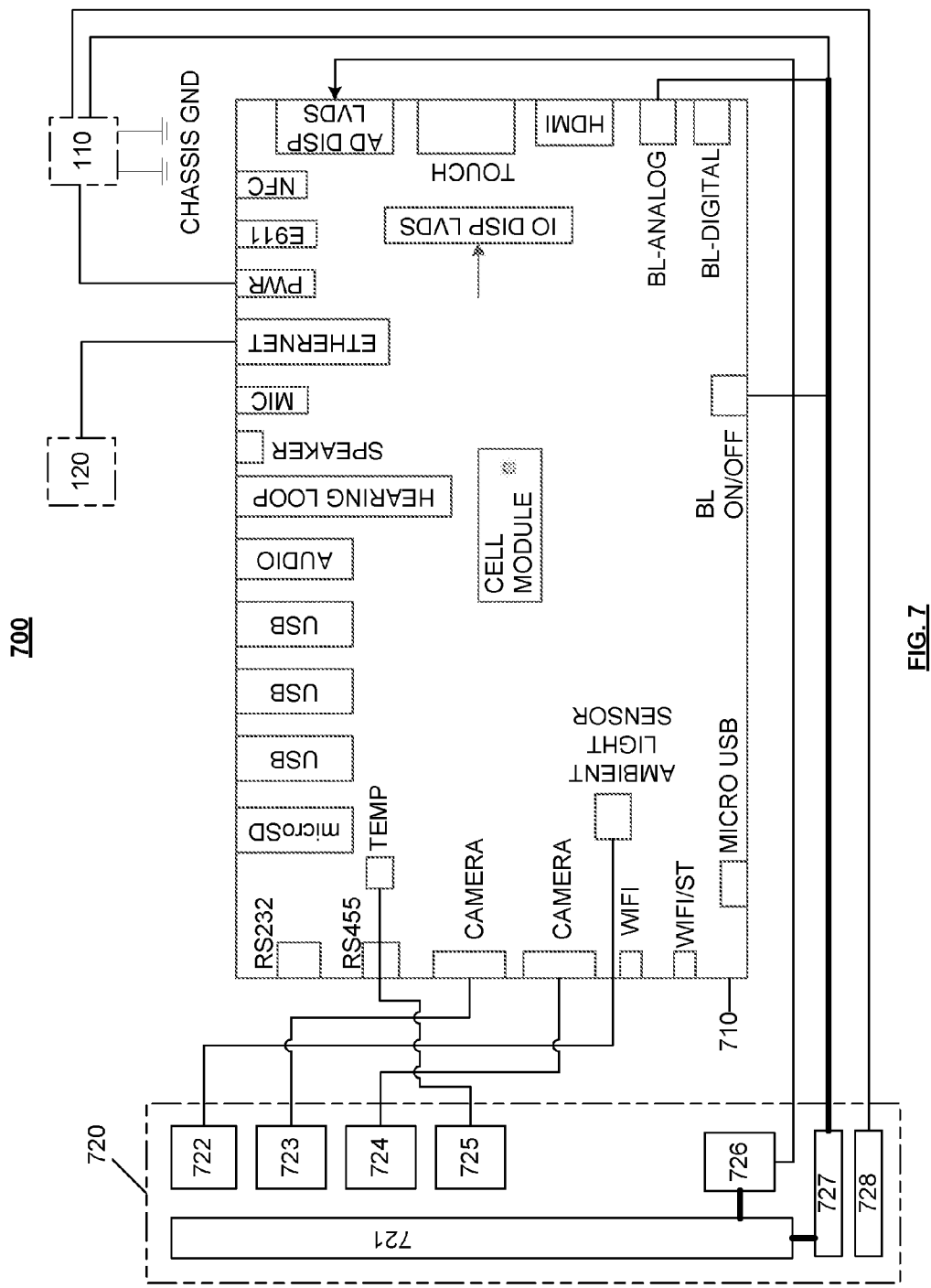
FIG. 7 is a schematic of a display module of a PCS, in accordance with some embodiments.

FIG. 7 is a schematic of a display module 700, in accordance with some embodiments. In some embodiments, a PCS 100 includes two display modules 700. In some embodiments, a display module 700 includes one or more processing device(s) 710. Each processing device 710 may include, without limitation, a microprocessor, microcontroller, small-board computer, system on a chip (SoC) (e.g., Qualcomm Snapdragon, Nvidia Tegra, Intel Atom, Samsung Exynos, Apple A7, Motorola X8, etc.), or other suitable processing device. The processing device(s) 710 may communicate with other components of PCS 100 via network subsystem 120. In some embodiments, each processing device 710 is powered by power distribution subsystem 110. In the example of FIG. 7, display module 700 also includes a display device 720. Display device 720 may include a display panel 721, ambient light sensor 722, two cameras (723, 724), temperature sensor 725, frame rate controller 726, power/backlight controller 727, and one or more fans 728.

In some embodiments, the processing device 710 is able to read the ambient light sensor 722 and send a control signal to the power/backlight controller 727. One example of the control signal is a pulse width modulated (PWM) output. In response to the ambient light sensor 722 detecting the presence of high ambient light, the duty cycle of the PWM signal may be increased, thereby causing the power/backlight controller to increase the backlight brightness, so that the display image is viewable in bright sunlight. Those skilled in the art can appreciate that the PWM control signal may be digital or converted to an analog output via a digital to analog converter.

Returning to FIG. 1, communications subsystem 180 includes one or more communication modules. In some embodiments, the communication module(s) include one or more radio access nodes. The radio access node(s) may include small cells (e.g., low-power radio access nodes with ranges between roughly 10 m and 1-2 km, including, but not limited to, femtocells, picocells, and microcells), macrocells (e.g., radio access nodes with ranges of up to a few tens of kilometers), etc. The radio access node(s) may reduce congestion in mobile data networks (e.g., 3G, 4G, or LTE networks) by expanding network capacity and offloading traffic from more congested portions of the network to the portions of the network associated with the radio access node(s). In areas where mobile data networks are highly congested (e.g., portions of New York City, and particularly portions of Manhattan), deploying PCSs with radio access node(s) in an area where mobile data networks are congested may, in some embodiments, greatly reduce network congestion and improve quality of service for many network users.

In some embodiments, communications subsystem 180 includes at least one wireless access point. Computing devices may connect to the wireless access point using a suitable wireless adapter, including, without limitation, a Wi-Fi or WiMAX adapter. Through the wireless access point, communications subsystem 180 may provide access to a local area network (LAN) or wide area network (WAN) (e.g., network 126, or a 3G, 4G, or LTE network accessed via the communications subsystem's radio access node(s)).

PCS operators may use the wireless access points to provide wireless broadband network access to individuals, subscribers, communities, etc. Use of the wireless access points may further improve the quality of service on mobile data networks by offloading some users from the mobile data networks to the wireless access point.

Returning to FIG. 1, mounting subsystem 190 includes a mounting device that releasably secures the PCS to a support (e.g., a footing). The mounting device may be adapted to break when a shear force above a predetermined value is applied to the mounting device, thereby allowing the PCS to move. Such releasable mounting can reduce the damage caused to people and property when an automobile collides with the PCS.

Figure 8:
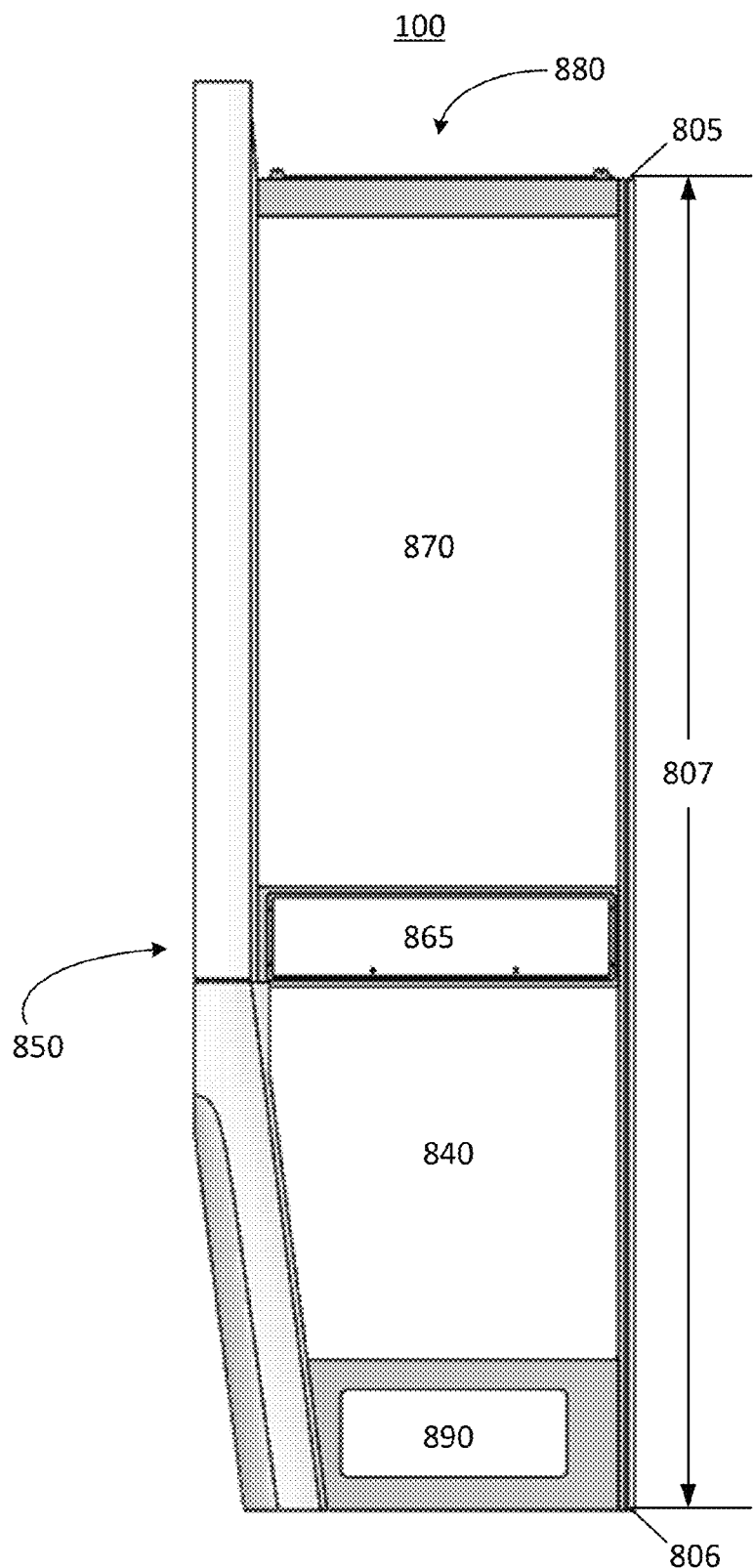
FIG. 8 illustrates an arrangement of compartments of a PCS, in accordance with some embodiments.

PCS 100 may include compartments and components of PCS 100 may be disposed in the compartments. FIG. 8 illustrates an arrangement of compartments of a PCS 100, according to some embodiments. For convenience, the PCS's top portion 805 and base portion 806 are identified in FIG. 8, as is the PCS's height 807.

In the example of FIG. 8, PCS 100 includes mounting compartment 890, electronics compartment 840, user interface compartment 850, air intake compartment 865, display compartment 870, and communications compartment 880. Electronics compartment 840 may enclose electronics subsystem 140. User interface compartment 850, display compartment 870, and communications compartment 880 may enclose user interface subsystem 150, display subsystem 170, and communications subsystem 180, respectively. In some embodiments, display compartment 870 may enclose, in addition to display subsystem 870, one or more heat sinks. Mounting compartment 890 may enclose at least a portion of a mounting subsystem 190.

Air intake compartment 865 may enclose at least portions of temperature control subsystem 160. In some embodiments, air intake compartment 865 may enclose one or more fans, which may draw ambient air into the air intake area. In some embodiments, the one or more fans may also draw air into the air intake area from electronics compartment 840. The fans may move the air through display compartment 870 (e.g., across one or more heat sinks), and the air may be discharged through an exhaust in communications compartment 880. In some embodiments, air intake compartment 865 may enclose one or more heaters.

In the example of FIG. 8, communications compartment 880 is located proximate to the top 805 of the PCS, display compartment 870 is disposed along an upper portion of the PCS and below communications compartment 880, and an air intake compartment 865 is located proximate to a middle portion of the PCS (in the direction of the PCS's height) and below display compartment 870. Mounting compartment 890 is located proximate a base 806 of the PCS, electronics compartment 840 is disposed along a lower portion of the PCS between mounting compartment 890 and air intake compartment 865, and user interface compartment 850 is disposed along a lower portion of the PCS adjacent to air intake compartment 865 and electronics compartment 840.

Embodiments of a PCS are not limited by the compartmentalization scheme illustrated in FIG. 8. A PCS may include none of the compartments illustrated in FIG. 8, any combination of the compartments illustrated in FIG. 8, and/or other compartments not illustrated in FIG. 8. In cases where a PCS includes a compartment illustrated in FIG. 8 (e.g., mounting compartment 890, electronics compartment 840, user interface compartment 850, air intake compartment 865, display compartment 870, or communications compartment 880), the location and/or shape of that compartment may differ from the location and/or shape of the corresponding compartment in FIG. 8. In some embodiments, a PCS may include a compartment that encloses two or more PCS subsystems that are enclosed by different compartments in the example of FIG. 8. In some embodiments, a PCS may include separate compartments enclosing respective portions of a PCS subsystem that is enclosed by a single compartment in the example of FIG. 8. In some embodiments, a PCS may include a compartment that encloses other compartments.

Figure 9A:
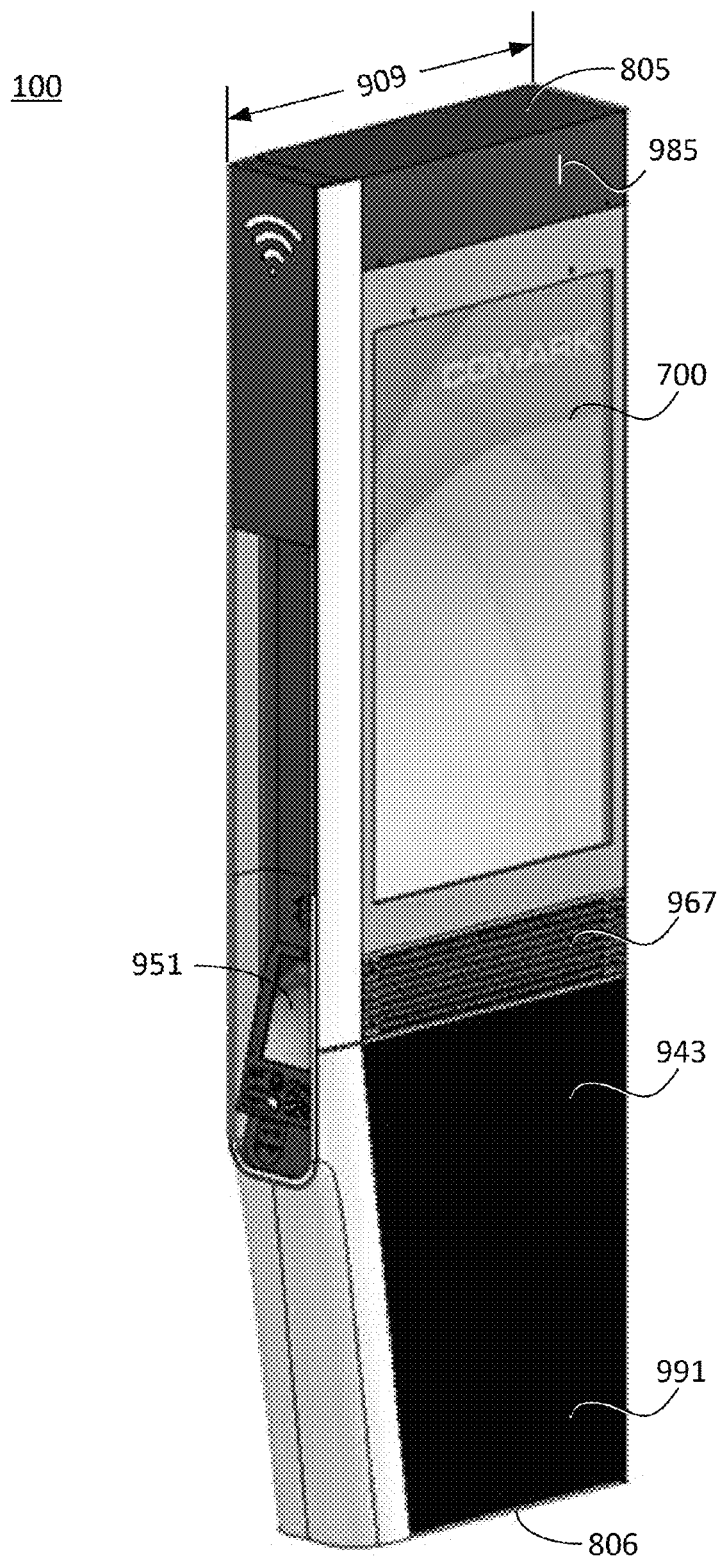
FIGS. 9A, 9B, and 9C show respective front perspective, side, and exploded front perspective views of a PCS, in accordance with some embodiments.
Figure 9B:
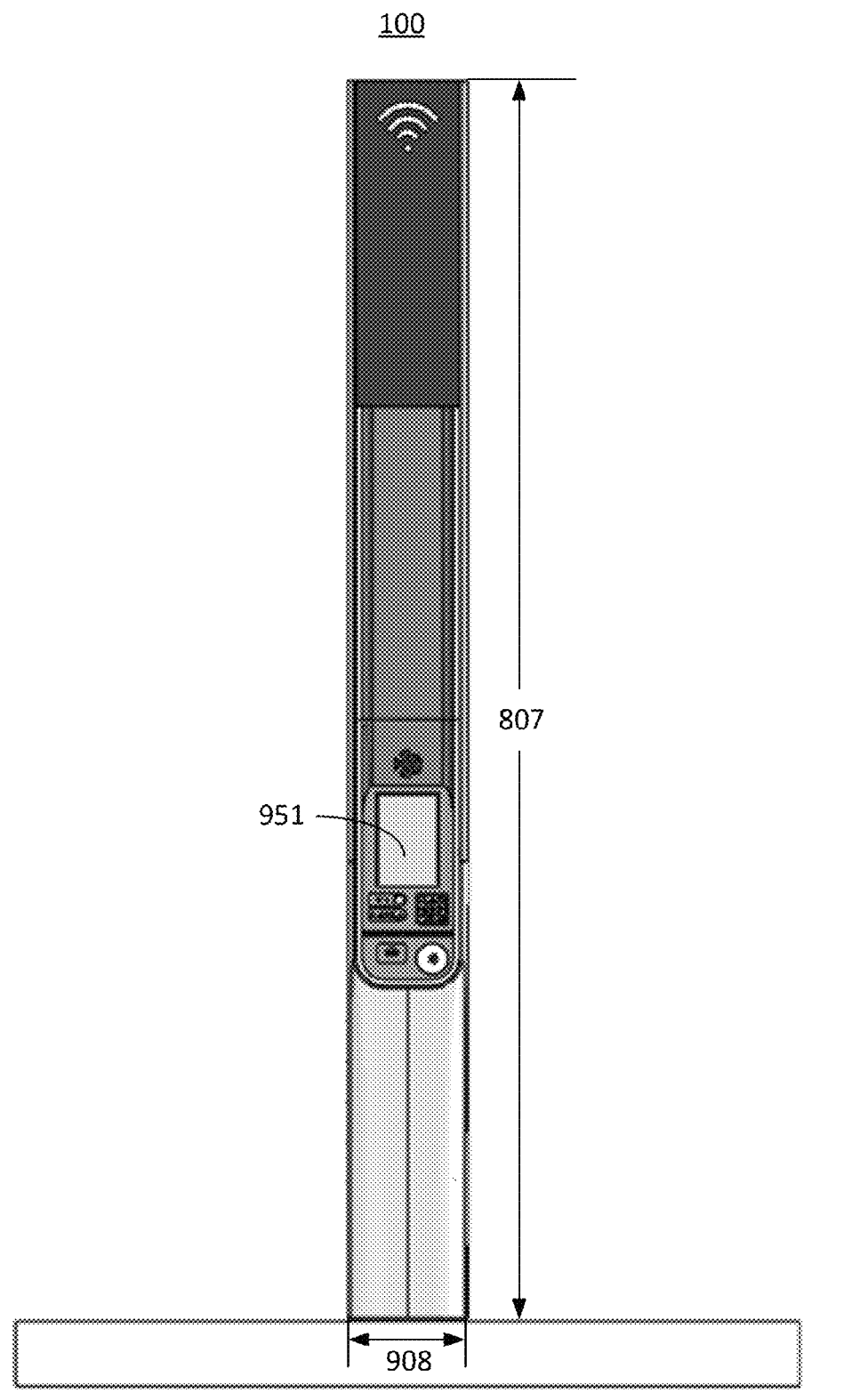
Figure 9C:
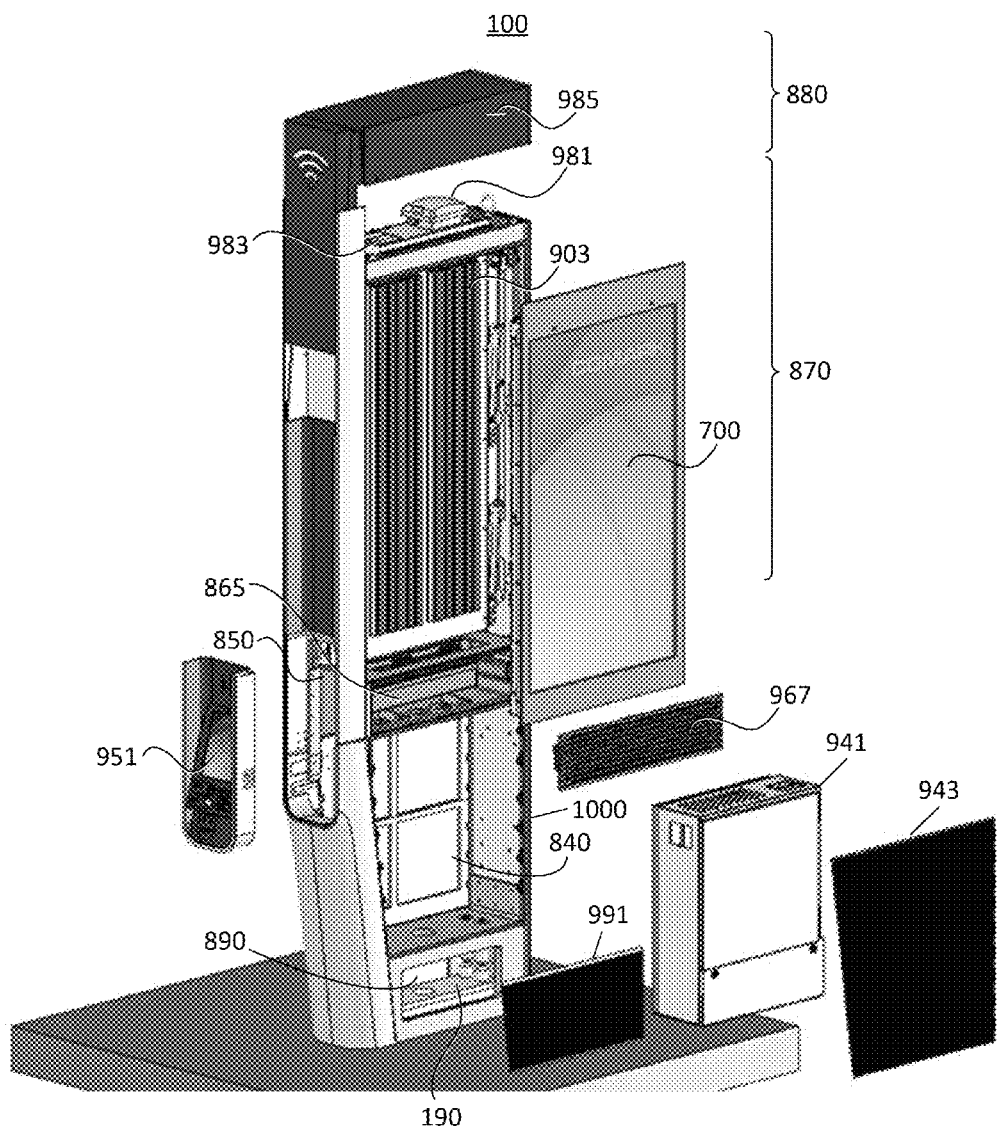

FIGS. 9A, 9B, and 9C show respective front perspective, side, and exploded front perspective views of a PCS 100, in accordance with some embodiments. For convenience, the PCS's top portion 805 and base portion 806 are identified in FIGS. 9A-9B, as are the PCS's height 807, width 908, and length 909.

As can be seen in FIG. 9C, PCS 100 may include a frame 1000. The frame 1000 is (or is part of) a structural system that supports the components of PCS 100. In some embodiments, the frame 1000 forms portions of the PCS's compartments (e.g., communications compartment 880, display compartment 870, air intake compartment 865, user interface compartment 850, electronics compartment 840, and mounting compartment 890).

As can further be seen in FIG. 9C, communications compartment 880 may include a radio access node 981 and a wireless access point 983. The bottom of communications compartment 880 may be formed by a portion of frame 1000, and the top and sides of communications compartment 880 may be formed by a removable cap 985.

Display compartment 870 may include a heat sink 903 and a display module 700. In some embodiments, display compartment 870 includes a second display module (and, optionally, a second heat sink) arranged back-to-back (e.g., in parallel) with display module 700 and heat sink 903, such that display module 700 and the second display module face in opposite directions.

Air intake compartment 865 may include an air intake assembly 967. The air intake assembly 967 may include a grill, a filter, and a fan assembly. User interface compartment 850 may include a user interface device 951. The user interface device 951 may include a table computer, keypad, an emergency call button, microphone(s), speakers, and a mobile device charging port. Electronics compartment 840 may include an electronics cabinet 941, and may be formed by portions of frame 1000 and a cover panel 943. Mounting compartment 890 may at least partially enclose mounting subsystem 190, and may be formed by portions of frame 1000 and a cover panel 991.

Figure 10A:
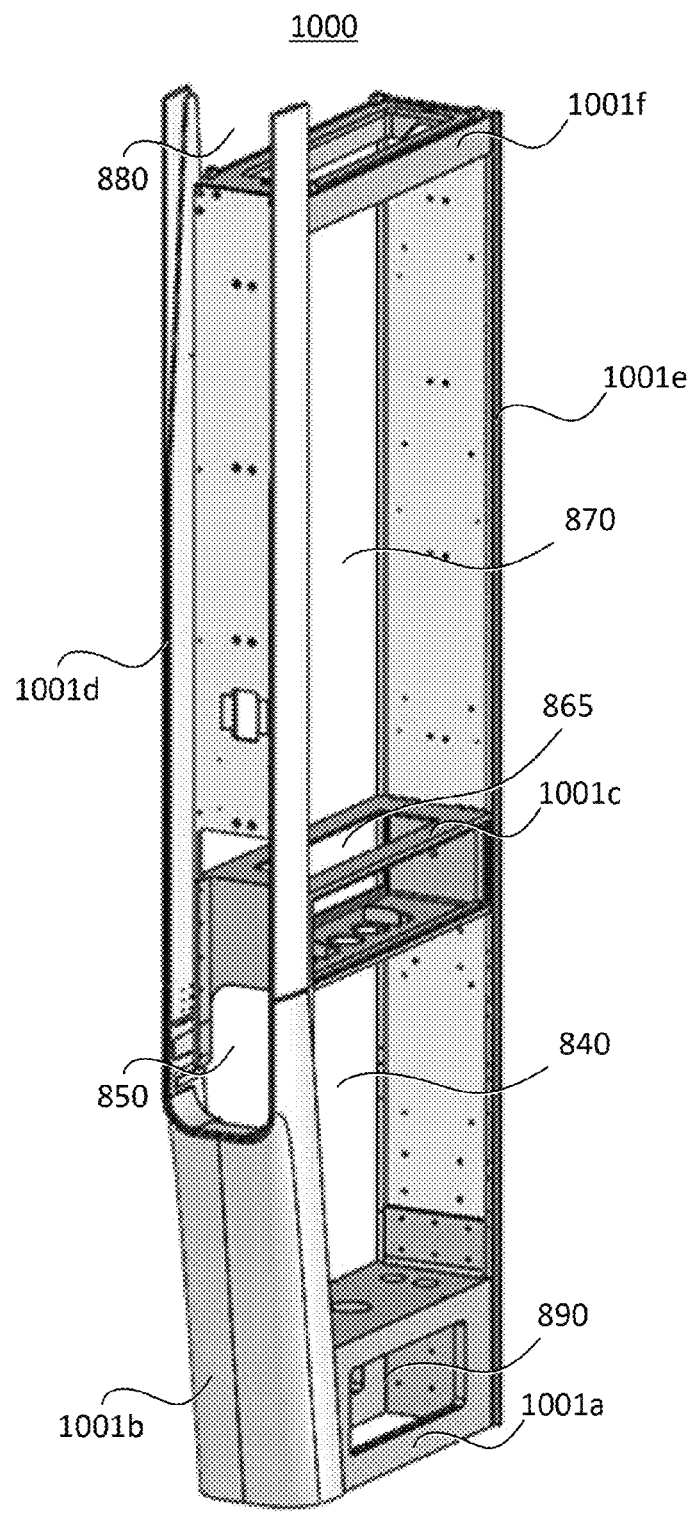
FIGS. 10A, 10B, and 10C show respective side perspective, front perspective, and exploded front perspective views of a frame of a PCS, in accordance with some embodiments.
Figure 10B:
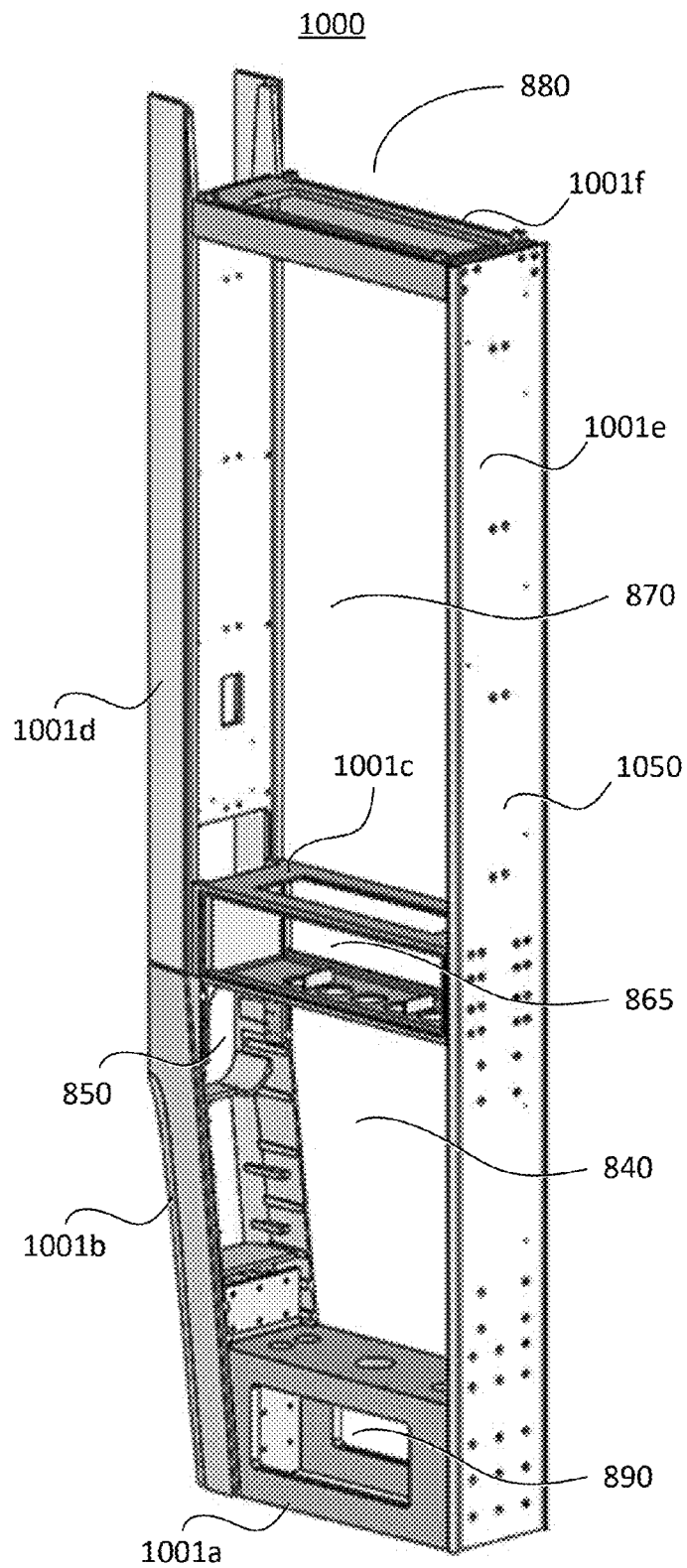
Figure 10C:
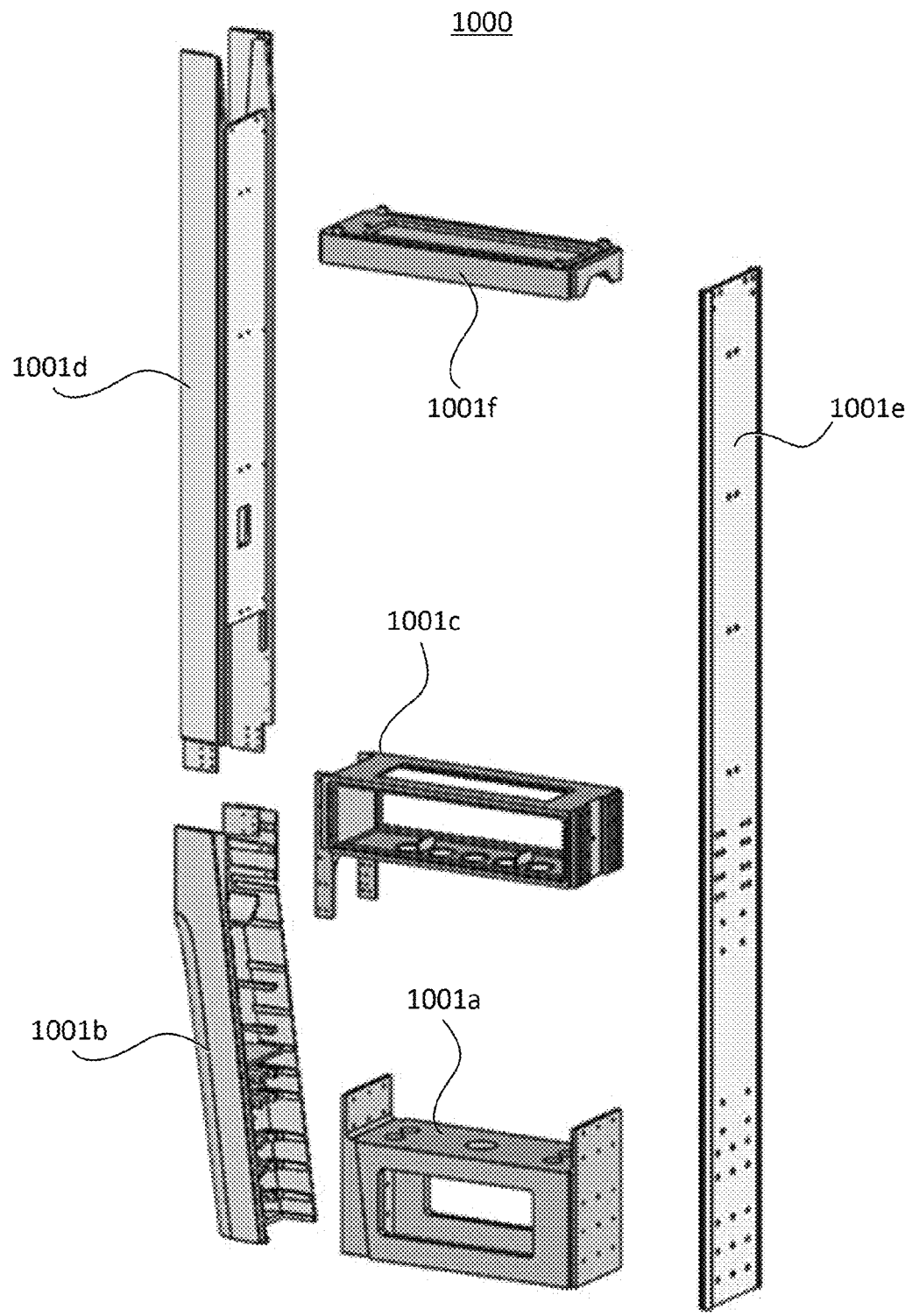

FIGS. 10A-10C show the frame 1000 of a PCS 100, according to some embodiments, and illustrate how the frame 1000 partially forms the PCS's compartments. In some embodiments, the frame 1000 is the frame of a monocoque structure, wherein the frame supports the components, forms the compartments and is also the outer face (or "skin") of portions of the PCS (e.g., the user interface compartment 850 and the opposing side 1050 of the PCS). This approach may simplify construction by reducing the number of brackets, mounting accessories, part count, etc.

In another embodiment, the frame 1000 is that of a traditional structure, and the outer skins are attached to the frame. In such embodiments, the frame supports the components of the PCS, forms the compartments of the PCS, and acts as a rigid structural chassis. One advantage of this approach is field replaceability. If an outer skin is damaged (e.g., by vandalism or by ordinary wear and tear), the damaged skin can be replaced with a new skin. As long as the frame remains uncompromised, damaged outer skins can be removed, replaced, and (optionally) sent to a service facility for refurbishing. Refurbishing methods may include removing dents and/or scratches, sanding, texturing, reshaping, and/or re-painting. Skins that are not suitable for refurbishing (e.g., due to extensive damage) may be recycled and turned into new parts.

As can be seen in FIGS. 10A-10C, frame 1000 may include a bottom member 1001a, a lower front member 1001b, a cross-frame member 1001c, an upper front member 1001d, a rear member 1001e, and a top member 1001f. In the example of FIGS. 10A-10C, lower portions of lower front member 1001b and rear member 1001e are joined to opposite sides of bottom member 1001a. One side of cross-frame member 1001c is joined to an upper portion of lower front member 1001b and a lower portion of upper front member 1001d. The opposite side of cross-frame member 1001c is joined to rear member 1001e proximate to a midpoint between the rear member's top and base ends. The upper portions of upper front member 1001d and rear member 1001e are joined to opposite sides of top member 1001f.

In the example of FIGS. 10A-10C, top member 1001f and the upper portion of upper front member 1001d form a bottom and a side of communications compartment 880. Two sides of display compartment 870 are formed by upper front member 1001d and rear member 1001e, and the top and bottom of display compartment 870 are formed by top member 1001f and cross-frame member 1001c, respectively. Cross-frame member 1001c forms the top, bottom, and two sides of air intake compartment 865. User interface compartment 850 is formed in part by the bottom portion of upper front member 1001d, the top portion of lower front member 1001b, and a side of cross-frame member 1001c. Two sides of electronics compartment 840 are formed by lower front member 1001b and the lower portion of rear member 1001e, and the top and bottom of electronics compartment 840 are formed by cross-frame member 1001c and bottom member 1001a, respectively. Bottom member 1001a forms mounting compartment 890.

Figure 11:
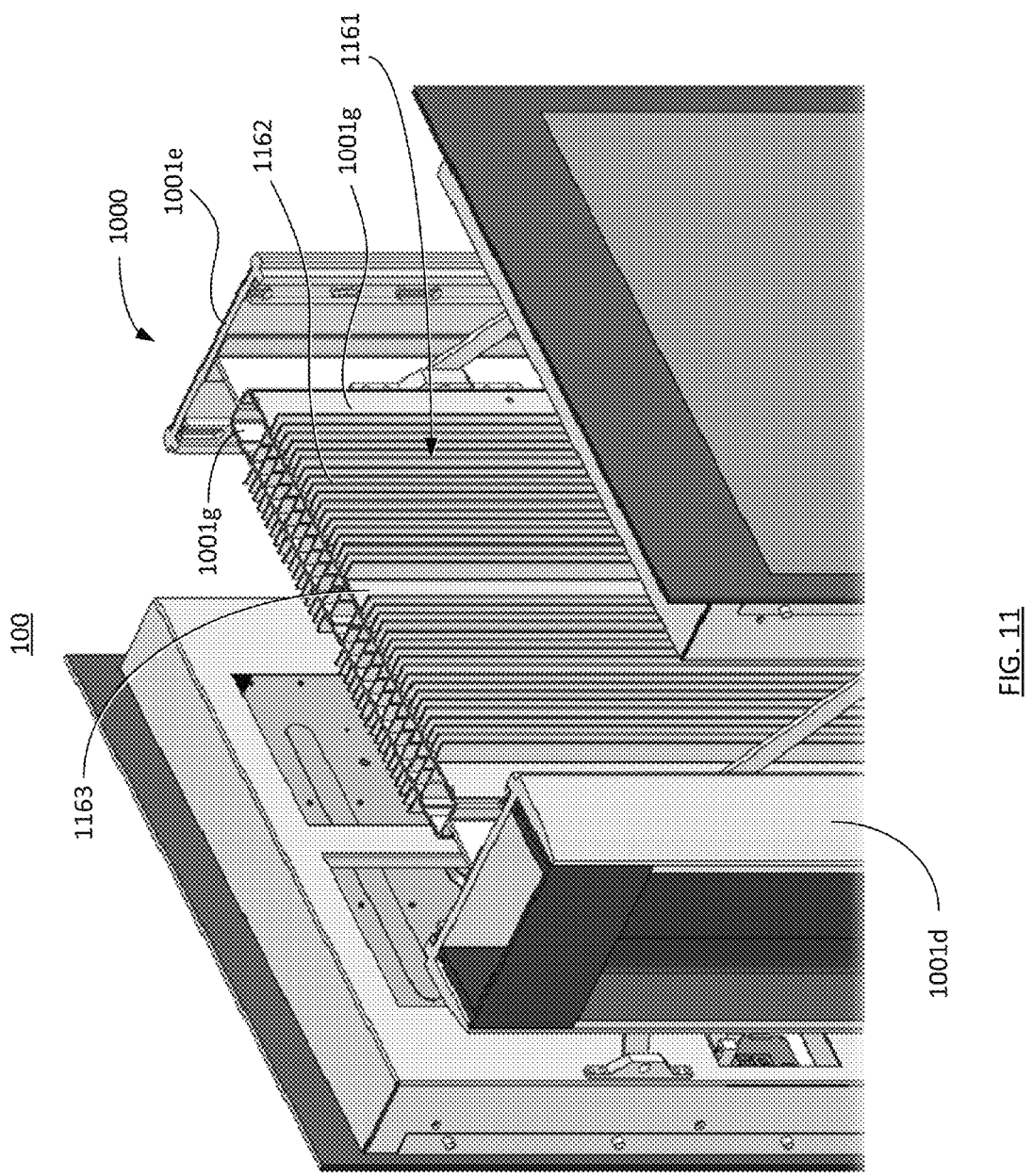
FIG. 11 shows a perspective view of a portion of a PCS, in accordance with some embodiments.

Embodiments of frame 1000 are not limited by the configuration shown in FIGS. 10A-10C. As can be seen in FIG. 11, which shows a front-perspective view of a portion of PCS 100, some embodiments of frame 1000 further include one or more cross-frame members 1001g coupled to upper front member 1001d and an upper portion of rear member 1001e to form an I-beam. In some embodiments, cross-frame member(s) 1001g may include one or more ribbed heat sinks 1161. A ribbed heat sink 1161 may include a substantially planar member 1163 and fins 1162 extending from the substantially planar member 1163 (e.g., in one or more directions substantially perpendicular to the surface of the substantially planar member).

Frame 1000 may facilitate cooling of the PCS's compartments. In some embodiments, one or more (e.g., all) members of frame 1000 may have relatively high thermal conductivity (e.g., average thermal conductivity of at least 90, 100, 110, or 120 Btu/(hr*° F.*ft)). When the temperature within a PCS compartment is greater than the ambient temperature in the area proximate to the PCS, the frame member(s) with relatively high thermal conductivity may function as heat sinks (including, but not limited to, cross-frame member(s) 1001g), such that heat from the compartments is transferred to the PCS's ambient environment through the frame member(s). The member(s) of frame 1000 with relatively high thermal conductivity may substantially consist of materials with relatively high thermal conductivity, including, without limitation, aluminum, thermal pyrolytic graphite, silicon carbide, etc. For example, one or more member(s) of frame 1000 may substantially consist of aluminum.

Members of frame 1000 may be manufactured using suitable techniques. In some embodiments, bottom member 1001*a*, lower front member 1001*b*, cross-frame member 1001*c*, cross-frame member(s) 1001*g*, and/or top member 1001*f* may be metal castings. In some embodiments, upper front member 1001*d* and/or rear member 1001*e* may be extruded metal, polymer, composite, etc.

Figure 12C:
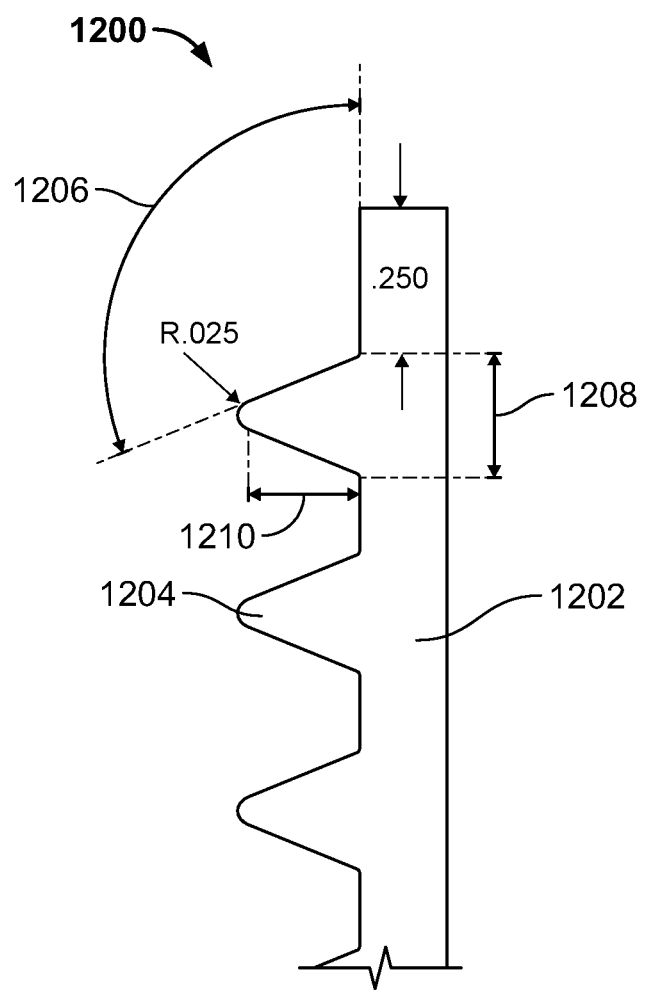
FIG. 12C shows a schematic side view of a ribbed panel, in accordance with some embodiments.

Referring to FIGS. 12A-12C, portions of a PCS's frame 1000 and/or compartments may be covered by ribbed panels 1200. The ribbed panels 1200 may discourage vandalism of PCS 100, since the panel ribs might offer a less appealing target for drawing, painting, or etching than other, smoother surfaces. In addition, the ribbed panels may be swappable, as shown in FIG. 12B, such that a damaged or vandalized panel could be quickly replaced with a pristine panel.

Referring to FIG. 12C, a ribbed panel 1200 may include a substantially planar member 1202 and a set of ribs 1204 extending from the planar member. In some embodiments, the angle 1206 between the outer surface of a rib and the outer surface of the planar member is between approximately 95° and 115°. In some embodiments, the thickness 1208 of a rib 1204 at the rib's base may be between approximately 0.250" and 0.500" and the width 1210 of a rib 1204 may be between approximately 0.300" and 0.600". Other dimensions may be used.

Securing a Structure to a Support

Figure 13A:
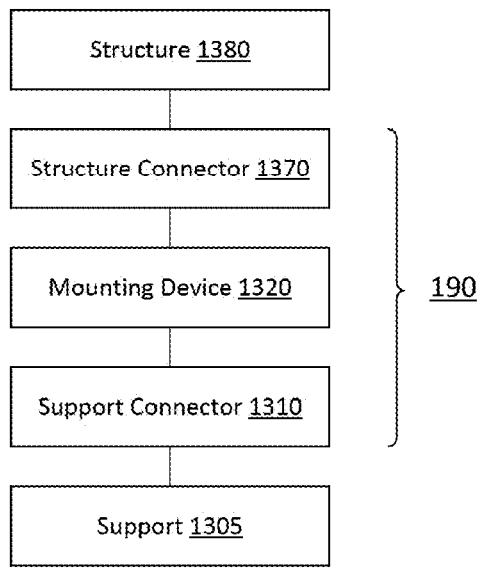
FIG. 13A shows a block diagram of a mounting subsystem, in accordance with some embodiments.

FIG. 13A illustrates a mounting subsystem 190 for releasably securing a structure 1380 to a support 1305, according to some embodiments. Mounting subsystem 190 includes a mounting device 1320, a structure connector 1370 for coupling the mounting device 1320 to the structure 1305, and a support connector 1310 for coupling the mounting device 1320 to the support 1305.

Support 1305 supports (e.g., provides a foundation for) the mounting subsystem 190 and the structure 1380, such that loads may be transferred from the structure 1380 and the mounting subsystem 190 to the support 1305. The support 1305 may then transfer those loads to an underlying object, including, without limitation, a footing, a sidewalk, a stone formation, another structure, the ground, etc. In some embodiments, the support 1305 may include asphalt, concrete, cement, stone, steel (e.g., rebar), and/or any other material suitable for supporting the structure 1380. In some embodiments, the support 1305 is partially or fully embedded in the underlying object.

Structure 1380 may be a PCS 100, kiosk (e.g., an interactive kiosk), pay station (e.g., parking pay station), automated teller machine (ATM), an article of street furniture (e.g., mailbox, bench, traffic barrier, bollard, telephone booth, streetlamp, traffic signal, traffic sign, public transit sign, public transit shelter, taxi stand, public lavatory, fountain, watering trough, memorial, sculpture, waste receptacle, fire hydrant, vending machine, utility pole, etc.), and/or any other suitable structure. In many of the embodiments described below, structure 1380 is described as a PCS 100, without limiting the applicability of mounting subsystem 190 to other types of structures.

Mounting device 1320 releasably secures the structure 1380 to the support 1305. In some embodiments, when securing the structure 1380 to the support 1305, the mounting device 1320 does not permit the base of the structure 1380 to move relative to the support 1305. In some embodiments, when securing the structure 1380 to the support 1305, the mounting device 1320 permits some relative movement between the base of the structure 1380 and the support 1305, but limits the relative movement within a predetermined range. In some embodiments, the predetermined range of movement is between 0 and 0.300". Other ranges may be used. When the structure 1380 is secured to the support 1305 by the mounting device 1320 and a force weaker than a predetermined value is applied to the structure 1380, the structure 1380 may remain in an upright position at a predetermined location. For example, when secured to the support 1305 by the mounting device 1320, the structure 1380 may withstand strong winds. In some embodiments, the support 1305, the mounting device 1320, and the structure 1380 are capable of withstanding wind loads of up to approximately 98 miles per hour or a force of up to approximately 860 pounds applied to the structure at mid-height. In some embodiments, the structure can withstand forces applied to the structure when a person runs into or climbs on the structure with no relative movement (or less than the predetermined range of relative movement) between the base of the structure and the support. In some embodiments, structure can withstand seismic loads, for example, those loads present during an earthquake.

In response to application of sufficient force, the mounting device 1320 releases the structure 1380 from the support 1305 (e.g., ceases to secure the structure 1380 to the support 1305). The force applied to the mounting device 1320 may be a shear force or a bending moment or a combination of the two. In some embodiments, the force applied to the mounting device 1320 is sufficient to cause the mounting device 1320 to release the structure 1380 from the support 1305 once the force exceeds a predetermined threshold. For example, the mounting device 1320 may release the structure 1380 from the support 1305 in response to a shear force of approximately 860 pounds or more being applied to the mounting device 1320. However, other threshold values for the shear force may be used.

In some embodiments, after the mounting device 1320 releases the structure 1380 from the support 1305, the structure 1380 is permitted to move relative to the support 1305. However, even after the mounting device 1320 has released the structure 1380 from the support 1305, the mounting device 1320 may limit the movement of the structure 1380 relative to the support 1305 within a predetermined range. For example, after releasing the structure 1380 from the support 1305, the mounting device 1320 may constrain the movement of the base of the structure 1380 to a predetermined maximum distance from the support 1305. In some embodiments, the maximum distance is between 6 and 24 inches, between 12 and 24 inches, or between 18 and 24 inches. However, other distances may be used. In some embodiments, when releasing the structure 1380 from the support 1305, the mounting device 1320 may absorb at least some of the energy associated with the applied force and associated movement of the structure 1380 relative to the support 1305.

Figure 13B:
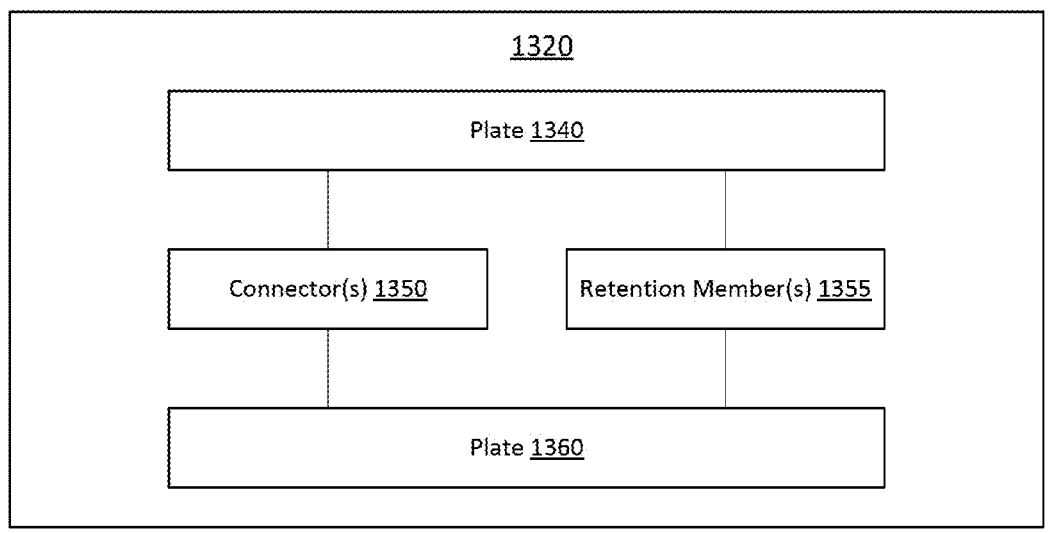
FIG. 13B shows a block diagram of a mounting device, in accordance with some embodiments.

FIG. 13B illustrates a mounting device 1320, according to some embodiments. In some embodiments, mounting device 1320 includes a lower plate 1360, an upper plate 1340, one or more connectors 1350 disposed between the plates, and one or more retention members 1355 disposed between the plates. Plate 1360 may be coupled to support 1305 via support connector 1310. Plate 1340 may be coupled to structure 1380 via structure connector 1370. The connector(s) 1350 may releasably secure plates 1340 and 1360 to each other. The retention member(s) 1355 may constrain the movement of plate 1340 relative to plate 1360 after the connector(s) 1350 have ceased to secure the plates 1340 and 1360 to each other.

In some embodiments, when securing the plate 1340 to the plate 1360, the mounting device 1320 does not permit the plate 1340 to move relative to the plate 1360, or limits the relative movement of the plates within a first predetermined range (e.g., less than five degrees of relative rotation, less than one inch of relative translation, and/or less than 0.300 inches of relative translation). In response to application of sufficient force, the connector(s) 1350 may release the plate 1340 from the plate 1360 (e.g., cease to secure the plate 1340 to the plate 1360). The force applied to the connector(s) 1350 may be a shear force, a tensile force, torsional force, a moment, or a combination thereof. In some embodiments, the force applied to the connector(s) 1350 is sufficient to cause the connector(s) to release the plate 1340 from the plate 1360 if the force exceeds a predetermined threshold. For example, the connector(s) 1350 may release the plate 1340 from the plate 1360 in response to a shear force of approximately 860 pounds or more being applied to the connector(s) 1350. In some embodiments, the combined shear strength of the connector(s) 1350 is less than the support's "damage threshold" (e.g., a maximum force that the support 1305 is rated to withstand without being damaged). In other words, the connector(s) 1350 may be configured to disconnect before the force applied to the structure 1380 causes damage to the support 1305.

In some embodiments, after the connector(s) 1350 release the plate 1340 from the plate 1360, the plate 1340 is permitted to move relative to the plate 1360. However, even after the connector(s) 1350 release the plate 1340 from the plate 1360, the retention member(s) 1355 may limit the movement of the plate 1340 relative to the plate 1360 within a predetermined range. For example, after releasing the plate 1340 from the plate 1360, the retention member(s) 1355 may constrain the movement (e.g., range of motion, rotation, and/or translation) of the plate 1340 to a predetermined maximum distance from the plate 1360. In some embodiments, the maximum distance is between 6 and 24 inches, between 12 and 24 inches, or between 18 and 24 inches. However, other distances may be used. In some embodiments, after the connector(s) 1350 release the plate 1340 from the plate 1360, the retention member(s) 1355 may absorb at least some of the energy associated with movement of the plate 1340 relative to the plate 1360 (e.g., by deformation).

Figure 14A:
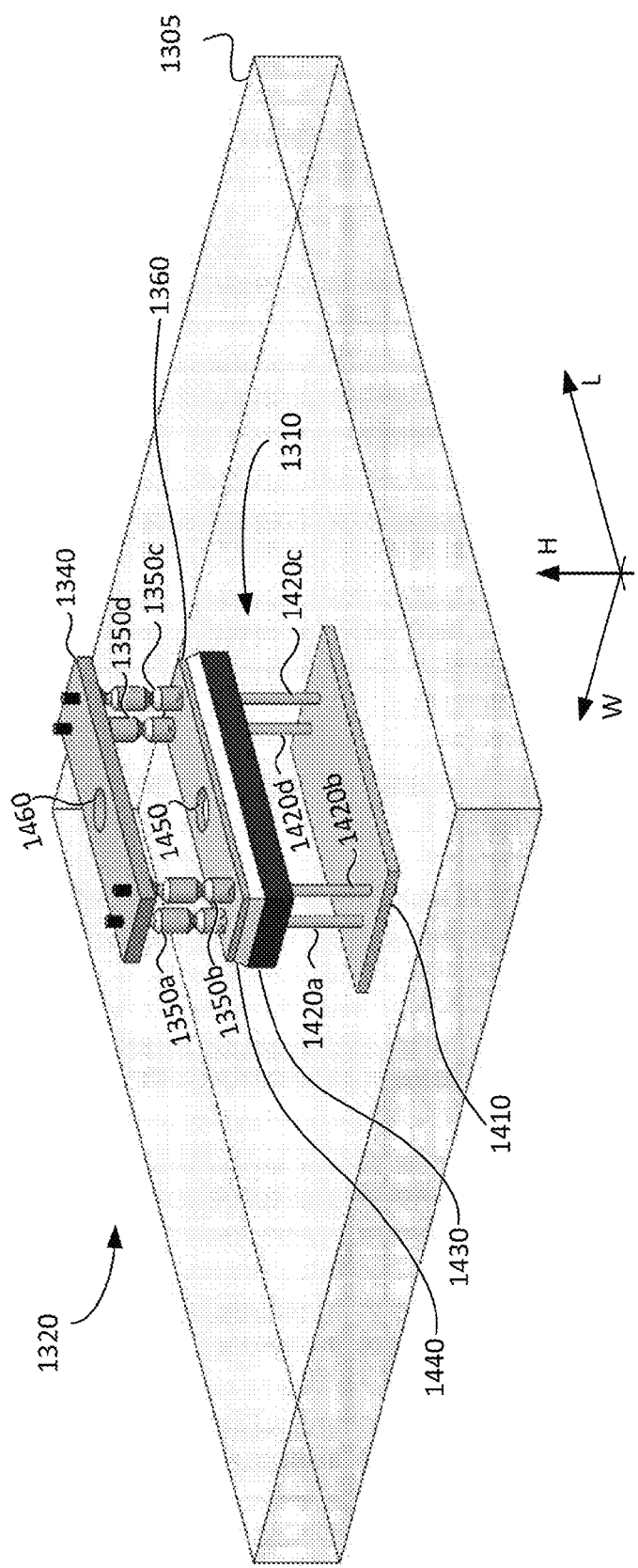
FIGS. 14A and 14B show a perspective view and an exploded perspective view, respectively, of a mounting device and a support connector, according to some embodiments.
Figure 14B:
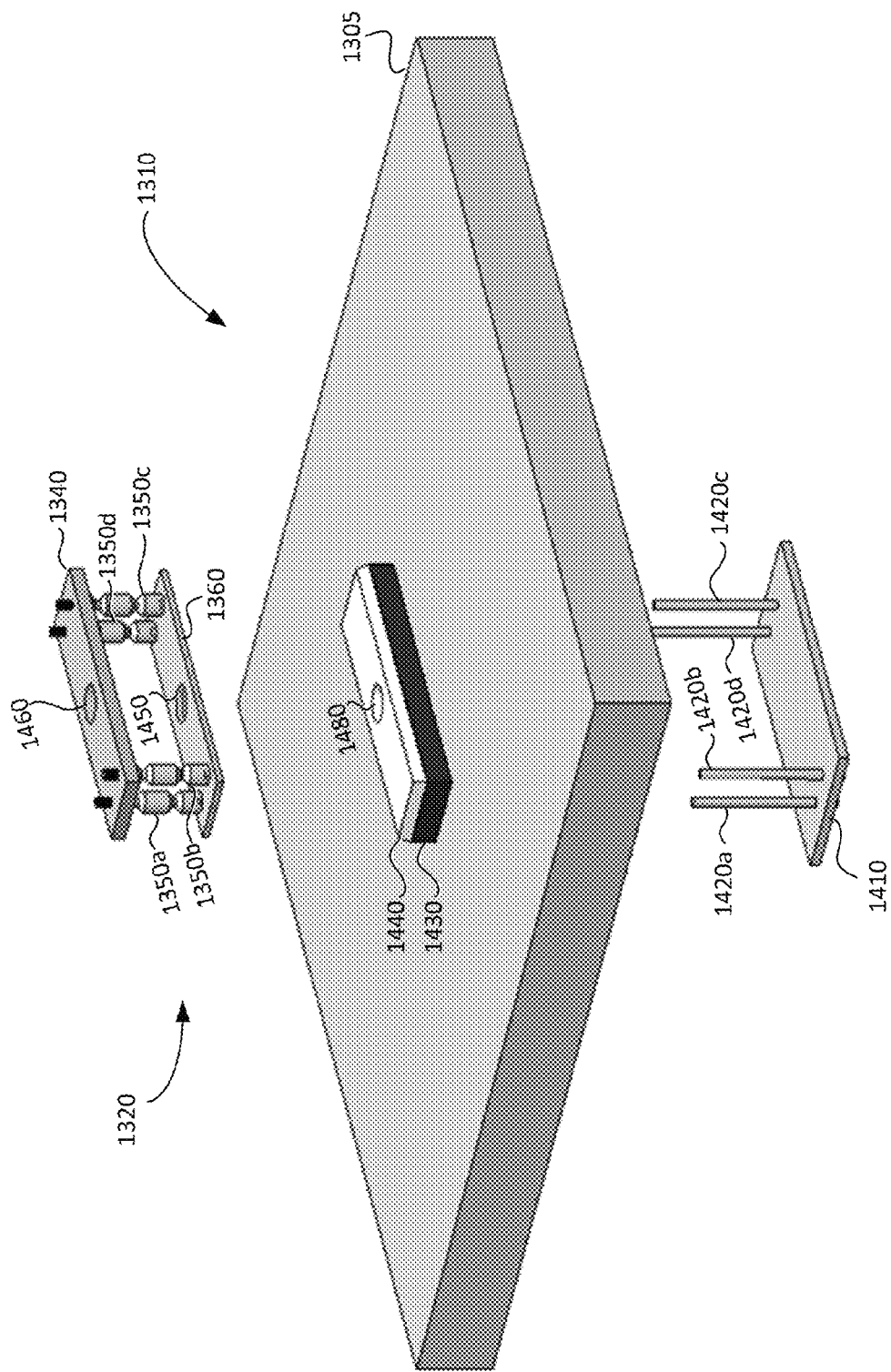

Some embodiments of mounting subsystem 190 are described in further detail with reference to FIGS. 14A-18. FIGS. 14A and 14B show a perspective view and an exploded perspective view, respectively, of a mounting device 1320 and a support connector 1310, according to some embodiments. In the example of FIGS. 14A-B, the support connector 1310 includes a fishplate 1410, anchor bolts 1420, a sleeve 1430, and an adhesive layer 1440.

The fishplate 1410 may be embedded in the support 1305, or the support 1305 may be disposed between the fishplate 1410 and the mounting device 1320. In some embodiments, the fishplate 1410 is a steel member (e.g., a stainless steel plate or galvanized steel plate). In some embodiments, the support 1305 is a slab of concrete (e.g., a slab of concrete that forms a portion of a sidewalk).

The sleeve 1430 may be at least partially embedded in the support 1305. At least a portion of sleeve 1430 may extend above the upper surface of support 1305, thereby forming a pedestal for structure 1380. In some embodiments, the sleeve 1430 may include concrete (e.g., cast-in-place concrete) and/or steel (e.g., galvanized steel or painted steel). The length and width of the sleeve may be approximately equal to the length and width of the base of the structure 1380, respectively.

The adhesive layer 1440 may be disposed above the upper surface of the sleeve 1430 (e.g., on top of sleeve 1430). In some embodiments, adhesive layer 1440 may include grout (e.g., a grout pad), mortar (e.g., a mortar pad), and/or any other suitable adhesive material.

The anchor bolts 1420 may extend through fishplate 1410, support 1305, sleeve 1430, and adhesive layer 1440. In some embodiments, the ends of the anchor bolts proximate the fishplate ("lower ends") are inserted through apertures in the fishplate 1410 and secured by fasteners (e.g., nuts, pins, etc.), which may be disposed proximate to the bottom surface of the fishplate 1410. In some embodiments, the ends ("upper ends") of the anchor bolts proximate the adhesive layer 1440 are inserted through apertures in the sleeve 1430 and secured by fasteners (e.g., nuts, pins, etc.), which may be disposed proximate to the upper surface of the sleeve 1430. In some embodiments, the anchor bolts 1420 may be steel (e.g., galvanized steel or stainless steel) or any other suitable material. In some embodiments, the anchor bolts 1420 have diameters of at least 0.75". In some embodiments, the upper and/or lower ends of the anchor bolts 1420 are threaded.

As can be seen in FIG. 14B, an aperture 1480 may be formed in sleeve 1430 and adhesive layer 1440. The aperture 1480 may be generally centrally located in the sleeve 1430 and adhesive layer 1440 (e.g., the area of aperture 1480 may include the center points of the upper surfaces of the sleeve 1430 and the adhesive layer 1440). In some embodiments, one or more lines (e.g., power line, electrical grounding line, and/or communication line) extend between the mounting device 1320 and the support 1305 via aperture 1480.

In the example of FIGS. 14A-B, mounting device 1320 includes a lower plate 1360, an upper plate 1340, and connectors 1350. The lower and upper plates may be substantially planar and may be arranged substantially parallel to each other. In some embodiments, the minimum distance between the lower and upper plates (when secured to each other by connectors 1350) is between 3" and 9", between 4" and 8", between 5" and 7", between 6" and 7", approximately 6.875", or approximately 6.0625". Each of the plates (1340, 1360) may be made of steel (e.g., galvanized steel or stainless steel) or any other suitable material.

In some embodiments, plate 1340 has a length between 24" and 26", a width between 8" and 10", and a height between 1.5" and 3". In some embodiments, plate 1360 has a length between 24" and 26", a width between 8" and 10", and a height between 1" and 2".

Plates 1340 and 1360 may include apertures 1460 and 1450, respectively. Aperture 1450 may be generally centrally located in the plate 1360 (e.g., the area of aperture 1450 may include the center point of the upper surface of the plate 1360), and/or may be aligned in parallel with aperture 1480. In some embodiments, one or more lines extend between the mounting device 1320 and the support 1305 via apertures 1450 and 1480. Aperture 1460 may be generally centrally located in the plate 1340 (e.g., the area of aperture 1460 may include the center point of the upper surface of the plate 1340), and/or may be aligned in parallel with aperture 1450 or aperture 1480. In some embodiments, one or more lines extend between the mounting device 1320 and the structure 1380 via aperture 1460.

In some embodiments, lower plate 1360 may be adhesively bonded to support connector 1310 (e.g., via adhesive layer 1440). Adhesive bonding between lower plate 1360 and adhesive layer 1440 may be achieved using any suitable technique. For example, lower plate 1360 may be placed on adhesive layer 1440 at a time when the upper surface of adhesive layer 1440 exhibits adhesive properties (e.g., before the grout or mortar in adhesive layer 1440 sets). In some embodiments, lower plate 1360 may remain adhesively bonded to support connector 1310 even after the mounting device 1320 releases lower plate 1360 from upper plate 1340.

In some embodiments, the connectors 1350 are frangible connections. Each of the frangible connections may be adapted to disconnect (e.g., break) in response to application of a shear, torsional, or tensile force above a predetermined value. The frangible connectors 1350 may allow the structure 1380 to shear off its support (e.g., foundation) before the support itself incurs damage. It should be well understood that installing the support (e.g., into a concrete sidewalk) and running service cables (e.g., power cables, fiber-optic communication cables, copper communication cables, etc.) to a structure (e.g., PCS) can be costly. It should also be understood that a structure that has sheared off its foundation may be replaced, along with the frangible connectors 1350.

In some embodiments, the maximum shear failure load of each connector 1350 may be between 1.5 kips and 3.75 kips, between 2.0 kips and 3.75 kips, between 2.5 kips and 3.75 kips, between 3.0 kips and 3.5 kips, or approximately 3.25 kips. In some embodiments, the minimum shear failure load of each frangible connection may be between 1.0 kips and 2.5 kips, between 1.5 kips and 2.5 kips, or approximately 2.0 kips. In some embodiments, the minimum tensile yield strength of each connector 1350 may be between 15 and 25 kips, between 18 and 22 kips, or approximately 19.8 kips. In some embodiments, the maximum displacement of each frangible connection at failure load may be between 0.25" and 1.00", between 0.4" and 0.8", between 0.5" and 0.7", or approximately 0.6".

Each connector 1350 may be configured as a shear pin, breakaway bolt, shear fuse bolt, or any other suitable frangible fastener. In some embodiments, the connectors 1350 may be Transpo® Pole-Safe® Breakaway Supports (e.g., Model No. 4062). The connectors 1350 may be made of any material suitable for a frangible connection, including, without limitation, galvanized steel or stainless steel.

In the example of FIGS. 14A-B, the mounting device 1320 includes four connectors 1350 disposed proximate the corners of lower plate 1360 and upper plate 1340. However, in some embodiments, mounting device 1320 may include any suitable number of connectors 1350 (e.g., one, two, three, four, or more than four connectors) arranged in any suitable configuration and location(s).

In some embodiments, the ends ("lower ends") of the connectors 1350 that are proximate to lower plate 1360 are threaded to receive and engage with the threads at the ends of the anchor bolts 1420. When the threaded lower ends of the connectors 1350 engage with the threaded upper ends of the anchor bolts 1420, the connectors 1350 may be coupled to lower plate 1360 and to support connector 1310. In some embodiments, the ends ("upper ends") of the connectors 1350 that are proximate to upper plate 1340 extend through apertures in upper plate 1340. The upper ends of the connectors 1350 may be threaded, at least in part, and secured with nuts.

In some embodiments, the upper ends of the connectors 1350 allow for shim washers (not shown) to be added. These washers may act as a leveling mechanism for the top plate 1340 with relation to the bottom plate 1360. Leveling the top plate 1340 allows for leveling adjustment of the structure 1380 after fishplate 1410 has been installed in support 1305 and the mounting device 1320 has been attached to the fishplate 1410.

Figure 14C:
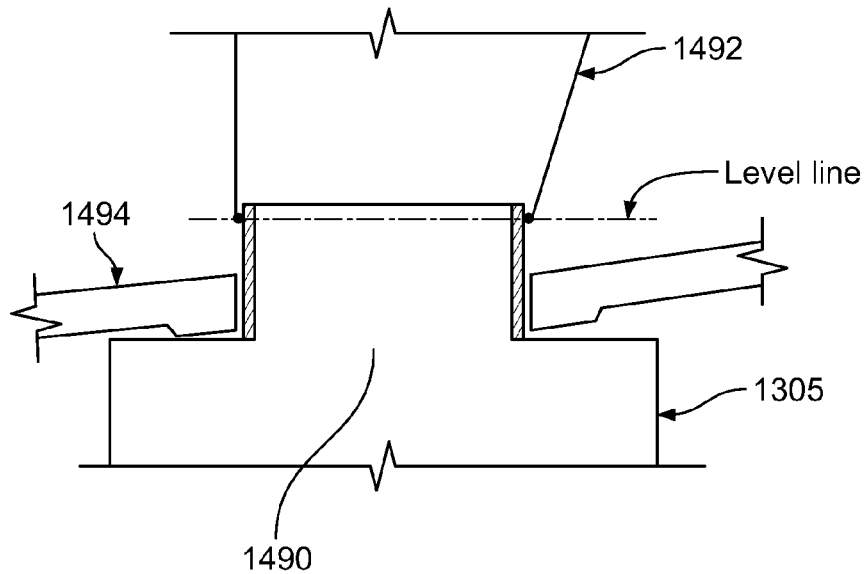
FIG. 14C shows a side view of a cast-in sleeve, according to some embodiments.

Other techniques for mounting a structure 1380 on a support 1305 may be used (e.g., in alone or in combination with a mounting subsystem 190). It can be appreciated that some structures may be installed on sidewalks that are on hills or other sloped surfaces. Creating pedestals to level the structure's support can present footing hazards to pedestrians who are using the sidewalk around the structure or have used the structure and are returning to the sidewalk. FIG. 14C shows a support 1305 with a leveled, cast-in sleeve 1490, according to some embodiments. The sleeve 1490 is referred to as a "cast-in" sleeve because the sleeve is cast into the concrete support and protrudes slightly above the sidewalk 1494. The height of the sleeve above the sidewalk can vary on different slopes. In some embodiments, the height of the sleeve above the sidewalk is between approximately 1 inch and approximately 3 inches. The sleeve 1490 may be of similar color and/or texture as the structure's casing 1492. When the structure is mounted on the sleeve 1490, a bottom portion of the structure casing 1492 may be disposed over and around a top portion of the sleeve 1492, and the bottom surface of the casing 1494 may be proximate to the surface of the sidewalk. There may be a small gap between the sleeve 1490 and the casing 1492, but the gap may be cosmetically hidden to users of the structure and bystanders because it is located at the bottom of the structure near the surface of the sidewalk.

In yet another embodiment, a "lip in casing" is used. When the structure is mounted with the lip-in casing, the bottom portion of the structure casing 1492 may be inserted into the sleeve 1490. The lip in casing tends to be less suitable for steep grades than for minor slopes. In yet another embodiment, a "sleeve ring" is used. When a structure 1380 is mounted above a sloped sidewalk, there may be a gap between the sidewalk and the bottom of the structure casing. A sleeve ring may be installed around the structure after it has been mounted to cover the gap. Other mounting devices, for example site modified sleeves or skirts, are possible. Site modified sleeves or skirts may be more expensive than other mounting devices described herein.

Figure 15:
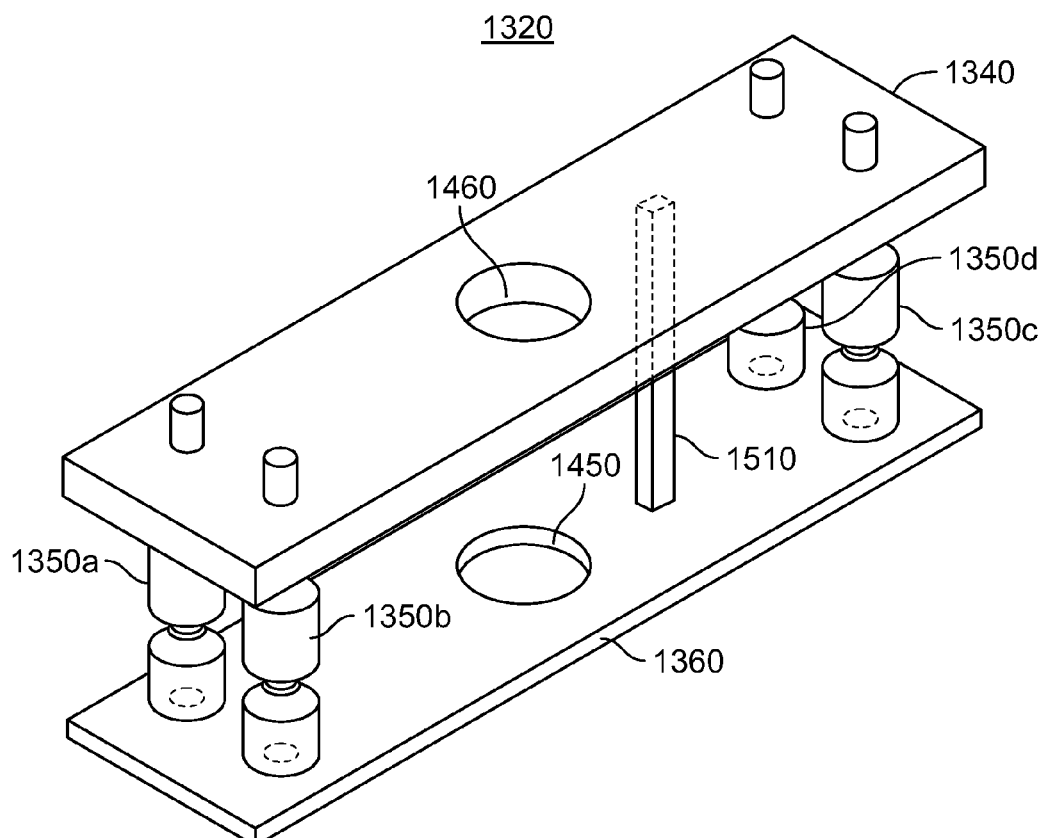
FIG. 15 shows a perspective view of a mounting device, according to some embodiments.
Figure 16:
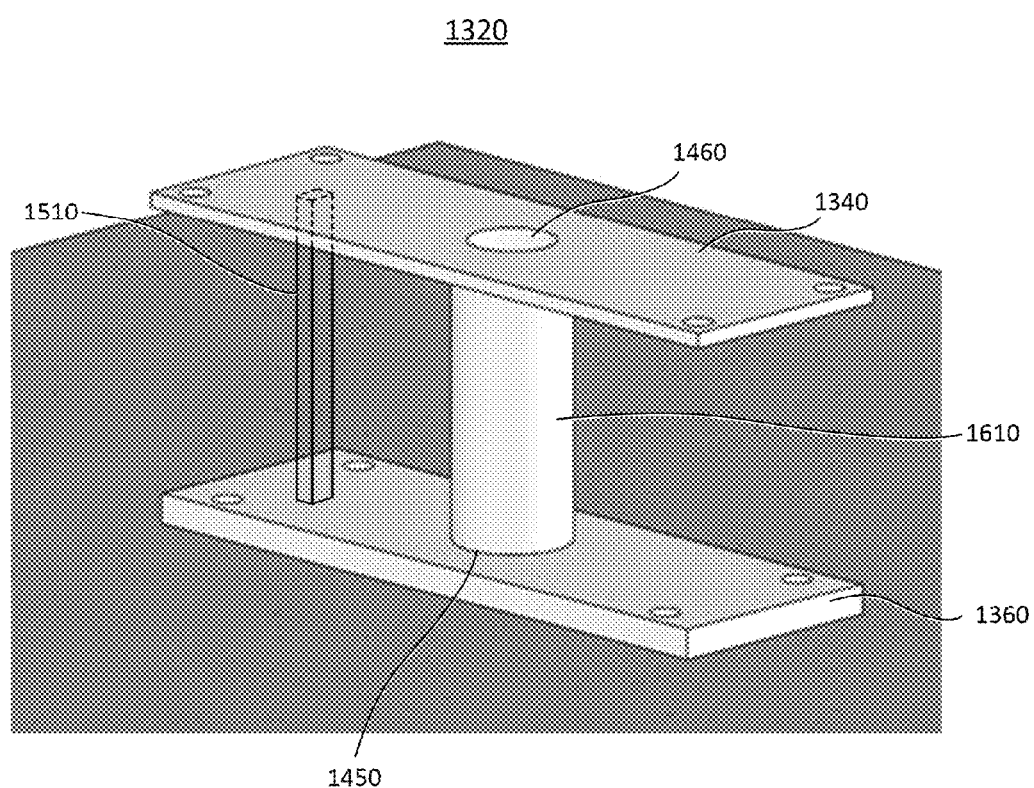
FIG. 16 shows a perspective view of another mounting device, according to some embodiments.

FIGS. 15-16 show additional embodiments of mounting device 1320, which include an upper plate 1340, a lower plate 1360, and one or more retention members 1355. In the embodiment of FIG. 15, the one or more retention members 1355 include a flexible retention member 1510 adapted to bear tensile strain. In the embodiment of FIG. 16, the one or more retention members 1355 include a deformable retention member 1610 adapted to deform under shear strain, twisting, and/or bending. The deformable member 1610 allows the structure to slowly lean over until it comes in contact with the sidewalk. In some embodiments, a mounting device 1320 may include zero, one, or more than one retention member 1355, including, but not limited to, at least one flexible retention member 1510 and/or at least one deformable retention member 1610.

The flexible retention member 1510 may include, without limitation, a chain, a cable (e.g., two or more bonded, twisted, and/or braided wires), wire rope, rope, a bungee shock cord, and/or any other flexible member adapted to bear tensile strain. The flexible retention member 1510 may include any suitable material, including, without limitation, metal (e.g., copper, steel, etc.), elastic, rubber, a polymer, etc.

In some embodiments, the flexible retention member 1510 is coupled to plate 1340 and to plate 1360. For example, opposite ends of the flexible retention member 1510 may be coupled to rings (e.g., corrosion resistant hoist rings) attached to plates 1340 and 1360. The flexible retention member 1510 may maintain a coupling between plate 1340 and plate 1360 after disconnection of the connector(s) 1350, and may thereby constrain the movement of plate 1340 relative to plate 1360 within a predetermined range.

A flexible retention member 1510 may have a tensile strength between 1.5 kips and 3.5 kips, a tensile strength between 2.0 kips and 3.0 kips, or a tensile strength of approximately 2.65 kips. In some embodiments, the length of the flexible retention member is at least 12", at least 16", at least 20", between 12" and 36", between 16" and 30", between 20" and 24", or approximately 20". In some embodiments, flexible retention member 1510 may absorb energy associated with the movement of plate 1340 relative to plate 1360 (e.g., by deformation). The flexible retention member may be sized to allow the connector(s) 1350 to break, but to then act as a tether. For example, if a car runs into the structure at a speed great enough to break the four connectors 1350, the flexible retention member 1510 may prevent the structure from flying off the support 1305, and thereby considerably reduce the risk of physical harm to users of the structure or passers-by. It is understood that in the case of extreme impact, both the connectors 1350 and the flexible retention member 1510 may shear. In such cases, the structure or a portion thereof (e.g., the mounting subsystem 190) may absorb at least some of the energy associated with the collision, thereby reducing the risk of harm to the user, passers-by, and other structures nearby. In the event of a vehicular crash, the absorption of energy by the structure may also reduce the risk of harm to the vehicle's passengers, or even save the passengers' lives.

Referring to FIG. 16, in some embodiments, a mounting device 1320 includes a deformable retention member 1610 coupled to plate 1340 and to plate 1360. The deformable retention member 1610 may include, without limitation, a pipe, a rod, rebar, construction material, strapping, etc. In some embodiments, the hollow inner portion of the pipe connects the apertures 1460 and 1450 of plates 1340 and 1360, respectively. The deformable retention member 1610 may include aluminum and/or any other material adapted to yield in a controlled manner when subjected to excessive force or moment loading. In a minor collision, retention member 1610 deforms and the structure bends over until it comes in contact with the sidewalk or ground. As can be appreciated, this technique may reduce safety hazards to users of the structure and to bystanders on the street. Furthermore, like the mounting device 1320 of FIG. 15, the mounting device 1320 of FIG. 16 may be tethered by one or more flexible retention members 1510.

Figure 17A:
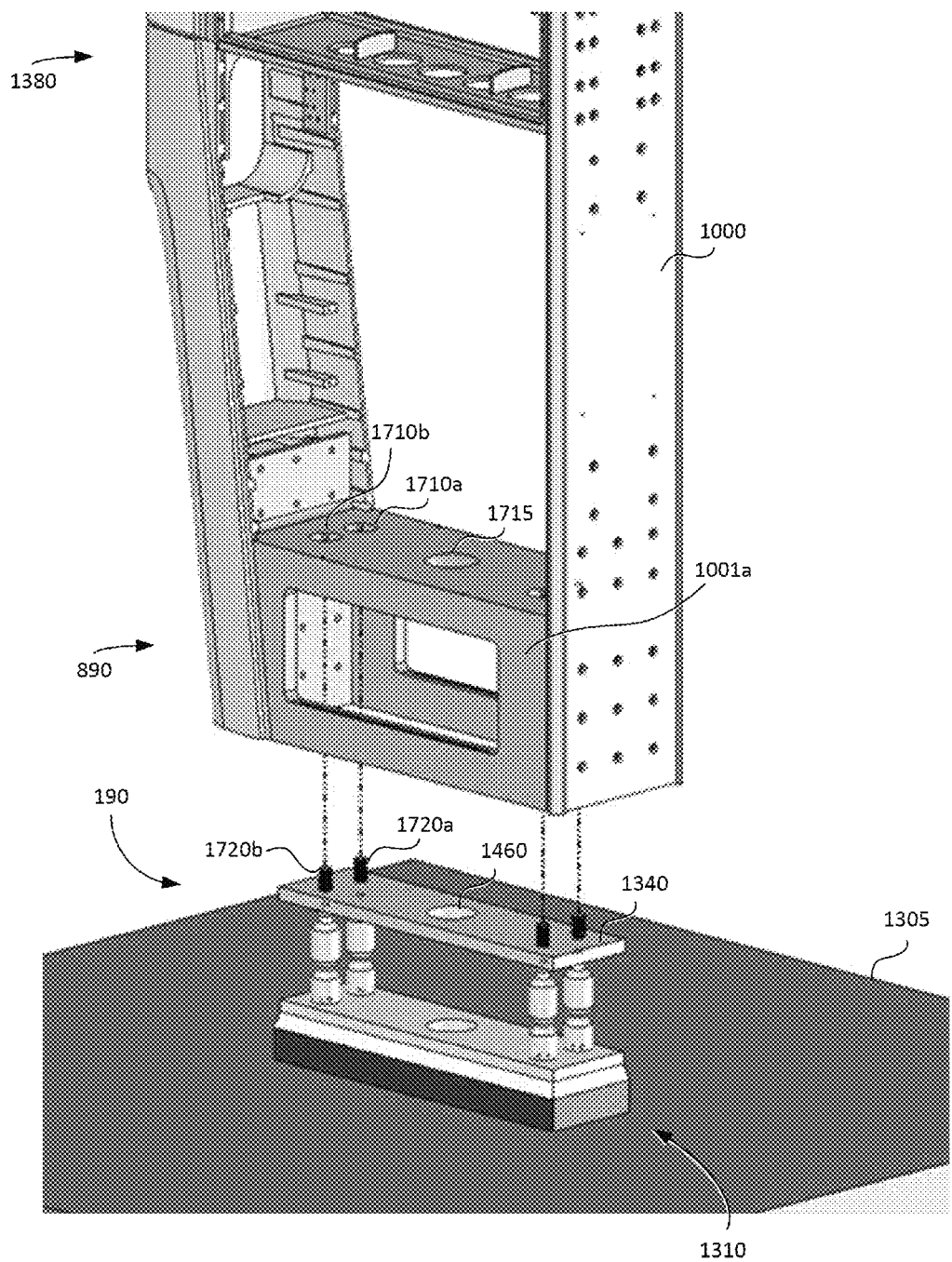
FIG. 17A shows an exploded perspective view of a mounting device releasably securing a structure to a support, according to some embodiments.
Figure 17B:
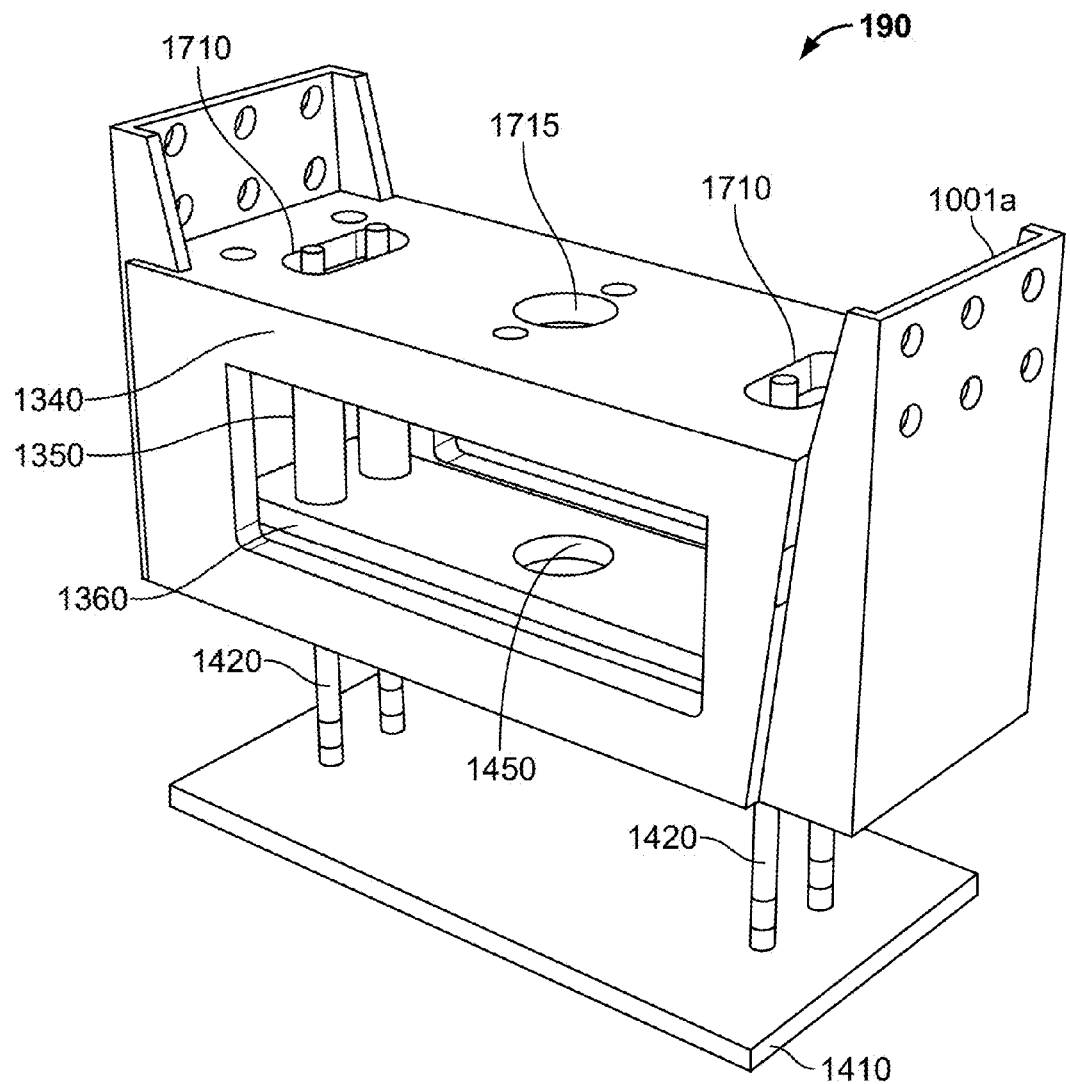
FIGS. 17B and 17C show a perspective view and a cross-sectional view, respectively, of the mounting device of FIG. 17A, according to some embodiments.
Figure 17C:
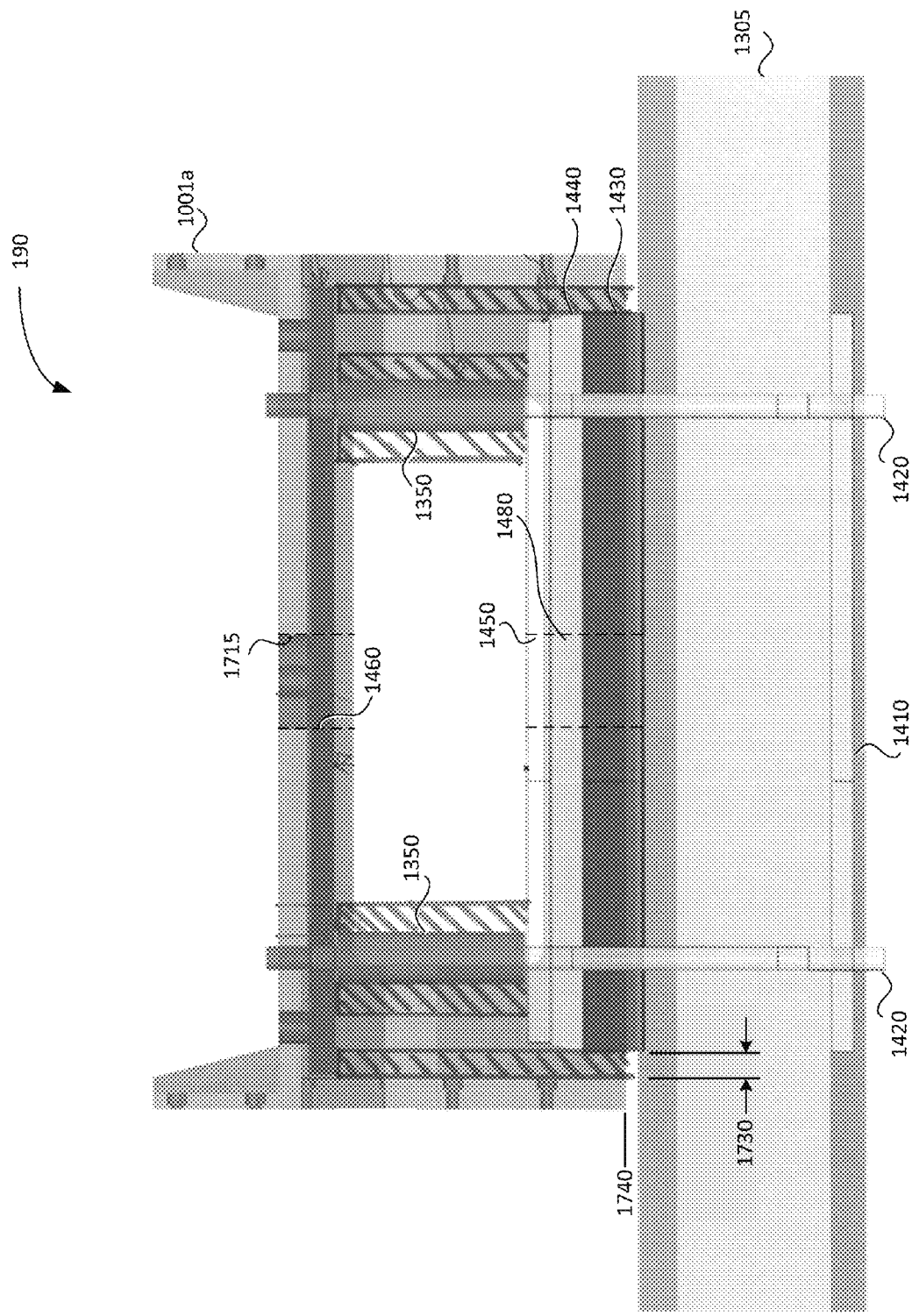

FIGS. 17A, 17B, and 17C show an exploded perspective view, a perspective view, and a cross-sectional view, respectively, of a mounting subsystem 190, according to some embodiments. As discussed above, a mounting subsystem 190 may include a structure connector 1370 for coupling a mounting device 1320 to a structure 1380. In the example of FIGS. 17A-C, the structure connector 1370 includes one or more apertures 1710 in a surface of structure 1380 and one or more fasteners 1720. The aperture(s) 1710 are adapted to receive the upper ends of the connectors 1350, and the fastener(s) 1720 (e.g., washers, nuts, pins, etc.) are adapted to mate with the upper ends of the connectors 1350 to couple the connectors 1350 to the structure 1380.

In the example of FIGS. 17A-C, the structure 1380 is a PCS 100, which includes a frame 1000. The frame 1000 includes a bottom member 1001a. In some embodiments, the bottom member 1001a of frame 1000 includes the aperture(s) 1710. As can be seen, frame 1000 may be placed over mounting device 1320, such that the upper ends of connectors 1350 extend through the aperture(s) 1710 in bottom member 1001a of frame 1000, and the fastener(s) 1720 may couple the upper ends of the connectors 1350 to the frame 1000. In some embodiments, the fastener(s) 1720 are threaded nuts adapted to mate with the threaded upper ends of the connections 1350.

In some embodiments, the frame 1000 includes an aperture 1715. One or more lines may extend between the mounting device 1320 and the structure 1380 via apertures 1460 and 1715. Aperture 1715 may be collinearly aligned with aperture 1460.

As can be seen in FIGS. 17B-C, when a PCS 100 is coupled to mounting subsystem 190, portions of mounting subsystem 190 may be contained in the mounting compartment 890 of the PCS. In some embodiments, the mounting compartment 890 may enclose the upper plate 1340 and lower plate 1360 of mounting device 1320, along with portions of the connectors 1350. In some embodiments, the mounting compartment 890 may enclose portions of the support connector 1310 (e.g., adhesive layer 1440 and at least an upper portion of sleeve 1430). The base portion 806 of the PCS 100 may rest directly on the support 1305, so that the mounting subsystem 190 is adapted to prevent movement or toppling of the PCS 100 in normal use.

In some embodiments, mounting subsystem 190 is adapted to avoid damaging structure 1380 when the mounting device 1320 releases the structure 1380 from the support 1305, and/or to mitigate the scope of such damage. Some components of mounting subsystem 190 may be made of stronger materials than portions of structure 1380. For example, some components of mounting subsystem 190, including upper plate 1340 and the fasteners 1720, may be made of steel, while the frame of a structure 1380 (e.g., the frame 1000 of a PCS 100) may be made of aluminum. Thus, in some embodiments, forceful contact between the mounting subsystem 190 and the structure 1380 could potentially damage the structure 1380. To avoid or mitigate such damage, the apertures 1710 of structure connector 1370 may be oversized, relative to the connectors 1350 and the fasteners 1720, to prevent the connectors 1350 and the fasteners 1720 from coming into contact with the sides of the apertures 1710. In some embodiments, upper plate 1340 may be partially or fully covered by a compliant, resilient material, including, without limitation, an elastomer, a rubber, a polymer, neoprene, and/or any other suitable deformable material. The deformable material may protect the structure 1380 from contact with upper plate 1340 (e.g., during a collision between structure 1380 and an automobile).

Some features of mounting subsystem 190 are further described with reference to FIG. 17C. In some embodiments, there is a gap 1730 between the sides of sleeve 1430 and the sides of the structure 1380. This gap 1730 may facilitate rotation of the structure 1380 (e.g., rotation of less than 30 degrees, less than 20 degrees, less than 10 degrees, or less than five degrees) during installation of structure 1380. In some embodiments, structure 1380 may be leveled such that the bottom surface 1740 of the structure 1380 is level. Thus, in cases where the ground surface proximate to the support 1305 of the structure 1380 is not level, the distance between the bottom surface 1740 of the structure and the ground surface may vary.

In some embodiments, one or more components (e.g., lines) extending between support 1305 and structure 1380 (e.g., components coupled between top plate 1340 and bottom plate 1360, or coupled between support 1305 and structure 1380, or extending between the structure 1380 and the support 1305 through apertures 1480, 1450, 1460, and 1715) may accommodate limited movement of plate 1340 relative to plate 1360. In some embodiments, such components may accommodate at least as much relative movement between the plates as is accommodated by retention member 1355. In some embodiments, such components may accommodate the relative movement of the plates without breaking. For example, the components may be flexible, may be deformable, and/or may have sufficient slack to accommodate the target amount of relative movement. In some embodiments, such a component may accommodate the relative movement of the plates by disconnecting (e.g., breaking) when a tensile or shear force of at least a predetermined magnitude (e.g., 10 kip) is applied to the component.

Figure 18:
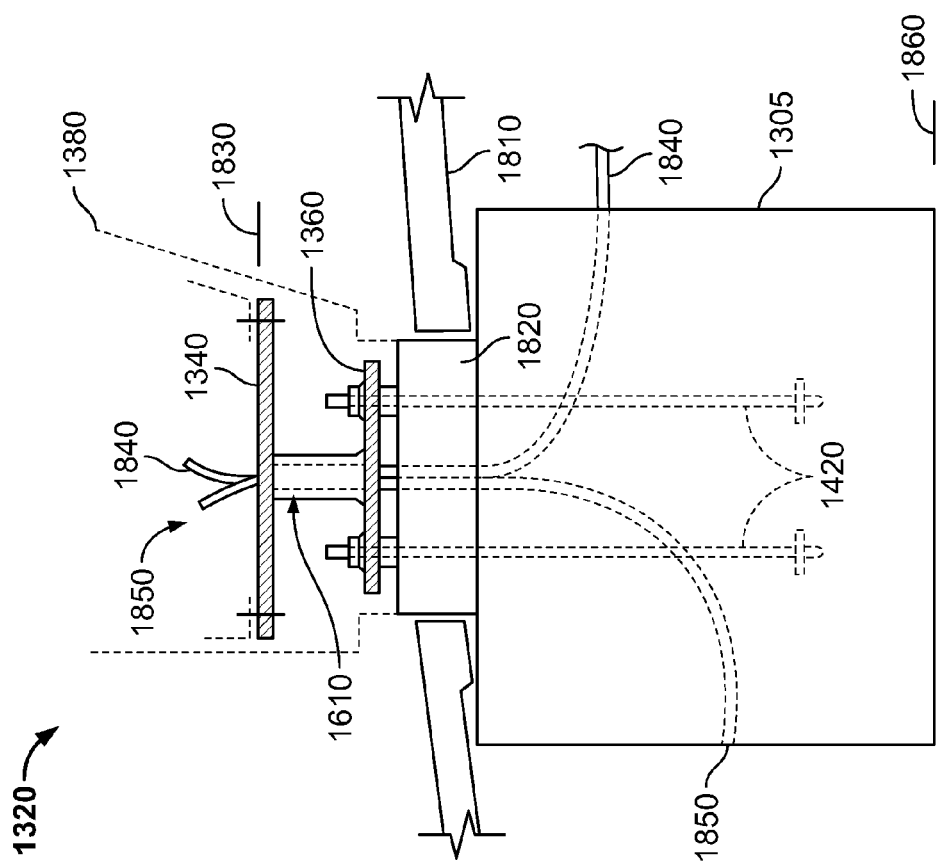
FIG. 18 shows a side view of a mounting device, according to some embodiments.

FIG. 18 shows another embodiment of a mounting device 1320. In the embodiment of FIG. 18, the mounting device 1320 includes two plates 1340 and 1360 coupled by a retention member 1610. In the embodiment of FIG. 18, the mounting device 1320 may or may not include additional frangible connection(s) 1350 between plates 1340 and 1360. In the embodiment of FIG. 18, the mounting device 1320 is coupled to the support 1305 by anchor bolts 1420, and the support 1305 includes a pedestal portion 1820, which is elevated above the top surface of the surrounding sidewalk 1810. In some embodiments, plate 1340 is positioned at or above a flood line elevation 1830. In some embodiments, the height of the flood line is approximately 12 inches above the ground. In some embodiments, electronic components inside the structure are mounted above the flood line. In the event of severe flooding, the structure's electronic components may continue to operate when waters are below the flood line. In some embodiments, the bottom of support 1305 is positioned at or below a frost line elevation 1860. In some embodiments, the depth of the frost line is approximately 48 inches.

In some embodiments, one or more lines extend between mounting device 1320 and support 1305. The line(s) may include a power line 1850, a communications line 1840, an electrical grounding line (not shown), and/or any other line suitable for carrying electrical and/or optical signals. The lines may be implemented using any suitable materials arranged in any suitable configuration, including, without limitation, electrically conductive wires, cables, optical fibers, etc.

The power line 1850 may supply power, voltage, and/or current to the structure 1380. The electrical grounding line may provide an electrical ground node for the structure 1380 (e.g., a PCS 100), for the structure's electrical system(s), and/or for the structure's electronic components. The communications line 1840 may carry communication signals (e.g., optical and/or electrical communication signals) between structure 1380 and a communication network. In some embodiments, communications line 1840 includes one or more optical fibers.

Figure 19A:
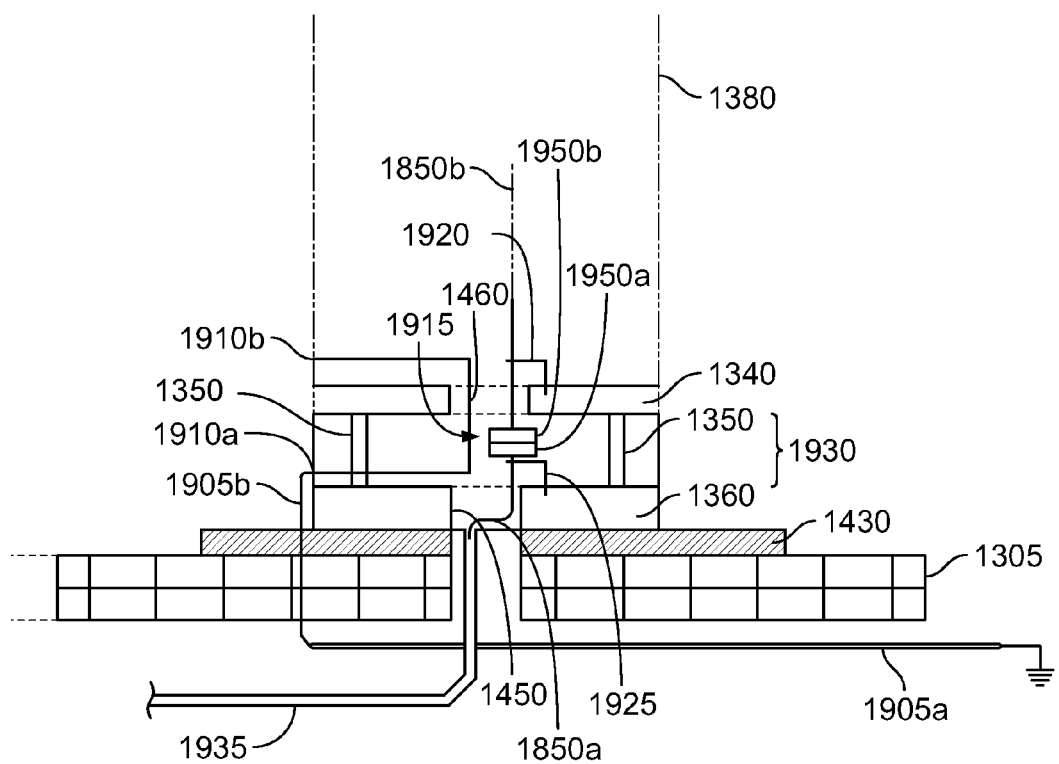
FIG. 19A shows a schematic of a mounting device with line safety enhancements, according to some embodiments.

FIG. 19A shows another embodiment of a mounting device 1320. In the example of FIG. 19A, the depth of the support 1305 may be less than 4 or 5 inches. In some embodiments, support 1305 does not extend down to the frost line 1860 (e.g., because the mounting device 1320 is installed on an "obstructed support"). Examples of structures that may obstruct the support 1305 include subway systems, basements, building foundations, other structures buried beneath city streets, etc. In some embodiments, the subsurface depth of the support 1305 may be no greater than approximately 4 or 5 inches.

In the example of FIG. 19A, the mounting device 1320 includes one or more line safety features. As discussed above, movement of a structure 1380 relative to a support 1305 may place strain on lines extending between the structure 1380 and the support 1305 (e.g., via the mounting device 1320), which may cause the lines to break. Breaks in such lines can lead to electrical hazards and/or can require costly repairs. For example, a broken power line or electrical grounding line could create a risk of a substantial electrical shock. As another example, replacing a broken optical fiber could be very costly, particularly if the repair involves running new optical fiber between the structure 1380 and an optical communication access point. The line safety features described below may mitigate such risks by reducing the occurrence of broken lines, and/or by disconnecting a line at an interface between connectors (e.g., a plug and receptacle) rather than allowing the line to break under strain.

In the example of FIG. 19A, an electrical grounding line 1905 and a power line 1850 are coupled to structure 1380. In some embodiments, the electrical grounding line 1905 includes a rod portion 1905a and a wire portion 1905b. In some embodiments, the electrical grounding line 1905 is coupled to structure 1380 at one or more grounding studs 1910. In the example of FIG. 19A, grounding line 1905 is coupled to grounding stud 1910a, and is further coupled between grounding stud 1910a and grounding stud 1910b, via aperture 1460 of mounting device 1320. In some embodiments, power line 1850 extends between structure 1380 and a conduit 1935 under support 1305 via apertures 1450 and 1460 of mounting device 1320.

In some embodiments, the risk of breaking a line may be mitigated by adding sufficient slack to the line. In this context, the slack in the line is sufficient if the line's minimum failure load is greater than the strain exerted on the line when retention member 1355 of the mounting device 1320 is fully extended. The use of slack as a line safety feature may be particularly advantageous in the case of the electrical grounding line 1905, because maintaining a connection between the structure 1380 and an electrical grounding line can greatly reduce the risk of electrical shock in the region proximate to the structure 1380.

In some embodiments, a line may include a quick release connector 1915. In some embodiments, a quick release connector 1915 includes mating interfaces 1950a and 1950b (e.g., a plug and a mating receptacle) coupled to different portions of a line. As just one example, a quick release connector 1915 may be implemented using an Anderson Power Products® SB® 50 Connector. In the example of FIG. 19A, a quick release connector 1915 is applied to power line 1850. In some embodiments, a quick release connector 1915 is applied to power line 1850, communications line 1840, and/or any other suitable line.

The quick release connector 1915 may disconnect the mating interfaces 1950a and 1950b (thereby disconnecting two portion of the line) when the strain (e.g., tensile strain) on the line exceeds a predetermined threshold (e.g., 100 lbs). Thus, the quick release connector may disconnect one portion of the line from another portion of the line in response to displacement of the structure 1380 relative to support 1305, when displacement of the structure 1380 relative to support 1305 results in tensile force greater than the threshold force being applied to the line.

Figures 19B, 19C:
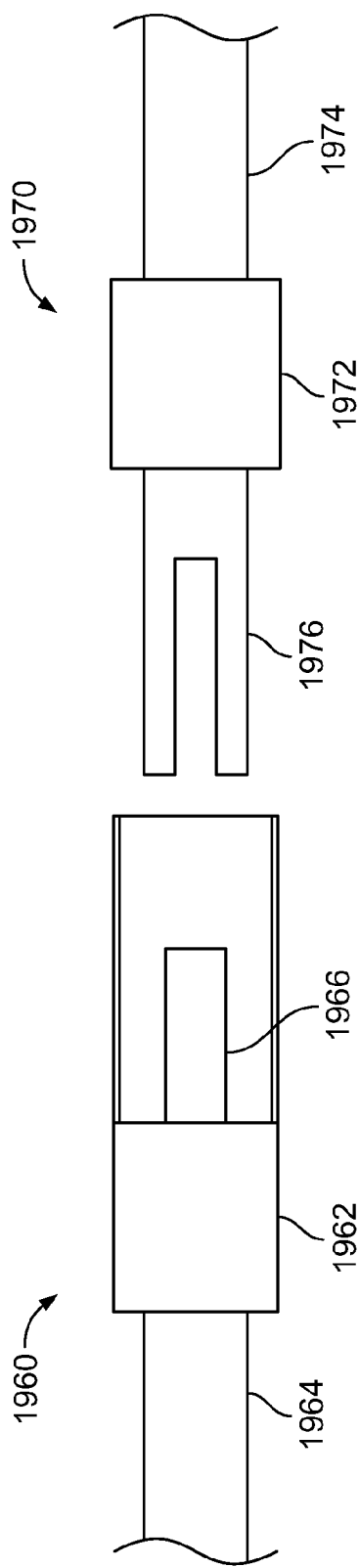
FIGS. 19B and 19C show side views of a male connector and a female connector, respectively, according to some embodiments.

In some embodiments, the mating interfaces 1950*a* and 1950*b* of the quick release connector 1915 are, respectively, a male connector 1960 and a female connector 1970 as illustrated in FIGS. 19B and 19C. The male connector 1960 may be coupled to the power supply side of a power line. The female connector 1970 may be coupled to the PCS side of the power line. The male connector 1960 may include a housing 1962 that connects a wire 1964 to a male pin 1966. The male pin 1966 is recessed inside the connector housing 1962. If AC power is applied to the connector 1960, the connector mitigates the potential hazard because the male pin 1966 is encapsulated and recessed inside the housing 1962. The female connector 1970 may include a housing 1972 that connects a wire 1974 to the female receptacle 1976. When the male connector 1960 and female connector 1970 are mated and a sufficient tensile force is applied, the connectors separate, exposing the female receptacle 1976. No power is applied to the unmated female receptacle, so it presents no hazard.

In some embodiments, the quick release connector 1915 may be arranged as follows. A first portion 1850*a* of a line may be coupled to (e.g., terminated by) a mating interface 1950*a*. The first portion 1850*a* of the line may also be coupled to support 1305 or to a portion of the mounting system 190 disposed below the structural break region 1930 (e.g., coupled to plate 1360 or sleeve 1430), via a connector 1925. The second portion 1850*b* of the line may be coupled to (e.g., terminated by) a mating interface 1950*b*. The second portion 1850*b* of the line may also be coupled to the structure 1380 or to a portion of the mounting system 190 disposed above the structure break region 190 (e.g., coupled to plate 1340), via a connector 1920. In some embodiments, the line 1850 is arranged so that the portions of line 1850 between the connectors 1920 and 1925 are taut. In some embodiments, the quick release connector 1915 is disposed within the structural break region 1930 of the mounting device 1320. In embodiments where structure 1380 is a PCS 100, quick release connector 1915 may be disposed within mounting compartment 890, within electronics compartment 840, or at any other suitable location.

In some embodiments, using a quick release connector 1915 on a line may reduce the risk of the line breaking under strain. The use of quick release connectors may be particularly advantageous in the case of a power line, because automatically disconnecting the power line from a structure when the structure is displaced can reduce the risk of electrical shock in areas proximate to the structure or the power line. The use of quick release connectors may also be advantageous in the case of a fiber optic communication line, because reconnecting a quick release connector may be significantly less time consuming and less expensive than laying new optical fiber between the structure and an optical communication access point.

In some embodiments, the quick release connector 1915 may include a secondary safety mechanism. When the mating interfaces 1950*a* and 1950*b* of the quick release connector 1915 disconnect, the second safety mechanism may cover the male or female portions of the quick release connector. By covering the male portions of the quick release connector, the secondary safety mechanism may make it more difficult for a person who handles the disconnected line to accidentally come into contact with the male portion or, in the case of an energized female portion, a conductor carrying an electrical signal. The secondary safety mechanism may include a recoil mechanism (e.g., a spring, an elastic mesh, an elastic cord, etc.), a magnetically actuated mechanism, or any other mechanism that causes a non-conductive material to cover at least the male portions of the quick release connector 1915 when the mating interfaces 1950 disconnect.

Figure 20:
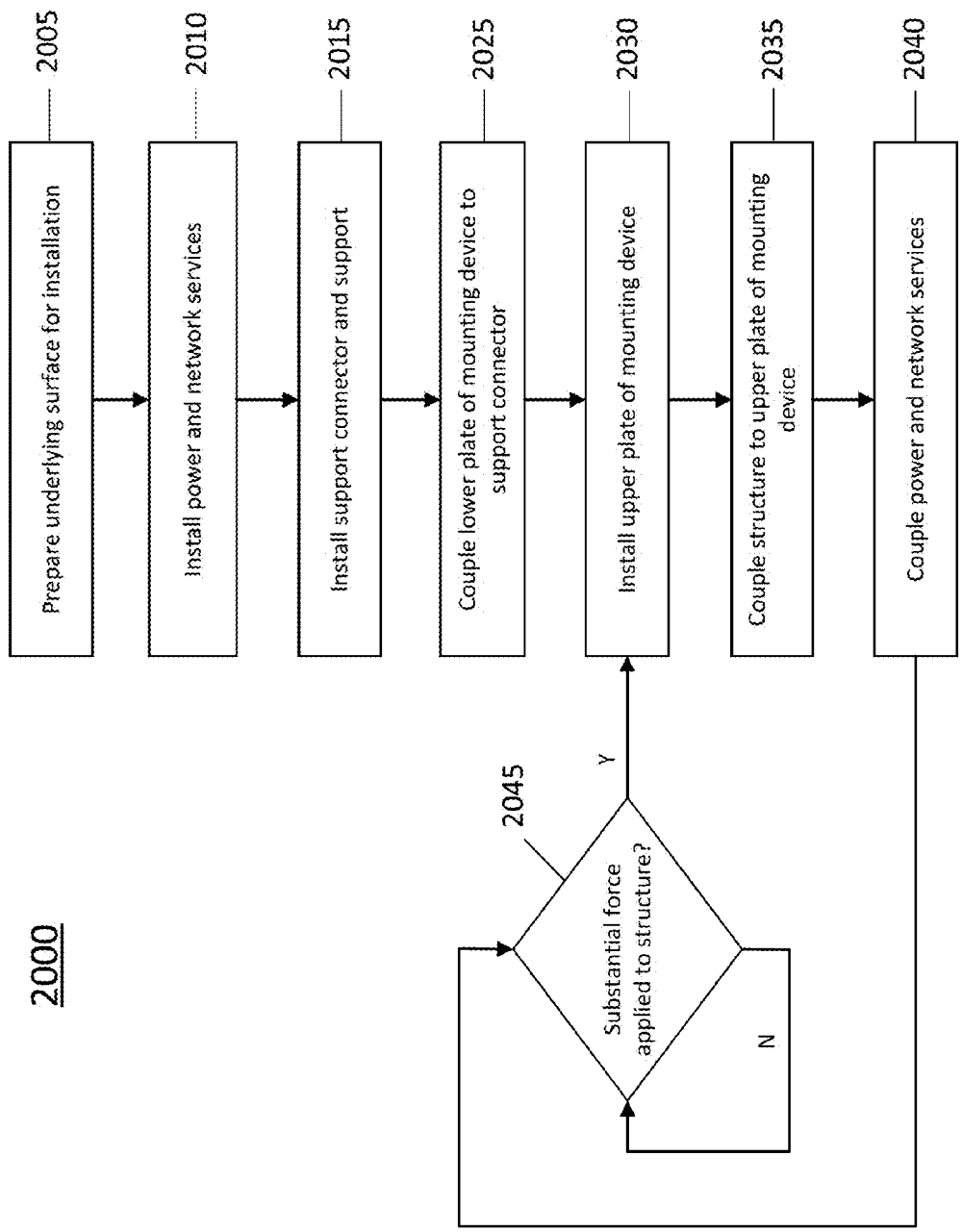
FIG. 20 is a flowchart of a method for mounting a structure on a support, according to some embodiments.

FIG. 20 shows a method 2000 for mounting a structure 1380 on a support 1305, according to some embodiments. In some embodiments, the method 2000 includes steps 2005-2045. In step 2005, an underlying surface may be prepared for installation of a mounting device 1320. In step 2010, power and network services for the structure 1380 may be installed. In step 2015, a support connector 1310 and a support 1305 may be installed. In step 2025, a lower plate 1360 of the mounting device 1320 may be coupled to the support connector 1310. In step 2030, an upper plate 1340 of the mounting device 1320 may be installed. In step 2035, the structure 1380 may be coupled to the upper plate 1340 of the mounting device 1320. In step 2040, the power and network services may be coupled to the structure. In step 2045, a determination is made as to whether a substantial force has been applied to the structure. The steps of method 2000 are described in further detail below.

In step 2005, an underlying surface is prepared for installation of a mounting device 1320. Preparing the underlying surface for installation of the mounting device may include removing an old support (e.g., removing an existing foundation for a phone booth, kiosk, or other article of street furniture) and/or removing a portion of a sidewalk (e.g., in areas where there is no old support) to accommodate the support 1305. In some embodiments, the old support or sidewalk may be demolished using a jack hammer and/or other suitable tools. In cases where the support is not obstructed, preparing the underlying surface for installation may include removing earth down to the frost line (e.g., approximately 48 inches below the ground surface).

In step 2010, power and network services are installed. In urban environments, cables carrying these services may run through underground tunnels (e.g., through a subway system). For example, power services may be carried on copper cables, and network services may be carried on fiber optic and/or copper cables. In some embodiments, installing the power and network services may include running connecting conduits and cables between the service cables and the structure 1380. In some embodiments, the connecting conduits and/or cables are routed to the structure 1380 through a passage (e.g., a passage formed by jackhammering the street and/or sidewalk). In some embodiments, the opening of the passage at the ground surface is covered by a manhole cover. In some embodiments, the connecting conduits and/or cables terminate at one or more service boxes associated with the structure 1380. In some embodiments, such service boxes are located underneath the structure's support connector 1310.

In step 2015, a support connector 1310 of a mounting subsystem 190 and a support 1305 are installed. Installing the support connector 1310 may include embedding at least a portion of the support connector 1310 (e.g., fishplate 1410, portions of anchor bolts 1420, and/or portions of sleeve 1430) in the support 1305. In some embodiments, portions of support connector 1310 may be embedded in support 1305 while support 1305 is being formed. For example, in cases where support 1305 is formed from concrete, portions of support connector 1310 (e.g., fishplate 1410, portions of anchor bolts 1420, and/or portions of sleeve 1430) may be embedded in support 1305 before the concrete sets.

In some embodiments, portions of support connector 1310 may be embedded in support 1305 after support 1305 is formed. For example, one or more cavities may be formed in support 1305, and portions of support connector 1310 may be inserted into the cavities. Such cavities may include one or more cavities extending between the upper and lower surfaces of the support 1305 with diameters approximately equal to the diameters of the anchor bolts 1420, a cavity in the upper surface of support 1305 with length and width approximately equal to the length and width of sleeve 1430, and/or a cavity in the lower surface of support 1305 with length and width approximately equal to the length and width of fishplate 1410. Embedding the support connector 1310 in the support 1305 may include inserting the anchor bolts 1420 into the cavities extending between the upper and lower surfaces of the support 1305, inserting at least a lower portion of the sleeve 1430 into the cavity in the upper surface of support 1305, and/or inserting the fishplate 1410 into the cavity in the lower surface of support 1305. In some embodiments, fishplate 1410 may be placed below support 1305 (e.g., against the bottom surface of support 1305) without being embedded in support 1305. In some embodiments, sleeve 1430 may be placed above support 1305 (e.g., on the top surface of support 1305) without being embedded in support 1305.

In some embodiments, installing the support connector 1310 includes arranging the anchor bolts 1420 such that the upper ends of the anchor bolts extend through apertures in the sleeve 1430. In some embodiments, installing the support connector 1310 includes arranging the anchor bolts 1420 such that the lower ends of the anchor bolts extend through apertures in the fishplate 1410. In some embodiments, installing the support connector 1310 includes coupling the lower ends of the anchor bolts to fishplate 1410. The lower ends of the anchor bolts may be coupled to fishplate 1410 by attaching fasteners (e.g., nuts, pins, etc.) to the lower ends of the anchor bolts. The fasteners may be embedded in the support 1305 or disposed below the support 1305 (e.g., against the bottom surface of fishplate 1410).

In some embodiments, installing the support connector 1310 includes depositing an adhesive layer 1440 over sleeve 1430 (e.g., on the upper surface of sleeve 1430). The upper ends of the anchor bolts 1410 may extend through the upper surface of the adhesive layer 1440 (e.g., through apertures in adhesive layer 1440).

Returning to FIG. 20, in step 2025, the lower plate 1360 of the mounting device 1320 may be coupled to support connector 1310. In some embodiments, coupling the lower plate 1360 to the support connector 1310 includes using an adhesive (e.g., adhesive layer 1440) to bond the lower plate 1360 to the support connector 1310. In some embodiments of step 2025, the mating interface(s) 1950*a* of one or more quick release connectors 1915 are coupled to the power and/or network service cables via one or more service boxes. As described above with reference to step 2010, the service box(es) may be located underneath the support connector 1310.

In step 2030, the upper plate 1340 of mounting device 1320 may be installed. Installing the upper plate 1340 may entail mating the lower ends of connectors 1350 with the upper ends of the anchor bolts 1420, and arranging the connectors 1350 such that the upper ends of the connectors extend through the upper plate 1340 (e.g., through apertures in upper plate 1340). In some embodiments, installing the upper plate 1340 includes coupling a retention member 1355 between upper plate 1340 and lower plate 1360. In some embodiments, shims, nuts or similar devices are used to level the upper plate 1340 (e.g., with relation to the slope of the sidewalk that the PCS is to be mounted on).

In step 2035, the structure 1380 is coupled to the upper plate 1340 of mounting device 1320. Coupling the structure 1380 to the upper plate 1340 of the mounting device may include arranging the structure 1380 so that the upper ends of the connectors 1350 extend through apertures in the surface of structure 1380, and attaching fasteners (e.g., nuts, pins, etc.) to the upper ends of the connectors 1350. The fasteners and the upper plate 1340 may be disposed on opposite sides of a surface of structure 1380, thereby coupling structure 1380 to the upper plate 1340.

In step 2040, the power and/or network service cables are coupled to the structure 1380. As described above, one or more service boxes (e.g., located underneath the support connector 1310) may be coupled to power and/or network service cables, and the mating interfaces 1950*a* of quick disconnects 1915 for the power and/or network cables may be installed. In some embodiments of step 2040, the power and/or network service cables are coupled to the structure 1380 by connecting the mating interfaces 1950*a* and 1950*b* of the quick disconnects 1915 to each other.

In step 2045, a determination is made as to whether a substantial force has been applied to the structure. In some embodiments, the structure uses sensors (e.g., accelerometers, pressure sensors, etc.) to determine whether a substantial force has been applied to the structure. For example, the structure may determine that a substantial force has been applied based on a pressure sensor detecting a pressure greater than a threshold pressure, or based on an accelerometer detecting an acceleration greater than a threshold acceleration. In some embodiments, the structure may use sensors to determine whether the upper and lower plates of the mounting device are rigidly connected to each other. For example, the structure may use sensors to determine whether one or more of the connectors 1350 between the upper and lower plates of the mounting device are connected or disconnected. If the number of connected connectors 1350 is less than a threshold number, the structure may determine that the upper and lower plates of the mounting device are not rigidly connected to each other, and may further determine that a substantial force was applied to the structure to break the connection(s). In some embodiments, a person (e.g., a maintenance worker, user of the structure, or bystander) may determine that a substantial force has been applied to the structure. Such a determination may be based, for example, on the position and/or orientation of the structure (e.g., overturned, leaning to a side, detached from the support, etc.), on the condition of the structure's frame and/or outer panels (e.g., broken, dented, crumpled, etc.), and/or on any other suitable information.

When a determination is made that a substantial force has been applied to the structure, the structure 1380 may be remounted on the support 1305 by performing steps 2030-2040 of method 2000 again. In some embodiments, the structure 1380 may be re-mounted on the support 1305 by replacing the damaged components of mounting device 1320 (e.g., upper plate 1340, connectors 1350, retention member 1355, and/or lower plate 1360), and performing steps 2030-2040 of method 2000 again. In some embodiments, re-mounting the structure 1380 on the support 1305 may consist of replacing the connectors 1350 and reconnecting the quick disconnects 1915. If the support 1305, the support connector 1310, or the cables carrying the power and network services to the structure 1380 have been damaged, one or more of steps 2005-2025 may also be performed.

In some embodiments of method 2000, step 2025 may be omitted. One of ordinary skill in the art will appreciate that, in some embodiments, mating the lower ends of the connectors 1350 with the upper ends of the anchor bolts 1420 in act 2030 has the effect of coupling lower plate 1360 to support connector 1310. Thus, in some embodiments, an additional act 2025 of coupling the lower plate 1360 to the support connector 1310 may be omitted.

Various aspects of the present disclosure can be used alone, in combination, or in a variety of arrangements not specifically described in the foregoing, and the invention is therefore not limited in its application to the details and arrangement of components set forth in the foregoing description or illustrated in the drawings. For example, aspects described in one embodiment can be combined in a suitable manner with aspects described in other embodiments.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Equivalents

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A mounting device for releasably securing a personal communication structure (PCS) to a support, the mounting device comprising:
   a first plate;
   a second plate proximate and spaced apart from the first plate;
   a plurality of frangible connections securing the first plate to the second plate, the frangible connections adapted to break in response to application of a force above a predetermined value, wherein the plurality of frangible connections comprises a plurality of frangible fasteners disposed proximate corners of the first plate and the second plate; and
   a retention member directly connected to each of the first plate and the second plate, the retention member adapted to maintain coupling of the first plate and the second plate after breakage of the frangible connections.

2. The device of claim 1, wherein the first plate is arranged substantially parallel to the second plate.

3. The device of claim 1, wherein the support is at least partially buried beneath a sloped surface, and wherein the first plate and the second plate are arranged at an angle relative to the sloped surface to level the PCS.

4. The device of claim 1, further comprising a deformable member disposed between the first plate and a surface of the PCS.

5. The device of claim 4, wherein the deformable member comprises at least one material selected from the group consisting of an elastomer, a rubber, a metal and a polymer.

6. The device of claim 1, wherein each of the frangible fasteners is selected from the group consisting of a shear pin, a rivet and a breakaway bolt.

7. The device of claim 1, wherein each of the frangible fasteners is connected to both the first plate and the second plate.

8. The device of claim 1, wherein each of the frangible fasteners is deformable when the force applied is less than the predetermined value.

9. The device of claim 8, wherein the PCS is configured to bend until at least a portion of the PCS contacts a ground surface in response to deformation of the plurality of frangible fasteners.

10. The device of claim 1, wherein a combined shear strength of the frangible fasteners is less than a damage threshold of the support.

11. The system of claim 1, wherein each of the frangible fasteners has a shear strength between approximately 2.0 kips and approximately 3.25 kips.

12. The device of claim 1, wherein the retention member limits a range of motion of the first plate relative to the second plate after breakage of the plurality of frangible connections, the first plate being secured to the PCS.

13. The device of claim 12, wherein the retention member limits displacement of the first plate after breakage of the plurality of frangible connections within a predetermined range.

14. The device of claim 12, wherein the retention member comprises a retention component selected from the group consisting of a chain, a cable, a strap, and a wire rope.

15. The device of claim 12, wherein a tensile strength of the retention member is between approximately 2.5 kips and approximately 4.0 kips.

16. The device of claim 1, wherein the retention member absorbs at least some energy resulting from movement of the PCS after breakage of the plurality of frangible connections.

17. The device of claim 16, wherein the retention member absorbs the energy via deformation.

18. A personal communication structure (PCS) comprising:
a frame;
an interactive user interface coupled to the frame; and
a mounting device adapted to releasably secure the frame to a support, the mounting device including:
a first plate coupled to the frame;
a second plate proximate and spaced apart from the first plate;
a plurality of frangible connections securing the first plate to the second plate, the frangible connections adapted to break in response to application of a force above a predetermined value, wherein the plurality of frangible connections comprises a plurality of frangible fasteners disposed proximate corners of the first plate and the second plate; and
a retention member directly connected to each of the first plate and the second plate, the retention member adapted to maintain coupling of the first plate and the second plate after breakage of the frangible connections.

19. A personal communication structure (PCS) comprising:
a frame;
an interactive user interface coupled to the frame;
a line in communication with the interactive user interface, the line selected from the group consisting of a power line and a communication line;
a line connector coupled to the line, the line connector adapted to connect to a mating connector; and
a mounting device adapted to releasably secure the frame to a support, the mounting device including:
a first plate coupled to the frame;
a second plate proximate the first plate;
at least one frangible connection securing the first plate to the second plate, the frangible connection adapted to break in response to application of a force above a predetermined value; and
a retention member connecting the first plate to the second plate, the retention member adapted to maintain coupling of the first plate and the second plate after breakage of the frangible connection.

20. The PCS of claim 19, wherein the line connector is adapted to disconnect the line from the mating connector in response to displacement of the PCS relative to the support.

21. The PCS of claim 20, wherein the displacement of the PCS relative to the support results in an application of tensile force to the line connector.

22. The PCS of claim 19, wherein the line connector is adapted to disconnect the line from the mating connector in response to application to the line connector of a tensile force greater than approximately 0.01 kips.

23. The PCS of claim 19, wherein the line is secured to the frame.

24. The PCS of claim 23, wherein the mating connector is coupled to the support.

25. The PCS of claim 23, wherein the line connector is disposed in the frame.

26. The PCS of claim 23, wherein the line connector is disposed in the mounting device.

27. The PCS of claim 23, wherein the first plate forms an aperture, and wherein the line extends through the aperture.

28. The PCS of claim 19, wherein the line comprises a power line further comprising a safety mechanism adapted to cover a male portion of the power line in response to disconnection of the line connector from the mating connector.

29. The PCS of claim 19, wherein the line is adapted to carry signals selected from the group consisting of electrical signals and optical signals.

* * * * *